United States Patent
Liu et al.

(10) Patent No.: US 10,892,865 B2
(45) Date of Patent: Jan. 12, 2021

(54) CHANNEL MEASUREMENT METHOD, BASE STATION, AND UE

(71) Applicant: Huawei Technologies Co., Ltd., Shenzhen (CN)

(72) Inventors: Kunpeng Liu, Beijing (CN); Leiming Zhang, Beijing (CN); Qiang Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/729,400

(22) Filed: Oct. 10, 2017

(65) Prior Publication Data
US 2018/0034613 A1 Feb. 1, 2018

Related U.S. Application Data

(63) Continuation of application No. PCT/CN2015/086917, filed on Aug. 14, 2015.

(30) Foreign Application Priority Data

Apr. 10, 2015 (WO) ................ PCT/CN2015/076385

(51) Int. Cl.
*H04L 5/00* (2006.01)
*H04W 72/04* (2009.01)
*H04W 24/10* (2009.01)

(52) U.S. Cl.
CPC .......... *H04L 5/0048* (2013.01); *H04L 5/0094* (2013.01); *H04W 24/10* (2013.01);
(Continued)

(58) Field of Classification Search
CPC ... H04L 5/0048; H04L 5/0094; H04L 5/0016; H04L 5/005; H04L 5/0051; H04W 24/10
See application file for complete search history.

(56) References Cited

U.S. PATENT DOCUMENTS 8,982,865 B2 * 3/2015 Chung ................. H04L 5/0048
370/342
9,730,099 B2 * 8/2017 Wu ........................ H04L 5/001
(Continued)

FOREIGN PATENT DOCUMENTS

CN 101800993 A 8/2010
CN 102571284 A 7/2012
(Continued)

OTHER PUBLICATIONS

"CSI feedback enhancements and precoded CSI—RS for FD-MIMO," 3GPP TSG RAN WG1 Meeting #80, Athens, Greece, R1-150379, XP050933589, 3rd Generation Partnership Project, Valbonne, France (Feb. 9-13, 2015).
(Continued)

*Primary Examiner* — Michael Thier
*Assistant Examiner* — Nevena Zecevic Sandhu
(74) *Attorney, Agent, or Firm* — Leydig, Voit & Mayer, Ltd.

(57) ABSTRACT

A method includes: obtaining, by UE, a reference signal resource mapping diagram, and obtaining a reference signal according to the reference signal resource mapping diagram; performing, by the UE, channel measurement according to the reference signal to determine channel state information, and feeding back the channel state information to a base station, where the reference signal resource mapping diagram is a location to which a time-frequency resource of the reference signal is mapped, the reference signal resource mapping diagram is a second reference signal resource mapping diagram which comprises at least two first reference signal resource mapping diagram.

12 Claims, 26 Drawing Sheets

(52) U.S. Cl.
CPC .............. *H04W 72/04* (2013.01); *H04L 5/005* (2013.01); *H04L 5/0016* (2013.01); *H04L 5/0051* (2013.01)

(56) References Cited

U.S. PATENT DOCUMENTS

| | | | |
|---|---|---|---|
| 10,164,751 B2* | 12/2018 | Berggren | H04L 5/0023 |
| 2011/0281537 A1* | 11/2011 | Wu | H04B 7/06 455/129 |
| 2012/0190356 A1 | 7/2012 | Zhao et al. | |
| 2013/0028217 A1 | 1/2013 | Sumasu et al. | |
| 2013/0121304 A1* | 5/2013 | Nory | H04L 1/1861 370/330 |
| 2013/0316719 A1* | 11/2013 | Mazzarese | H04L 1/0026 455/450 |
| 2014/0105158 A1* | 4/2014 | Kim | H04W 72/042 370/329 |
| 2014/0146778 A1* | 5/2014 | Wang | H04B 7/0626 370/329 |
| 2014/0169328 A1 | 6/2014 | Ahimezawa et al. | |
| 2014/0293815 A1* | 10/2014 | Xia | H04L 1/0026 370/252 |
| 2015/0003388 A1* | 1/2015 | Mazzarese | H04W 24/08 370/329 |
| 2015/0201346 A1 | 7/2015 | Wu et al. | |
| 2015/0230210 A1 | 8/2015 | Lee et al. | |
| 2015/0318972 A1 | 11/2015 | Zhang et al. | |
| 2015/0350942 A1 | 12/2015 | Wei et al. | |
| 2016/0242060 A1 | 8/2016 | Kakishima et al. | |
| 2017/0257203 A1* | 9/2017 | Tong | H04L 5/0053 |
| 2018/0034613 A1 | 2/2018 | Liu et al. | |
| 2018/0323944 A1 | 11/2018 | Wang et al. | |

FOREIGN PATENT DOCUMENTS

| | | |
|---|---|---|
| CN | 103347298 A | 10/2013 |
| CN | 103582141 A | 2/2014 |
| CN | 103650367 A | 3/2014 |
| CN | 103746779 A | 4/2014 |
| CN | 103825663 A | 5/2014 |
| CN | 103843274 A | 6/2014 |
| CN | 103974315 A | 8/2014 |
| CN | 108616344 A | 10/2018 |
| EP | 2900008 A1 | 7/2015 |
| WO | 2011125300 A1 | 10/2011 |
| WO | WO-2014023361 A1 * | 2/2014 .......... H04L 5/0023 |
| WO | 2014042422 A2 | 3/2014 |
| WO | 2014058162 A2 | 4/2014 |
| WO | 2014059581 A1 | 4/2014 |
| WO | WO-2014047797 A1 * | 4/2014 ............ H04L 5/001 |
| WO | 2014110837 A1 | 7/2014 |
| WO | 2015045696 A1 | 4/2015 |

OTHER PUBLICATIONS

"3rd Generation Partnership Project; Technical Specification Group Radio Access Network; Evolved Universal Terrestrial Radio Access (E-UTRA); Physical channels and modulation (Release 12)," 3GPP TS 36.211 V.12.2.0, XP050774046, 3rd Generation Partnership Project, Valbonne, France (Jun. 2014).

"3rd Generation Partnership Project; Technical Specification Group Radio Access Network; Evolved Universal Terrestrial Radio Access (E-UTRA); Physical channels and modulation (Release 12)," 3GPP TS 36.211, V12.5.0, pp. 1-136, 3rd Generation Partnership Project, Valbonne, France (Mar. 2015).

"3rd Generation Partnership Project; Technical Specification Group Radio Access Network; Evolved Universal Terrestrial Radio Access (E-UTRA); Physical layer procedures (Release 12)," 3GPP TS 36.213, V12.5.0, pp. 1-239, 3rd Generation Partnership Project, Valbonne, France (Mar. 2015).

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331, V12.5.0, pp. 1-445, 3rd Generation Partnership Project, Valbonne, France (Mar. 2015).

"3rd Generation Partnership Project; Technical Specification Group Radio Access Network; Evolved Universal Terrestrial Radio Access (E-UTRA); Physical Channels and Modulation (Release 10)," 3GPP TS 36.211 V10.7.0, total 10 pages, 3rd Generation Partnership Project, Valbonne, France (Feb. 2013).

"3rd Generation Partnership Project; Technical Specification Group Radio Access Network; Evolved Universal Terrestrial Radio Access (E-UTRA); Radio Resource Control (RRC); Protocol specification (Release 10)," 3GPP TS 36.331 V10.0.0, pp. 1-276, 3rd Generation Partnership Project, Valbonne, France (Dec. 2010).

"3rd Generation Partnership Project; Technical Specification Group Radio Access Network; Evolved Universal Terrestrial Radio Access (E-UTRA); Radio Resource Control (RRC); Protocol specification (Release 10)," 3GPP TS 36.331 V10.10.0, pp. 1-307, 3rd Generation Partnership Project, Valbonne, France (Jun. 2013).

* cited by examiner

CHANNEL MEASUREMENT METHOD, BASE STATION, AND UE

CROSS-REFERENCE TO RELATED APPLICATIONS

This application is a continuation of International Application No. PCT/CN2015/086917, filed on Aug. 14, 2015, which claims priority to International Application No. PCT/CN2015/076385, filed on Apr. 10, 2015. The disclosures of the aforementioned applications are hereby incorporated by reference in their entireties.

TECHNICAL FIELD

Embodiments of the present invention relate to the communications field, and in particular, to a channel measurement method, a base station, and UE (user equipment).

BACKGROUND

A communications system may usually send different types of reference signals to user equipment by using antennas, to perform channel estimation or channel state measurement or channel quality measurement, so as to schedule the UE. In a 3GPP (the 3rd Generation Partnership Project) LTE (Long Term Evolution) R10 (release 10) downlink system, quantities of antenna ports supported by various reference signals are different, and a reference signal supports a maximum of eight antenna ports. To further improve spectrum efficiency, in a current to-be-started LTE R13 (release 13) standard, it is considered that more antenna configurations are introduced, and a base station may send a reference signal to UE by using more antenna configurations. Therefore, a resource mapping diagram of a reference signal supporting more ports needs to be provided, so that the UE performs channel measurement by using the reference signal.

Currently, the R10 downlink system supports $2^n$ ($2^n \leq 8$) antenna ports. However, this cannot satisfy a requirement of the LTE R13 standard on a quantity of ports. Therefore, in the prior art, a resource mapping diagram of a reference signal satisfying the LTE R13 standard cannot be provided. Consequently, UE cannot obtain a reference signal and cannot perform channel measurement.

SUMMARY

Embodiments of the present invention provide a channel measurement method, a base station, and UE, to provide a resource mapping diagram of a reference signal supporting more ports, so that UE can perform channel measurement.

To achieve the foregoing objective, the following technical solutions are used in the embodiments of the present invention.

According to a first aspect, a channel measurement method is provided, including:

obtaining, by user equipment (UE), a reference signal resource mapping diagram, and obtaining a reference signal according to the reference signal resource mapping diagram; and performing, by the UE, channel measurement according to the reference signal to determine channel state information, and feeding back the channel state information to a base station, where the reference signal resource mapping diagram is a location to which a time-frequency resource of the reference signal is mapped, the reference signal resource mapping diagram is a first reference signal resource mapping diagram or a second reference signal resource mapping diagram, and an association relationship exists between each of K2 second reference signal resource mapping diagrams and at least one of K1 first reference signal resource mapping diagrams, where K2 is a quantity of the second reference signal resource mapping diagrams, K1 is a quantity of the first reference signal resource mapping diagrams, and K1 and K2 are integers greater than or equal to 1; and the first reference signal resource mapping diagram is a Y-port reference signal resource mapping diagram, the second reference signal resource mapping diagram is an X-port reference signal resource mapping diagram, Y is an integer less than or equal to 8 and satisfying $2^n$, and X is an integer greater than 8 or an integer less than 8 and not satisfying $2^n$.

With reference to the first aspect, in a first possible implementation of the first aspect, when X is greater than 8, X does not satisfy $2^n$, and n is an integer greater than or equal to 0.

With reference to the first aspect or the first possible implementation of the first aspect, in a second possible implementation of the first aspect, when X is less than 8 and does not satisfy $2^n$, the UE obtains the second reference signal resource mapping diagram, and the association relationship is: Time-frequency resources and code resources of X consecutive ports in Y ports of any one of the K2 second reference signal resource mapping diagrams are the same as time-frequency resources and code resources of X consecutive ports in Y ports of any one of the K first reference signal resource mapping diagrams, where Y is an integer closest to X and satisfying $2^n$ in integers greater than X, and the code resource is an orthogonal spreading code or a sequence of a reference signal.

With reference to the second possible implementation of the first aspect, in a third possible implementation of the first aspect, the X consecutive ports are the $0^{th}$ port to the $(X-1)^{th}$ port in the Y ports, or the X consecutive ports are the $(Y-X)^{th}$ port to the $(Y-1)^{th}$ port in the Y ports.

With reference to the second or the third possible implementation of the first aspect, in a fourth possible implementation of the first aspect, K2=K1, or $$K2 = \left\lceil \frac{Y*K1}{X} \right\rceil,$$

and ⌈ ⌉ represents rounding down.

With reference to any one of the first aspect or the first to the fourth possible implementations of the first aspect, in a fifth possible implementation of the first aspect, at least one of the K2 second reference signal resource mapping diagrams includes time-frequency resources of at least two of the first reference signal resource mapping diagrams.

With reference to the fifth possible implementation of the first aspect, in a sixth possible implementation of the first aspect, an X-port second reference signal resource mapping diagram in the K2 second reference signal resource mapping diagrams includes K3 first reference signal resource mapping diagrams, each of the K3 first reference signal resource mapping diagrams includes time-frequency resources corresponding to H ports, H=X/K3, and K3 is a positive integer less than X.

With reference to the sixth possible implementation of the first aspect, in a seventh possible implementation of the first aspect, the H ports are the $0^{th}$ port to the $(H-1)^{th}$ port or the $(Y-H)^{th}$ port to the $(Y-1)^{th}$ port in the first reference signal resource mapping diagram.

With reference to the first aspect or the first possible implementation of the first aspect, in an eighth possible implementation of the first aspect, the method further includes: obtaining, by the UE, the second reference signal resource mapping diagram, where the X-port second reference signal resource mapping diagram includes an $X_1$-port reference signal resource mapping diagram and an $X_2$-port reference signal resource mapping diagram;

$X_1+X_2=X$, a difference between X and $X_2$ is less than 2, the $X_1$-port reference signal resource mapping diagram and the $X_2$-port reference signal resource mapping diagram are obtained by the UE from m subframes, and m is 1 or 2; and the $X_1$-port reference signal resource mapping diagram is the first reference signal resource mapping diagram and the $X_2$-port reference signal resource mapping diagram is the second reference signal resource mapping diagram; or the $X_1$-port reference signal resource mapping diagram and the $X_2$-port reference signal resource mapping diagram both are the second reference signal resource mapping diagrams.

With reference to the seventh possible implementation of the first aspect, in a ninth possible implementation of the first aspect, X is an integer greater than 8.

With reference to the eighth or the ninth possible implementation of the first aspect, in a tenth possible implementation of the first aspect, the method further includes:

receiving, by the UE, a sequence that is notified by the base station and that is of subframes carrying the $X_1$-port reference signal resource mapping diagram and the $X_2$-port reference signal resource mapping diagram; or a sequence of subframes carrying the $X_1$-port reference signal resource mapping diagram and the $X_2$-port reference signal resource mapping diagram is preset, and the sequence is a descending order of port quantities or an ascending order of port quantities.

With reference to the eighth or the ninth possible implementation of the first aspect, in an eleventh possible implementation of the first aspect, the method further includes:

receiving, by the UE, a number of a subframe carrying the $X_1$-port reference signal resource mapping diagram and a number of a subframe carrying the $X_2$-port reference signal resource mapping diagram that are notified by the base station; or receiving, by the UE, a number of a subframe carrying the $X_1$-port reference signal resource mapping diagram and a subframe interval between a subframe carrying the $X_2$-port reference signal resource mapping diagram and the subframe carrying the $X_1$-port reference signal resource mapping diagram that are notified by the base station.

With reference to the first aspect or the first possible implementation of the first aspect, in a twelfth possible implementation of the first aspect, the method further includes: obtaining, by the UE, the second reference signal resource mapping diagram, where the second reference signal resource mapping diagram includes each of an $X_1$-port reference signal resource mapping diagram, an $X_2$-port reference signal resource mapping diagram, . . . , and an $X_i$-port reference signal resource mapping diagram, $X_1+X_2$ . . . $+X_i=X$, and each of $X_1, X_2, \ldots, X_i$ can be represented as $2^n$; and the $X_1$-port reference signal resource mapping diagram, the $X_2$-port reference signal resource mapping diagram, . . . , and the $X_i$-port reference signal resource mapping diagram are obtained by the UE from at least one subframe.

With reference to the twelfth possible implementation of the first aspect, in a thirteenth possible implementation of the first aspect, each of the $X_1$-port reference signal resource mapping diagram, the $X_2$-port reference signal resource mapping diagram, . . . , and the $X_i$-port reference signal resource mapping diagram is the first reference signal resource mapping diagram; and each of $X_1, X_2, \ldots, X_i$ is less than or equal to 8 and values of n corresponding to $X_1, X_2, \ldots, X_i$ are different.

With reference to the twelfth or thirteenth possible implementation of the first aspect, in a fourteenth possible implementation of the first aspect, X is an integer greater than 8.

With reference to the twelfth to the fourteenth possible implementations of the first aspect, in a fifteenth possible implementation of the first aspect, the $X_1$-port reference signal resource mapping diagram, the $X_2$-port reference signal resource mapping diagram, . . . , and the $X_i$-port reference signal resource mapping diagram are obtained by the UE from one subframe; or the $X_1$-port reference signal resource mapping diagram, the $X_2$-port reference signal resource mapping diagram, . . . , and the $X_i$-port reference signal resource mapping diagram are obtained by the UE from i subframes.

With reference to any one of the twelfth to the fifteenth possible implementations of the first aspect, in a sixteenth possible implementation of the first aspect, the method further includes:

receiving, by the UE, a sequence that is notified by the base station and that is of subframes carrying the $X_1$-port reference signal resource mapping diagram, the $X_2$-port reference signal resource mapping diagram, . . . , and the $X_i$-port reference signal resource mapping diagram; or a sequence of subframes carrying the $X_1$-port reference signal resource mapping diagram, the $X_2$-port reference signal resource mapping diagram, . . . , and the $X_i$-port reference signal resource mapping diagram is predefined, where the sequence of the subframes is an ascending order of port quantities, or a descending order of port quantities, or a sequence of a largest port quantity, a smallest port quantity, a second largest port quantity, a second smallest port quantity, . . . .

With reference to any one of the twelfth to the fifteenth possible implementations of the first aspect, in a seventeenth possible implementation of the first aspect, the method further includes:

receiving, by the UE, configuration information that is notified by the base station and that is of each of the $X_1$-port reference signal resource mapping diagram, the $X_2$-port reference signal resource mapping diagram, . . . , and the $X_i$-port reference signal resource mapping diagram; or receiving, by the UE, joint coding signaling sent by the base station, where the joint coding signaling is used to indicate configuration information of the $X_1$-port reference signal resource mapping diagram, configuration information of the $X_2$-port reference signal resource mapping diagram, . . . , and configuration information of the $X_i$-port reference signal resource mapping diagram; or receiving, by the UE, configuration information of the $X_1$-port reference signal resource mapping diagram and a correspondence between configuration information of an $X_j$-port reference signal resource mapping diagram and the configuration information of the $X_1$-port reference signal resource mapping diagram that are notified by the base station, where j is an integer greater than 1 and less than or equal to i; or configuration information of the $X_1$-port reference signal resource mapping diagram, configuration information of the $X_2$-port reference signal resource mapping diagram, . . . , and configuration information of the $X_i$-port reference signal resource mapping diagram are predefined.

With reference to any one of the twelfth to the sixteenth possible implementations of the first aspect, in an eighteenth possible implementation of the first aspect, a number of the subframe carrying the $X_1$-port reference signal resource mapping diagram, a number of the subframe carrying the $X_2$-port reference signal resource mapping diagram, . . . , and a number of the subframe carrying the $X_i$-port reference signal resource mapping diagram are predefined; or the UE receives a number of the subframe carrying the $X_1$-port reference signal resource mapping diagram, a number of the subframe carrying the $X_2$-port reference signal resource mapping diagram, . . . , and a number of the subframe carrying the $X_i$-port reference signal resource mapping diagram that are notified by the base station; or the UE receives a number of the subframe carrying the $X_1$-port reference signal resource mapping diagram and a subframe interval between a subframe carrying an $X_j$-port reference signal resource mapping diagram and the subframe carrying the $X_1$-port reference signal resource mapping diagram that are notified by the base station, where j is an integer greater than 1 and less than or equal to i.

With reference to the thirteenth possible implementation of the first aspect, in a nineteenth possible implementation of the first aspect, if an $X_i$-port reference signal resource mapping diagram and the $X_j$-port reference signal resource mapping diagram are in different subframes, t is an integer greater than or equal to 1 and less than or equal to i, and t is not equal to j, the $X_i$-port reference signal resource mapping diagram and the $X_j$-port reference signal resource mapping diagram have L same relative time-frequency resource locations in each PRB pair, where L is a smallest value in $X_i$, $X_j$; or time-frequency resource locations of the $X_i$-port reference signal resource mapping diagram and the $X_j$-port reference signal resource mapping diagram in each PRB pair are different.

With reference to the thirteenth possible implementation of the first aspect, in a twentieth possible implementation of the first aspect, there are Q same relative time-frequency resource locations in time-frequency resource locations of the $X_1$-port reference signal resource mapping diagram, the $X_2$-port reference signal resource mapping diagram, . . . , and the $X_i$-port reference signal resource mapping diagram, and the relative time-frequency resource location is a time-frequency resource location of a reference signal resource mapping diagram in each PRB pair.

With reference to the twentieth possible implementation of the first aspect, in a twenty-first possible implementation of the first aspect, Q is a smallest value in $X_1$, $X_2$ . . . $X_i$.

With reference to the thirteenth possible implementation of the first aspect, in a twenty-second possible implementation of the first aspect, there are Q same subcarriers in time-frequency resource locations of the $X_1$-port reference signal resource mapping diagram, the $X_2$-port reference signal resource mapping diagram, . . . , and the $X_i$-port reference signal resource mapping diagram, and Q is an integer greater than 1.

With reference to the twenty-second possible implementation of the first aspect, in a twenty-third possible implementation of the first aspect, the Q same subcarriers are subcarriers occupied by an L-port reference signal resource mapping diagram, and L is a smallest value in $X_1$, $X_2$ . . . $X_i$.

With reference to the thirteenth possible implementation of the first aspect, in a twenty-fourth possible implementation of the first aspect, subcarriers corresponding to time-frequency resource locations of the $X_1$-port reference signal resource mapping diagram, the $X_2$-port reference signal resource mapping diagram, . . . , and the $X_i$-port reference signal resource mapping diagram are different.

With reference to the twelfth to the fifteenth possible implementations of the first aspect, in a twenty-fifth possible implementation of the first aspect, orthogonal frequency division multiplexing (OFDM) symbols occupied by time-frequency resource locations of the $X_1$-port reference signal resource mapping diagram, the $X_2$-port reference signal resource mapping diagram, . . . , and the $X_i$-port reference signal resource mapping diagram are the same.

With reference to the twentieth possible implementation of the first aspect, in a twenty-sixth possible implementation of the first aspect, the Q same time-frequency resource locations are time-frequency resource locations corresponding to the $0^{th}$ port to the $(Q-1)^{th}$ port in the $X_j$-port reference signal resource mapping diagram, and $X_j$ is a smallest value in $X_1$, $X_2$ . . . $X_i$.

With reference to the second possible implementation of the first aspect, in a twenty-seventh possible implementation of the first aspect, if X is 3, Y is 4, and K2=K1=10, a time-frequency resource location of the second reference signal resource mapping diagram is (k,l), k is a subcarrier number of a resource element (RE), and l is a symbol corresponding to the RE, $$k = k' + \begin{cases} -0, & p = \{0^{th} \text{ port, first port}\} \\ -6, & p = \{\text{second port}\} \end{cases}$$

$$l = l' + l'', l'' = 0, 1, l' = l'_0, l'_1 \ldots l'_9$$

$$w_{l''} = \begin{cases} 1, & p = \{0^{th} \text{ port, second port}\} \\ (-1)^{l''}, & p = \{\text{first port}\} \end{cases}$$

$$(k', l') = \begin{cases} k'_0 = 9, l'_0 = 5, n_s \text{mod}2 = 0 \\ \text{or } k'_1 = 11, l'_1 = 2, n_s \text{mod}2 = 1 \\ \text{or } k'_2 = 9, l'_2 = 2, n_s \text{mod}2 = 1 \\ \text{or } k'_3 = 7, l'_3 = 2, n_s \text{mod}2 = 1 \\ \text{or } k'_4 = 9, l'_4 = 5, n_s \text{mod}2 = 1 \\ \text{or } k'_5 = 8, l'_5 = 5, n_s \text{mod}2 = 0 \\ \text{or } k'_6 = 10, l'_6 = 2, n_s \text{mod}2 = 1 \\ \text{or } k'_7 = 8, l'_7 = 2, n_s \text{mod}2 = 1 \\ \text{or } k'_8 = 6, l'_8 = 2, n_s \text{mod}2 = 1 \\ \text{or } k'_9 = 8, l'_9 = 5, n_s \text{mod}2 = 1 \end{cases}$$

where p is a port number, in a first configuration of the second reference signal resource mapping diagram, (k',l')=($k_0'$,$l_0'$), in a second configuration, (k',l')=($k'_1$,$l'_1$) . . . , and in a tenth configuration, (k',l')=($k_9'$,$l_9'$) $n_s$ mod 2=1 represents that the time-frequency resource location is in a second slot of a subframe, and $n_s$ mod 2=0 represents that the time-frequency resource location is in a first slot of a subframe.

With reference to the twenty-seventh possible implementation of the first aspect, in a twenty-eighth possible implementation of the first aspect, if K1=10, and K2=4*10/3, a time-frequency resource location of the second reference signal resource mapping diagram other than (k,l) is:

$$k = \begin{cases} k'_0 - 6, 0^{th} \text{ port} \\ k'_5 - 6, \text{ first port} \\ k'_1 - 4, \text{ second port} \end{cases}, l = \begin{cases} l'_1 + l'' \\ l'_2 + l'' \\ l'_3 + l'', l'' = 0, 1, w_{l''} = (-1)^{l''} \end{cases}; \text{ or}$$

$$k = \begin{cases} k'_6 - 6, 0^{th} \text{ port} \\ k'_2 - 6, \text{ first port} \\ k'_7 - 6, \text{ second port} \end{cases}, l = \begin{cases} l'_4 + l'' \\ l'_5 + l'' \\ l'_6 + l'', l'' = 0, 1, w_{l''} = (-1)^{l''} \end{cases}; \text{ or}$$

$$k = \begin{cases} k'_3 - 6, 0^{th} \text{ port} \\ k'_8 - 6, \text{ first port} \\ k'_4 - 6, \text{ second port} \end{cases}, l = \begin{cases} l'_7 + l'' \\ l'_8 + l'' \\ l'_9 + l'', l'' = 0, 1, w_{l''} = (-1)^{l''} \end{cases};$$

$$(k', l') = \begin{cases} k'_0 = 9, l'_0 = 5, n_s \bmod 2 = 0 \\ \text{or } k'_1 = 11, l'_1 = 2, n_s \bmod 2 = 1 \\ \text{or } k'_2 = 9, l'_2 = 2, n_s \bmod 2 = 1 \\ \text{or } k'_3 = 7, l'_3 = 2, n_s \bmod 2 = 1 \\ \text{or } k'_4 = 9, l'_4 = 5, n_s \bmod 2 = 1 \\ \text{or } k'_5 = 8, l'_5 = 5, n_s \bmod 2 = 0 \\ \text{or } k'_6 = 10, l'_6 = 2, n_s \bmod 2 = 1 \\ \text{or } k'_7 = 8, l'_7 = 2, n_s \bmod 2 = 1 \\ \text{or } k'_8 = 6, l'_8 = 2, n_s \bmod 2 = 1 \\ \text{or } k'_9 = 8, l'_9 = 5, n_s \bmod 2 = 1 \end{cases}.$$

With reference to the second possible implementation of the first aspect, in a twenty-ninth possible implementation of the first aspect, if X is 5, Y is 8, and K2=K1=5, a time-frequency resource location of the second reference signal resource mapping diagram is (k,l), k is a subcarrier number of the RE, and l is a symbol corresponding to the RE, $$k = k' + \begin{cases} -0, p = \{0^{th} \text{ port, first port}\} \\ -6, p = \{\text{second port, third port}\} \\ -1, p = \{\text{fourth port}\} \end{cases},$$

$$l = l' + l'', l'' = 0, 1, l' = l'_0, l'_2, \ldots l'_4$$

spreading factor $w_{l''} =$ $$\begin{cases} 1, p = \{0^{th} \text{ port, second port, fourth port}\} \\ (-1)^{l''}, p = \{\text{first port, third port}\} \end{cases}$$

$$(k', l') = \begin{cases} k'_0 = 9, l'_0 = 5, n_s \bmod 2 = 0 \\ \text{or } k'_1 = 11, l'_1 = 2, n_s \bmod 2 = 1 \\ \text{or } k'_2 = 9, l'_2 = 2, n_s \bmod 2 = 1 \\ \text{or } k'_3 = 7, l'_3 = 2, n_s \bmod 2 = 1 \\ \text{or } k'_4 = 9, l'_4 = 5, n_s \bmod 2 = 1 \end{cases}$$

where p is a port number, in a first configuration of the second reference signal resource mapping diagram, $(k',l')=(k_0',l_0')$, in a second configuration, $(k',l')=(k'_1,l'_1)$ . . . , and in a fifth configuration, $(k',l')=(k_4',l_4')$; $n_s \bmod 2=1$, represents that the time-frequency resource location is in a second slot of a subframe, and $n_s \bmod 2=0$ represents that the time-frequency resource location is in a first slot of a subframe.

With reference to the thirteenth possible implementation of the first aspect, in a thirtieth possible implementation of the first aspect, if X=12, $X_1$=8, and $X_2$=4, a time-frequency resource location of the second reference signal resource mapping diagram is (k,l), k is a subcarrier number of a resource element (RE), and l is a symbol corresponding to the RE, $$k = k' + \begin{cases} -0, p = \{0^{th} \text{ port, first port}\} \\ -6, p = \{\text{second port, third port}\} \\ -1, p = \{\text{fourth port, fifth port}\} \\ -7, p = \{\text{sixth port, seventh port}\} \\ -0, p = \{\text{eighth port, ninth port}\} \\ -6, p = \{\text{tenth port, eleventh port}\} \end{cases},$$

$$l = \begin{cases} l' + l'', p = 0^{th} \text{ port to seventh port} \\ l' - 3 + l'', p = \text{eighth port to eleventh port}, l'' = 0, 1 \end{cases};$$

where (k',l')=(9,5), the $0^{th}$ port to the seventh port correspond to $n_s \bmod 2$=0, the eighth port to the eleventh port correspond to $n_s \bmod 2$=1, and the CP is a normal CP and supports frequency division multiplexing (FDD) and time division multiplexing (TDD); or $$k = k' + \begin{cases} -0, p = \{0^{th} \text{ port, first port}\} \\ -6, p = \{\text{second port, third port}\} \\ -1, p = \{\text{fourth port, fifth port}\} \\ -7, p = \{\text{sixth port, seventh port}\} \\ -1, p = \{\text{eighth port, ninth port}\} \\ -7, p = \{\text{tenth port, eleventh port}\} \end{cases}$$

$$l = \begin{cases} l' + l'', p = 0^{th} \text{ port to seventh port} \\ l' - 3 + l'', p = \text{eighth port to eleventh port } l'' = 0, 1 \end{cases};$$

where (k',l')=(9,5), the $0^{th}$ port to the seventh port correspond to $n_s \bmod 2$=0, the eighth port to the eleventh port correspond to $n_s \bmod 2$=1, and the CP is a normal CP and supports FDD and TDD; or $$k = k' + \begin{cases} -0, p = \{0^{th} \text{ port, first port}\} \\ -6, p = \{\text{second port, third port}\} \\ -1, p = \{\text{fourth port, fifth port}\} \\ -7, p = \{\text{sixth port, seventh port}\} \\ -0, p = \{\text{eighth port, ninth port}\} \\ -6, p = \{\text{tenth port, eleventh port}\} \end{cases}$$

$$l = \begin{cases} l' + l'', p = 0^{th} \text{ port to seventh port} \\ l' - 3 + l'', p = \text{eighth port to eleventh port } l'' = 0, 1 \end{cases};$$

where (k',l')=(9,5), the $0^{th}$ port to the eleventh port correspond to $n_s \bmod 2$=1, and the CP is a normal CP and supports FDD and TDD; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -1, & p = \{\text{eighth port, ninth port}\} \\ -7, & p = \{\text{tenth port, eleventh port}\} \end{cases}$$

$$l = \begin{cases} l' + l'', & p = 0^{th} \text{ port to seventh port} \\ l' - 3 + l'', & p = \text{eighth port to eleventh port } l'' = 0, 1 \end{cases}$$

where (k',l')=(9,5), the $0^{th}$ port to the eleventh port correspond to $n_s$ mod 2=1, and the CP is a normal CP and supports FDD and TDD; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$$l = \{l' + l'', \; p = 0^{th} \text{ port to eleventh port}, \; l'' = 0, 1$$

where (k',l')=(9,5), the $0^{th}$ port to the seventh port correspond to $n_s$ mod 2=0, the eighth port to the eleventh port correspond to $n_s$ mod 2=1, and the CP is a normal CP and supports FDD and TDD; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -3, & p = \{\text{eighth port, ninth port}\} \\ -9, & p = \{\text{tenth port, eleventh port}\} \end{cases}$$

$$l = \begin{cases} l', & p = 0^{th}, \text{ second, fourth, sixth, eighth, or twelfth port} \\ l' + 2, & p = \text{first, third, fifth, seventh, ninth, or eleventh port} \end{cases}$$

where (k',l')=(11,1), the $0^{th}$ port to the eleventh port correspond to $n_s$ mod 2=1, and the CP is a normal CP and supports only TDD; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ +2, & p = \{\text{eighth port, ninth port}\} \\ -4, & p = \{\text{tenth port, eleventh port}\} \end{cases}$$

$$l = \begin{cases} l', & p = 0^{th}, \text{ second, fourth, sixth, eighth, or twelfth port} \\ l' + 2, & p = \text{first, third, fifth, seventh, ninth, or eleventh port} \end{cases}$$

where (k',l')=(7,1), the $0^{th}$ port to the eleventh port correspond to $n_s$ mod 2=1, and the CP is a normal CP and supports only TDD; or $$k = k' + \begin{cases} -0, & p = \{0^{th} \text{ port, first port}\} \\ -3, & p = \{\text{second port, third port}\} \\ -6, & p = \{\text{fourth port, fifth port}\} \\ -9, & p = \{\text{sixth port, seventh port}\} \\ -8, & p = \{\text{eighth port, ninth port}\} \\ -11, & p = \{\text{tenth port, eleventh port}\} \end{cases}$$

$$l = \{l' + l'', \; p = 0^{th} \text{ port to eleventh port}, \; l'' = 0, 1$$

where (k',l')=(11,4), the $0^{th}$ port to the eleventh port correspond to $n_s$ mod 2=0, and the CP is an extended CP and supports FDD and TDD; or $$k = k' + \begin{cases} -0, & p = \{0^{th} \text{ port, first port}\} \\ -3, & p = \{\text{second port, third port}\} \\ -6, & p = \{\text{fourth port, fifth port}\} \\ -9, & p = \{\text{sixth port, seventh port}\} \\ +2, & p = \{\text{eighth port, ninth port}\} \\ -1, & p = \{\text{tenth port, eleventh port}\} \end{cases}$$

$$l = \{l' + l'', \; p = 0^{th} \text{ port to eleventh port}, \; l'' = 0, 1$$

where (k',l')=(9, 4), the $0^{th}$ port to the eleventh port correspond to $n_s$ mod 2=0, and the CP is an extended CP and supports FDD and TDD; or $$k = k' + \begin{cases} -0, & p = \{0^{th} \text{ port, first port}\} \\ -3, & p = \{\text{second port, third port}\} \\ -6, & p = \{\text{fourth port, fifth port}\} \\ -9, & p = \{\text{sixth port, seventh port}\} \\ -7, & p = \{\text{eighth port, ninth port}\} \\ -10, & p = \{\text{tenth port, eleventh port}\} \end{cases}$$

$$l = \{l' + l'', \; p = 0^{th} \text{ port to eleventh port}, \; l'' = 0, 1$$

where (k',l')=(10,4), the $0^{th}$ port to the eleventh port correspond to $n_s$ mod 2=1, and the CP is an extended CP and supports FDD and TDD; or $$k = k' + \begin{cases} -0, & p = \{0^{th} \text{ port, first port}\} \\ -3, & p = \{\text{second port, third port}\} \\ -6, & p = \{\text{fourth port, fifth port}\} \\ -9, & p = \{\text{sixth port, seventh port}\} \\ -2, & p = \{\text{eighth port, ninth port}\} \\ -5, & p = \{\text{tenth port, eleventh port}\} \end{cases}$$

$$l = \{l' + l'', \; p = 0^{th} \text{ port to eleventh port}, \; l'' = 0, 1$$

where (k',l')=(11,1), the $0^{th}$ port to the eleventh port correspond to $n_s$ mod 2=1, and the CP is an extended CP and supports only TDD; or $$k = k' + \begin{cases} -0, & p = \{0^{th} \text{ port, first port}\} \\ -3, & p = \{\text{second port, third port}\} \\ -6, & p = \{\text{fourth port, fifth port}\} \\ -9, & p = \{\text{sixth port, seventh port}\} \\ -7, & p = \{\text{eighth port, ninth port}\} \\ -10, & p = \{\text{tenth port, eleventh port}\} \end{cases}$$

$l = \{l' + l''\}, p = 0^{th}$ port to eleventh port, $l'' = 0, 1$ where (k',l')=(10,1), the $0^{th}$ port to the eleventh port correspond to $n_s$ mod 2=1, and the CP is an extended CP and supports only TDD; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -4, & p = \{\text{eighth port, ninth port}\} \\ -10, & p = \{\text{tenth port, eleventh port}\} \end{cases}$$

$l = \{l' + l''\}, p = 0^{th}$ port to eleventh port, $l'' = 0, 1$ where (k',l')=(11,2), the $0^{th}$ port to the eleventh port correspond to $n_s$ mod 2=1, and the CP is a normal CP and supports FDD and TDD; and in the foregoing formulas, p is a port number, k' is a number of a subcarrier in each PRB pair, l' is a number of an OFDM symbol in each slot, and a spreading factor satisfies the following condition:

spreading factor $w_{l''} =$ $$\begin{cases} 1, & p = \begin{cases} 0^{th} \text{ port, second port, fourth port} \\ \text{sixth port, eighth port, tenth port} \end{cases} \\ (-1)^{l''}, & p = \begin{cases} \text{first port, third port, fifth port} \\ \text{seventh port, ninth port, eleventh port} \end{cases} \end{cases}$$

With reference to the thirteenth possible implementation of the first aspect, in a thirty-first possible implementation of the first aspect, if X=16, $X_1$=8, and $X_2$=8, a time-frequency resource location of the second reference signal resource mapping diagram is (k,l), k is a subcarrier number of a resource element (RE), and l is a symbol corresponding to the RE, $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -4, & p = \{\text{eighth port, ninth port}\} \\ -10, & p = \{\text{tenth port, eleventh port}\} \\ -5, & p = \{\text{twelfth port, thirteenth port}\} \\ -11, & p = \{\text{fourteenth port, fifteenth port}\} \end{cases},$$

$l = \{l' + l''\}, p = 0^{th}$ port to fifteenth port, $l'' = 0, 1$;

where (k',l')=(11,2), the $0^{th}$ port to the fifteenth port correspond to $n_s$ mod 2=1, and the CP is a normal CP and supports FDD and TDD; and in the foregoing formulas, p is a port number, k' is a number of a subcarrier in each PRB pair, l' is a number of an OFDM symbol in each slot, and a spreading factor satisfies the following condition:

spreading factor $w_{l''} =$ $$\begin{cases} 1, & p = \begin{cases} 0^{th} \text{ port, second port, fourth port} \\ \text{sixth port, eighth port, tenth port} \\ \text{twelfth port, fourteenth port} \end{cases} \\ (-1)^{l''}, & p = \begin{cases} \text{first port, third port, fifth port} \\ \text{seventh port, ninth port, eleventh port} \\ \text{thirteenth port, fourteenth port} \end{cases} \end{cases}.$$

With reference to any one of the first aspect or the first to the thirty-first possible implementations of the first aspect, in a thirty-second possible implementation of the first aspect, the method further includes: receiving a configuration index that is notified by the base station by using signaling and that is of the second reference signal resource mapping diagram, and determining, according to the configuration index of the second reference signal resource mapping diagram, a time-frequency resource location corresponding to the second reference signal resource mapping diagram.

With reference to any one of the first aspect or the first to the thirty-first possible implementations of the first aspect, in a thirty-third possible implementation of the first aspect, if the second reference signal resource mapping diagram includes at least two first reference signal resource mapping diagrams of different quantities of ports, configuration information that is separately notified by the base station and that is of each first reference signal resource mapping diagram included in the second reference signal resource mapping diagram is received, and the second reference signal resource mapping diagram is obtained according to the at least two first reference signal resource mapping diagrams of different quantities of ports.

With reference to the thirty-third possible implementation of the first aspect, in a thirty-fourth possible implementation of the first aspect, in all configurations of the second reference signal resource mapping diagram of a same quantity of ports, there are two configurations whose resource mapping diagrams have overlapping resources.

With reference to the thirty-third possible implementation of the first aspect, in a thirty-fifth possible implementation of the first aspect, a range of a resource mapping diagram corresponding to the received configuration information that is notified by the base station and that is of each first reference signal resource mapping diagram included in the second reference signal resource mapping diagram is a set of all first reference signal resource mapping diagrams.

With reference to the thirty-third possible implementation of the first aspect, in a thirty-sixth possible implementation of the first aspect, a range of a resource mapping diagram corresponding to the received configuration information that is notified by the base station and that is of each first reference signal resource mapping diagram included in the second reference signal resource mapping diagram is a subset of a set of all first reference signal resource mapping diagrams.

With reference to any one of the first aspect or the first to the thirty-first possible implementations of the first aspect, in a thirty-seventh possible implementation of the first aspect, an index that is notified by the base station and that is of a resource mapping diagram of a second reference signal whose port quantity is $X_1$ is received, and a resource mapping diagram of a second reference signal whose port quantity is $X_2$ is obtained according to a preset rule, where $X_1$ and $X_2$ are integers that are not equal, and $X_1$ is greater than $X_2$.

With reference to the thirty-seventh possible implementation of the first aspect, in a thirty-eighth possible implementation of the first aspect, the preset rule is: Resources corresponding to the $M^{th}$ port to the $(M+X2-1)^{th}$ port in X1 ports are the resource mapping diagram of the second reference signal whose port quantity is X2, and M is an integer greater than or equal to 0 and less than or equal to X1-X2-1.

With reference to any one of the first aspect or the first to the thirty-first possible implementations of the first aspect, in a thirty-ninth possible implementation of the first aspect, an index of a resource mapping diagram of a first reference signal whose port quantity is X1 and an index of a resource mapping diagram of a first reference signal whose port quantity is X2 of the UE that are notified by the base station are received, and a resource mapping diagram of a second reference signal whose port quantity is X1-X2 is determined according to the foregoing information, where X1 is an integer greater than X2.

With reference to the thirty-ninth possible implementation of the first aspect, in a fortieth possible implementation of the first aspect, the first reference signal whose port quantity is X1 is a non-zero power reference signal, and the first reference signal whose port quantity is X2 is a zero power reference signal.

With reference to the first aspect, in a forty-first possible implementation of the first aspect, if a mapping diagram of a second reference signal whose port quantity is X includes a resource mapping diagram of a first reference signal whose port quantity is X1 and a resource mapping diagram of a first reference signal whose port quantity is X2, the X1-port first reference signal resource mapping diagram and the X2-port first reference signal resource mapping diagram occupy different OFDM symbol pairs in a PRB pair, the X1-port first reference signal resource mapping diagram corresponds to resources occupied by the $0^{th}$ port to the $(X1-1)^{th}$ port in the second reference signal whose port quantity is X, and the X2-port first reference signal resource mapping diagram corresponds to resources occupied by the $X1^{th}$ port to the $(X-1)^{th}$ port in the second reference signal whose port quantity is X, for the second reference signal whose port quantity is X, locations of OFDM symbol pairs of the $0^{th}$ port to the $(X1-1)^{th}$ port and the $X1^{th}$ port to the $(X-1)^{th}$ port in a PRB pair are respectively interchangeable with locations of OFDM symbol pairs of the $0^{th}$ port to the $(X1-1)^{th}$ port and the $X1^{th}$ port to the $(X1-1)^{th}$ port in a neighbouring PRB pair, where X=X1+X2, and X, X1, and X2 are positive integers.

With reference to the forty-first possible implementation of the first aspect, in a forty-second possible implementation of the first aspect, if X=12, $X_1$=8, and $X_2$=4, a time-frequency resource location of the second reference signal resource mapping diagram is (k,l), k is a subcarrier number of a resource element (RE), and l is a symbol corresponding to the RE, $$k = k' + \begin{cases} -0, & p = \{0^{th}\ \text{port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$l = \{l' + l''$, $p = 0^{th}$ port to eleventh port, $l'' = 0, 1$ where (k',l')=(9,5), the $0^{th}$ port to the seventh port correspond to $n_s$ mod 2=1, the eighth port to the eleventh port correspond to $n_s$ mod 2=1, the CP is a normal CP and supports FDD and TDD, PRB pair X mod 2=0, and X is a number of a PRB pair;

$$k = k' + \begin{cases} -0, & p = \{0^{th}\ \text{port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$l = \{l' + l''$, $p = 0^{th}$ port to eleventh port, $l'' = 0, 1$ where (k',l')=(9,5), the $0^{th}$ port to the seventh port correspond to $n_s$ mod 2=1, the eighth port to the eleventh port correspond to, $n_s$ mod 2=0, the CP is a normal CP and supports FDD and TDD, and PRB pair X mod 2=1; or $$k = k' + \begin{cases} -0, & p = \{0^{th}\ \text{port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$l = \{l' + l''$, $p = 0^{th}$ port to eleventh port $l'' = 0, 1$ where (k',l')=(9,5), the $0^{th}$ port to the seventh port correspond to $n_s$ mod 2=0, the eighth port to the eleventh port correspond to $n_s$ mod 2=1, the CP is a normal CP and supports FDD and TDD, PRB pair X mod 2=1, and X is a number of a PRB pair; and $$k = k' + \begin{cases} -0, & p = \{0^{th}\ \text{port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$l = \{l' + l''$, $p = 0^{th}$ port to eleventh port, $l'' = 0, 1$ where (k',l')=(9,5), the $0^{th}$ port to the seventh port correspond to $n_s$ mod 2=1, the eighth port to the eleventh port correspond to, $n_s$ mod 2=0, the CP is a normal CP and supports FDD and TDD, and PRB pair X mod 2=0; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$$l = \begin{cases} l' + l'', & p = 0^{th} \text{ port to seventh port} \\ l' - 3 + l'', & p = \text{eighth port to eleventh port}, l'' = 0, 1 \end{cases}$$

where (k',l')=(9,5), the $0^{th}$ port to the seventh port correspond to $n_s$ mod 2=0, the eighth port to the eleventh port correspond to $n_s$ mod 2=1, the CP is a normal CP and supports FDD and TDD, PRB pair X mod 2=0, and X is a number of a PRB pair; and $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$$l = \begin{cases} l' + l'', & p = 0^{th} \text{ port to seventh port} \\ l' + 3 + l'', & p = \text{eighth port to eleventh port}, l'' = 0, 1 \end{cases}$$

where (k',l')=(9,2), the $0^{th}$ port to the seventh port correspond to $n_s$ mod 2=1, the eighth port to the eleventh port correspond to $n_s$ mod 2=0, the CP is a normal CP and supports FDD and TDD, and PRB pair X mod 2=0; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$$l = \begin{cases} l' + l'', & p = 0^{th} \text{ port to seventh port} \\ l' - 3 + l'', & p = \text{eighth port to eleventh port}, l'' = 0, 1 \end{cases}$$

where (k',l')=(9,5), the $0^{th}$ port to the seventh port correspond to $n_s$ mod 2=0, the eighth port to the eleventh port correspond to $n_s$ mod 2=1, the CP is a normal CP and supports FDD and TDD, PRB pair X mod 2=1, and X is a number of a PRB pair;

$$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$$l = \begin{cases} l' + l'', & p = 0^{th} \text{ port to seventh port} \\ l' + 3 + l'', & p = \text{eighth port to eleventh port}, l'' = 0, 1 \end{cases}$$

where (k',l')=(9,2), the $0^{th}$ port to the seventh port correspond to $n_s$ mod 2=1, the eighth port to the eleventh port correspond to $n_s$ mod 2=0, the CP is a normal CP and supports FDD and TDD, and PRB pair X mod 2=0; and in the foregoing formulas, p is a port number, k' is a number of a subcarrier in each PRB pair, l' is a number of an OFDM symbol in each slot, and a spreading factor satisfies the following condition:

spreading factor $w_{l''} =$ $$\begin{cases} 1, & p = \begin{Bmatrix} 0^{th} \text{ port, second port, fourth port} \\ \text{sixth port, eighth port, tenth port} \end{Bmatrix} \\ (-1)^{l''}, & p = \begin{Bmatrix} \text{first port, third port, fifth port} \\ \text{seventh port, ninth port, tenth port} \end{Bmatrix} \end{cases}.$$

With reference to the forty-first possible implementation of the first aspect, in a forty-third possible implementation of the first aspect, if X=16, $X_1$=8, and $X_2$=8, a time-frequency resource location of the second reference signal resource mapping diagram is (k,l), k is a subcarrier number of a resource element (RE), and l is a symbol corresponding to the RE, $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

$$l = \begin{cases} l' + l'', & p = 0^{th} \text{ port to seventh port} \\ l' - 3 + l'', & p = \text{eighth port to eleventh port}, l'' = 0, 1 \end{cases}$$

where (k',l')=(9,5), the $0^{th}$ port to the seventh port correspond to $n_s$ mod 2=1, the eighth port to the fifteenth port correspond to $n_s$ mod 2=1, the CP is a normal CP and supports FDD and TDD, PRB pair X mod 2=0, and X is a number of a PRB pair; and $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

-continued $$l = \begin{cases} l' + l'', & p = 0^{th} \text{ port to seventh port} \\ l' + 3 + l'', & p = \text{eighth port to eleventh port}, l'' = 0, 1 \end{cases}$$

where (k',l')=(9,2), the $0^{th}$ port to the seventh port correspond to $n_s$ mod 2=1, the eighth port to the fifteenth port correspond to $n_s$ mod 2=1, the CP is a normal CP and supports FDD and TDD, and PRB pair X mod 2=1; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

$$l = \begin{cases} l' + l'', & p = 0^{th} \text{ port to seventh port} \\ l' - 3 + l'', & p = \text{eighth port to eleventh port}, l'' = 0, 1 \end{cases}$$

where (k',l')=(9,5), the $0^{th}$ port to the seventh port correspond to $n_s$ mod 2=0, the eighth port to the fifteenth port correspond to $n_s$ mod 2=1, the CP is a normal CP and supports FDD and TDD, PRB pair X mod 2=1, and X is a number of a PRB pair; and $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

$$l = \begin{cases} l' + l'', & p = 0^{th} \text{ port to seventh port} \\ l' + 3 + l'', & p = \text{eighth port to eleventh port}, l'' = 0, 1 \end{cases}$$

where (k',l')=(9,2), the $0^{th}$ port to the seventh port correspond to $n_s$ mod 2=1, the eighth port to the fifteenth port correspond to $n_s$ mod 2=1, the CP is a normal CP and supports FDD and TDD, and PRB pair X mod 2=0; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

$$l = \begin{cases} l' + l'', & p = 0^{th} \text{ port to seventh port} \\ l' - 3 + l'', & p = \text{eighth port to eleventh port}, l'' = 0, 1 \end{cases}$$

where (k',l')=(9,5), the $0^{th}$ port to the fifteenth port correspond to $n_s$ mod 2=1, the CP is a normal CP and supports FDD and TDD, PRB pair X mod 2=0, and X is a number of a PRB pair; and $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

$$l = \begin{cases} l' + l'', & p = 0^{th} \text{ port to seventh port} \\ l' + 3 + l'', & p = \text{eighth port to eleventh port}, l'' = 0, 1 \end{cases}$$

where (k',l')=(9,2), the $0^{th}$ port to the fifteenth port correspond to $n_s$ mod 2=1, the CP is a normal CP and supports FDD and TDD, and PRB pair X mod 2=1; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

$$l = \begin{cases} l' + l'', & p = 0^{th} \text{ port to seventh port} \\ l' - 3 + l'', & p = \text{eighth port to eleventh port}, l'' = 0, 1 \end{cases}$$

where (k',l')=(9,5), the $0^{th}$ port to the fifteenth port correspond to $n_s$ mod 2=1, the CP is a normal CP and supports FDD and TDD, and PRB pair X mod 2=1, and X is a number of a PRB pair;

$$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

$$l = \begin{cases} l' + l'', & p = 0^{th} \text{ port to seventh port} \\ l' + 3 + l'', & p = \text{eighth port to eleventh port}, l'' = 0, 1 \end{cases}$$

where (k',l') (9,2), the $0^{th}$ port to the fifteenth port correspond to $n_s$ mod 2=1, the CP is a normal CP and supports FDD and TDD, and PRB pair X mod 2=0; and in the foregoing formulas, p is a port number, k' is a number of a subcarrier in each PRB pair, l' is a number of an OFDM symbol in each slot, and a spreading factor satisfies the following condition:

spreading factor $w_{l''} =$ $$\begin{cases} 1, & p = \begin{Bmatrix} 0^{th}\text{ port, second port, fourth port, sixth port} \\ \text{eighth port, tenth port, twelfth port, fourteenth port} \end{Bmatrix} \\ (-1)^{l'''}, & p = \begin{Bmatrix} \text{first port, third port, fifth port, seventh port} \\ \text{ninth port, eleventh port, thirteenth port, fifteenth port} \end{Bmatrix} \end{cases}.$$

According to a second aspect, a channel measurement method is provided, including:

configuring, by a base station, a reference signal resource mapping diagram;

sending, by the base station, the reference signal resource mapping diagram to user equipment UE; and receiving, by the base station, channel state information fed back by the UE, where the reference signal resource mapping diagram is a location to which a time-frequency resource of the reference signal is mapped, the reference signal resource mapping diagram is a first reference signal resource mapping diagram or a second reference signal resource mapping diagram, and an association relationship exists between each of K2 second reference signal resource mapping diagrams and at least one of K1 first reference signal resource mapping diagrams, where K2 is a quantity of the second reference signal resource mapping diagrams, K1 is a quantity of the first reference signal resource mapping diagrams, and K1 and K2 are integers greater than or equal to 1; and the first reference signal resource mapping diagram is a Y-port reference signal resource mapping diagram, the second reference signal resource mapping diagram is an X-port reference signal resource mapping diagram, Y is an integer less than or equal to 8 and satisfying $2^n$, and X is an integer greater than 8 or an integer less than 8 and not satisfying $2^n$.

With reference to the second aspect, in a first possible implementation of the second aspect, when X is greater than 8, X does not satisfy $2^n$, and n is an integer greater than or equal to 0.

With reference to the second aspect or the first possible implementation of the second aspect, in a second possible implementation of the second aspect, the association relationship is: Time-frequency resources and code resources of X consecutive ports in Y ports of any one of the K2 second reference signal resource mapping diagrams are the same as time-frequency resources and code resources of X consecutive ports in Y ports of any one of the K1 first reference signal resource mapping diagrams, where Y is an integer closest to X and satisfying $2^n$ in integers greater than X, and the code resource is an orthogonal spreading code or a sequence of a reference signal.

With reference to the second possible implementation of the second aspect, in a third possible implementation of the second aspect, the X consecutive ports are the $0^{th}$ port to the $(X-1)^{th}$ port in the Y ports, or the X consecutive ports are the $(Y-X)^{th}$ port to the $(Y-1)^{th}$ port in the Y ports.

With reference to the second or the third possible implementation of the second aspect, in a fourth possible implementation of the second aspect, K2=K1, or $$K2 = \left\lceil \frac{Y*K1}{X} \right\rceil,$$

and $\lceil \: \rceil$ represents rounding down.

With reference to any one of the second aspect or the first to the fourth possible implementations of the second aspect, in a fifth possible implementation of the second aspect, at least one of the K2 second reference signal resource mapping diagrams includes time-frequency resources of at least two of the first reference signal resource mapping diagrams.

With reference to the fifth possible implementation of the second aspect, in a sixth possible implementation of the second aspect, an X-port second reference signal resource mapping diagram in the K2 second reference signal resource mapping diagrams includes K3 first reference signal resource mapping diagrams, each of the K3 first reference signal resource mapping diagrams includes time-frequency resources corresponding to H ports, H=X/K3, and K3 is a positive integer less than X.

With reference to the sixth possible implementation of the second aspect, in a seventh possible implementation of the second aspect, the H ports are the $0^{th}$ port to the $(H-1)^{th}$ port or the $(Y-H)^{th}$ port to the $(Y-1)^{th}$ port in the first reference signal resource mapping diagram.

With reference to the second aspect or the first possible implementation of the second aspect, in an eighth possible implementation of the second aspect, the method further includes: sending, by the base station, the second reference signal resource mapping diagram to the UE, where the $X_1$-port second reference signal resource mapping diagram includes an $X_1$-port reference signal resource mapping diagram and an $X_2$-port reference signal resource mapping diagram;

$X_1+X_2=X$, a difference between $X_1$ and $X_2$ is less than 2, the $X_1$-port reference signal resource mapping diagram and the $X_2$-port reference signal resource mapping diagram are obtained by the UE from m subframes, and m is 1 or 2; and the $X_1$-port reference signal resource mapping diagram is the first reference signal resource mapping diagram and the $X_2$-port reference signal resource mapping diagram is the second reference signal resource mapping diagram; or the $X_1$-port reference signal resource mapping diagram and the $X_2$-port reference signal resource mapping diagram both are the second reference signal resource mapping diagrams.

With reference to the seventh possible implementation of the second aspect, in a ninth possible implementation of the second aspect, X is an integer greater than 8.

With reference to the eighth or the ninth possible implementation of the second aspect, in a tenth possible implementation of the second aspect, the method further includes:

notifying, by the base station, the UE of a sequence of subframes carrying the $X_1$-port reference signal resource mapping diagram and the $X_2$-port reference signal resource mapping diagram; or a sequence of subframes carrying the $X_1$-port reference signal resource mapping diagram and the $X_2$-port reference signal resource mapping diagram is preset, where the sequence is a descending order of port quantities or an ascending order of port quantities.

With reference to the eighth or the ninth possible implementation of the second aspect, in an eleventh possible implementation of the second aspect, the method further includes:

notifying, by the base station, the UE of a number of a subframe carrying the $X_1$-port reference signal resource mapping diagram and a number of a subframe carrying the $X_2$-port reference signal resource mapping diagram; or notifying, by the base station, the UE of a number of a subframe carrying the $X_1$-port reference signal resource mapping diagram and a subframe interval between a subframe carrying the $X_2$-port reference signal resource mapping diagram and the subframe carrying the $X_1$-port reference signal resource mapping diagram.

With reference to the second aspect or the first possible implementation of the second aspect, in a twelfth possible implementation of the second aspect, the method further includes:

sending, by the base station, the second reference signal resource mapping diagram to the UE, where the second reference signal resource mapping diagram includes each of an $X_1$-port reference signal resource mapping diagram, an $X_2$-port reference signal resource mapping diagram, . . . , and an $X_i$-port reference signal resource mapping diagram, $X_1+X_2 \ldots +X_i=X$, and each of $X_1, X_2, \ldots, X_i$ can be represented as $2^n$; and the $X_1$-port reference signal resource mapping diagram, the $X_2$-port reference signal resource mapping diagram, . . . , and the $X_i$-port reference signal resource mapping diagram are obtained by the UE from at least one subframe.

With reference to the twelfth possible implementation of the second aspect, in a thirteenth possible implementation of the second aspect, each of the $X_1$-port reference signal resource mapping diagram, the $X_2$-port reference signal resource mapping diagram, . . . , and the $X_i$-port reference signal resource mapping diagram is the first reference signal resource mapping diagram; and each of $X_1, X_2, \ldots, X_i$ is less than or equal to 8 and values of n corresponding to $X_1, X_2, \ldots, X_i$ are different.

With reference to the twelfth or the thirteenth possible implementation of the second aspect, in a fourteenth possible implementation of the second aspect, X is an integer greater than 8.

With reference to the twelfth to the fourteenth possible implementations of the second aspect, in a fifteenth possible implementation of the second aspect, the $X_1$-port reference signal resource mapping diagram, the $X_2$-port reference signal resource mapping diagram, . . . , and the $X_i$-port reference signal resource mapping diagram are sent by the base station in one subframe; or the $X_1$-port reference signal resource mapping diagram, the $X_2$-port reference signal resource mapping diagram, . . . , and the $X_i$-port reference signal resource mapping diagram are sent by the base station in i subframes.

With reference to any one of the twelfth to the fifteenth possible implementations of the second aspect, in a sixteenth possible implementation of the second aspect, the method further includes:

notifying, by the base station, the UE of a sequence of subframes carrying the $X_1$-port reference signal resource mapping diagram, the $X_2$-port reference signal resource mapping diagram, . . . , and the $X_i$-port reference signal resource mapping diagram; or a sequence of subframes carrying the $X_1$-port reference signal resource mapping diagram, the $X_2$-port reference signal resource mapping diagram, . . . , and the $X_i$-port reference signal resource mapping diagram is predefined, where the sequence of the subframes is an ascending order of port quantities, or a descending order of port quantities, or a sequence of a largest port quantity, a smallest port quantity, a second largest port quantity, a second smallest port quantity . . . .

With reference to any one of the twelfth to the fifteenth possible implementations of the second aspect, in a seventeenth possible implementation of the second aspect, the method further includes:

notifying, by the base station, the UE of configuration information of each of the $X_1$-port reference signal resource mapping diagram, the $X_2$-port reference signal resource mapping diagram, . . . , and the $X_u$-port reference signal resource mapping diagram; or sending, by the base station, joint coding signaling to the UE, where the joint coding signaling is used to indicate configuration information of the $X_1$-port reference signal resource mapping diagram, configuration information of the $X_2$-port reference signal resource mapping diagram, . . . , and configuration information of the $X_i$-port reference signal resource mapping diagram; or notifying, by the base station, the UE of configuration information of the $X_1$-port reference signal resource mapping diagram and a correspondence between configuration information of an $X_j$-port reference signal resource mapping diagram and the configuration information of the $X_1$-port reference signal resource mapping diagram, where j is an integer greater than 1 and less than or equal to i; or configuration information of the $X_1$-port reference signal resource mapping diagram, configuration information of the $X_2$-port reference signal resource mapping diagram, . . . , and configuration information of the $X_i$-port reference signal resource mapping diagram are predefined.

With reference to any one of the twelfth to the sixteenth possible implementations of the second aspect, in an eighteenth possible implementation of the second aspect, a number of the subframe carrying the $X_1$-port reference signal resource mapping diagram, a number of the subframe carrying the $X_2$-port reference signal resource mapping diagram, . . . , and a number of the subframe carrying the $X_i$-port reference signal resource mapping diagram are predefined; or the base station notifies the UE of a number of the subframe carrying the $X_1$-port reference signal resource mapping diagram, a number of the subframe carrying the $X_2$-port reference signal resource mapping diagram, . . . , and a number of the subframe carrying the $X_i$-port reference signal resource mapping diagram; or the base station notifies the UE of a number of the subframe carrying the $X_1$-port reference signal resource mapping diagram and a subframe interval between a subframe carrying an $X_j$-port reference signal resource mapping diagram and the subframe carrying the $X_1$-port reference signal resource mapping diagram, where j is an integer greater than 1 and less than or equal to i.

With reference to the thirteenth possible implementation of the second aspect, in a nineteenth possible implementation of the second aspect, if an $X_i$-port reference signal resource mapping diagram and the $X_j$-port reference signal resource mapping diagram are in different subframes, t is an integer greater than or equal to 1 and less than or equal to i, and t is not equal to j, the $X_i$-port reference signal resource mapping diagram and the $X_j$-port reference signal resource mapping diagram have L same relative time-frequency resource locations in each PRB pair, where L is a smallest value in $X_i, X_j$; or time-frequency resource locations of the $X_i$-port reference signal resource mapping diagram and the $X_j$-port reference signal resource mapping diagram in each PRB pair are different.

With reference to the thirteenth possible implementation of the second aspect, in a twentieth possible implementation of the second aspect, there are Q same relative time-frequency resource locations in time-frequency resource locations of the $X_1$-port reference signal resource mapping diagram, the $X_2$-port reference signal resource mapping diagram, . . . , and the $X_i$-port reference signal resource mapping diagram, and the relative time-frequency resource location is a time-frequency resource location of a reference signal resource mapping diagram in each PRB pair.

With reference to the twentieth possible implementation of the second aspect, in a twenty-first possible implementation of the second aspect, Q is a smallest value in $X_1, X_2 \ldots X_i$.

With reference to the thirteenth possible implementation of the second aspect, in a twenty-second possible implementation of the second aspect, there are Q same subcarriers in time-frequency resource locations of the $X_1$-port reference signal resource mapping diagram, the $X_2$-port reference signal resource mapping diagram, . . . , and the $X_i$-port reference signal resource mapping diagram, and Q is an integer greater than 1.

With reference to the twenty-second possible implementation of the second aspect, in a twenty-third possible implementation of the second aspect, the Q same subcarriers are subcarriers occupied by an L-port reference signal resource mapping diagram, and L is a smallest value in $X_1, X_2 \ldots X_i$.

With reference to the thirteenth possible implementation of the second aspect, in a twenty-fourth possible implementation of the second aspect, subcarriers corresponding to time-frequency resource locations of the $X_1$-port reference signal resource mapping diagram, the $X_2$-port reference signal resource mapping diagram, . . . , and the $X_i$-port reference signal resource mapping diagram are different.

With reference to the twelfth to the fifteenth possible implementations of the second aspect, in a twenty-fifth possible implementation of the second aspect, orthogonal frequency division multiplexing (OFDM) symbols occupied by time-frequency resource locations of the $X_1$-port reference signal resource mapping diagram, the $X_2$-port reference signal resource mapping diagram, . . . , and the $X_i$-port reference signal resource mapping diagram are the same.

With reference to the twentieth possible implementation of the second aspect, in a twenty-sixth possible implementation of the second aspect, the Q same time-frequency resource locations are time-frequency resource locations corresponding to the $0^{th}$ port to the $(Q-1)^{th}$ port in the $X_j$-port reference signal resource mapping diagram, where $X_j$ is a smallest value in $X_1, X_2 \ldots X_i$.

With reference to the second possible implementation of the second aspect, in a twenty-seventh possible implementation of the second aspect, if X is 3, Y is 4, and K2=K1=10, a time-frequency resource location of the second reference signal resource mapping diagram is (k,l), k is a subcarrier number of a resource element (RE), and l is a symbol corresponding to the RE, $$k = k' + \begin{cases} -0, & p = \{0^{th} \text{ port, first port}\} \\ -6, & p = \{\text{second port}\} \end{cases}$$

$$l = l' + l'', l'' = 0, 1, l' = l'_1, l'_2 \ldots l'_{10}$$

$$w_{l''} = \begin{cases} -1, & p = \{0^{th} \text{ port, second port}\} \\ (-1)^{l''}, & p = \{\text{first port}\} \end{cases}$$

-continued $$(k', l') = \begin{cases} k'_0 = 9, l'_0 = 5, n_s \bmod 2 = 0 \\ \text{or } k'_1 = 11, l'_1 = 2, n_s \bmod 2 = 1 \\ \text{or } k'_2 = 9, l'_2 = 2, n_s \bmod 2 = 1 \\ \text{or } k'_3 = 7, l'_3 = 2, n_s \bmod 2 = 1 \\ \text{or } k'_4 = 9, l'_4 = 5, n_s \bmod 2 = 1 \\ \text{or } k'_5 = 8, l'_5 = 5, n_s \bmod 2 = 0 \\ \text{or } k'_6 = 10, l'_6 = 2, n_s \bmod 2 = 1 \\ \text{or } k'_7 = 8, l'_7 = 2, n_s \bmod 2 = 1 \\ \text{or } k'_8 = 6, l'_8 = 2, n_s \bmod 2 = 1 \\ \text{or } k'_9 = 8, l'_9 = 5, n_s \bmod 2 = 1 \end{cases}$$

where p is a port number, in a first configuration of the second reference signal resource mapping diagram, (k',l')=(k',l'), in a second configuration, (k',l')=(k',l') . . . , and in a tenth configuration, (k',l')=(k'$_4$,l'$_4$); $n_s$ mod 2=1 represents that the time-frequency resource location is in a second slot of a subframe, and $n_s$ mod 2=0 represents that the time-frequency resource location is in a first slot of a subframe.

With reference to the twenty-seventh possible implementation of the second aspect, in a twenty-eighth possible implementation of the second aspect, if K1=10, and K2=4*10/3, a time-frequency resource location of the second reference signal resource mapping diagram other than (k,l) is:

$$k = \begin{cases} k'_0 - 6, 0^{th} \text{ port} \\ k'_5 - 6, \text{ first port} \\ k'_1 - 4, \text{ second port,} \end{cases} \quad l = \begin{cases} l'_1 + l'' \\ l'_2 + l'' \\ l'_3 + l'', l'' = 0, 1, w_{l''} = (-1)^{l''} \end{cases} ; \text{ or}$$

$$k = \begin{cases} k'_6 - 6, 0^{th} \text{ port} \\ k'_2 - 6, \text{ first port} \\ k'_7 - 6, \text{ second port,} \end{cases} \quad l = \begin{cases} l'_4 + l'' \\ l'_5 + l'' \\ l'_6 + l'', l'' = 0, 1, w_{l''} = (-1)^{l''} \end{cases} ; \text{ or}$$

$$k = \begin{cases} k'_3 - 6, 0^{th} \text{ port} \\ k'_8 - 6, \text{ first port} \\ k'_4 - 6, \text{ second port,} \end{cases} \quad l = \begin{cases} l'_7 + l'' \\ l'_8 + l'' \\ l'_9 + l'', l'' = 0, 1, w_{l''} = (-1)^{l''} \end{cases} ;$$

$$(k', l') = \begin{cases} k'_0 = 9, l'_0 = 5, n_s \bmod 2 = 0 \\ \text{or } k'_1 = 11, l'_1 = 2, n_s \bmod 2 = 1 \\ \text{or } k'_2 = 9, l'_2 = 2, n_s \bmod 2 = 1 \\ \text{or } k'_3 = 7, l'_3 = 2, n_s \bmod 2 = 1 \\ \text{or } k'_4 = 9, l'_4 = 5, n_s \bmod 2 = 1 \\ \text{or } k'_5 = 8, l'_5 = 5, n_s \bmod 2 = 0 \\ \text{or } k'_6 = 10, l'_6 = 2, n_s \bmod 2 = 1 \\ \text{or } k'_7 = 8, l'_7 = 2, n_s \bmod 2 = 1 \\ \text{or } k'_8 = 6, l'_8 = 2, n_s \bmod 2 = 1 \\ \text{or } k'_9 = 8, l'_9 = 5, n_s \bmod 2 = 1 \end{cases}.$$

With reference to the second possible implementation of the second aspect, in a twenty-ninth possible implementation of the second aspect, if X is 5, Y is 8, and K2=K1=5, a time-frequency resource location of the second reference signal resource mapping diagram is (k,l), k is a subcarrier number of the RE, and l is a symbol corresponding to the RE, $$k = k' + \begin{cases} -0, & p = \{0^{th}\text{ port, first port}\} \\ -6, & p = \{\text{second port, third port}\} \\ -1, & p = \{\text{fourth port}\} \end{cases}$$

$$l = l' + l'', l'' = 0, 1, l' = l'_1, l'_2 \ldots l'_5$$

spreading factor $w_{l''} =$ $$\begin{cases} 1, & p = \{0^{th}\text{ port, second port, fourth port}\} \\ (-1)^{l''}, & p = \{\text{first port, third port}\} \end{cases}$$

$$(k', l') = \begin{cases} k'_0 = 9, l'_0 = 5, n_s\text{mod}2 = 0 \\ \text{or } k'_1 = 11, l'_1 = 2, n_s\text{mod}2 = 1 \\ \text{or } k'_2 = 9, l'_2 = 2, n_s\text{mod}2 = 1 \\ \text{or } k'_3 = 7, l'_3 = 2, n_s\text{mod}2 = 1 \\ \text{or } k'_4 = 9, l'_4 = 5, n_s\text{mod}2 = 1 \end{cases}$$

where p is a port number, in a first configuration of the second reference signal resource mapping diagram, (k',l')=(k',l'), in a second configuration, (k',l')=(k',l') ..., and in a fifth configuration, (k',l')=(k',l'); $n_s$ mod 2=1 represents that the time-frequency resource location is in a second slot of a subframe, and $n_s$ mod 2=0 represents that the time-frequency resource location is in a first slot of a subframe.

With reference to the thirteenth possible implementation of the second aspect, in a thirtieth possible implementation of the second aspect, if X=12, $X_1$=8, and $X_2$=4, a time-frequency resource location of the second reference signal resource mapping diagram is (k,l), k is a subcarrier number of a resource element (RE), and l is a symbol corresponding to the RE, $$k = k' + \begin{cases} -0, & p = \{0^{th}\text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases},$$

$$l = \begin{cases} l' + l'', & p = 0^{th}\text{ port to seventh port} \\ l' - 3 + l'', & p = \text{eighth port to eleventh port}, l'' = 0, 1 \end{cases};$$

where (k',l')=(9,5), the $0^{th}$ port to the seventh port correspond to $n_s$ mod 2=0, the eighth port to the eleventh port correspond to $n_s$ mod 2=1 and the CP is a normal CP and supports frequency division multiplexing (FDD) and time division multiplexing (TDD); or $$k = k' + \begin{cases} -0, & p = \{0^{th}\text{ port, first port}\} \\ -6, & p = \{\text{second port, third port}\} \\ -1, & p = \{\text{fourth port, fifth port}\} \\ -7, & p = \{\text{sixth port, seventh port}\} \\ -1, & p = \{\text{eighth port, ninth port}\} \\ -7, & p = \{\text{tenth port, eleventh port}\} \end{cases}$$

$$l = \begin{cases} l' + l'', & p = 0^{th}\text{ port to seventh port} \\ l' - 3 + l'', & p = \text{eighth port to eleventh port}, l'' = 0, 1 \end{cases};$$

where (k',l')=(9,5), the $0^{th}$ port to the seventh port correspond to $n_s$ mod 2=0, the eighth port to the eleventh port correspond to $n_s$ mod 2=1 and the CP is a normal CP and supports FDD and TDD; or $$k = k' + \begin{cases} -0, & p = \{0^{th}\text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$$l = \begin{cases} l' + l'', & p = 0^{th}\text{ port to seventh port} \\ l' - 3 + l'', & p = \text{eighth port to eleventh port}, l'' = 0, 1 \end{cases};$$

where (k',l')=(9,5), the $0^{th}$ port to the eleventh port correspond to $n_s$ mod 2=1, and the CP is a normal CP and supports FDD and TDD; or $$k = k' + \begin{cases} -0, & p = \{0^{th}\text{ port, first port}\} \\ -6, & p = \{\text{second port, third port}\} \\ -1, & p = \{\text{fourth port, fifth port}\} \\ -7, & p = \{\text{sixth port, seventh port}\} \\ -1, & p = \{\text{eighth port, ninth port}\} \\ -7, & p = \{\text{tenth port, eleventh port}\} \end{cases}$$

$$l = \begin{cases} l' + l'', & p = 0^{th}\text{ port to seventh port} \\ l' - 3 + l'', & p = \text{eighth port to eleventh port}, l'' = 0, 1 \end{cases}$$

where (k',l')=(9,5), the $0^{th}$ port to the eleventh port correspond to $n_s$ mod 2=1, and the CP is a normal CP and supports FDD and TDD; or $$k = k' + \begin{cases} -0, & p = \{0^{th}\text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$$l = \{l' + l'', \quad p = 0^{th}\text{ port to eleventh port}, l'' = 0, 1$$

where (k',l')=(9,5), the $0^{th}$ port to the seventh port correspond to $n_s$ mod 2=0, the eighth port to the eleventh port correspond to $n_s$ mod 2=1 and the CP is a normal CP and supports FDD and TDD; or $$k = k' + \begin{cases} -0, & p = \{0^{th}\text{ port, first port}\} \\ -6, & p = \{\text{second port, third port}\} \\ -1, & p = \{\text{fourth port, fifth port}\} \\ -7, & p = \{\text{sixth port, seventh port}\} \\ -3, & p = \{\text{eighth port, ninth port}\} \\ -9, & p = \{\text{tenth port, eleventh port}\} \end{cases}$$

-continued $$l = \begin{cases} l', & p = 0^{th}, \text{second, fourth, sixth, eighth, or twelfth port} \\ l'+2, & p = \text{first, third, fifth, seventh, ninth, or eleventh port} \end{cases}$$

where (k',l')=(11,1), the $0^{th}$ port to the eleventh port correspond to $n_s$ mod 2=1, and the CP is a normal CP and supports only TDD; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ +2, & p = \{\text{eighth port, ninth port}\} \\ -4, & p = \{\text{tenth port, eleventh port}\} \end{cases}$$

$$l = \begin{cases} l', & p = 0^{th}, \text{second, fourth, sixth, eighth, or twelfth port} \\ l'+2, & p = \text{first, third, fifth, seventh, ninth, or eleventh port} \end{cases}$$

where (k',l')=(7,1), the $0^{th}$ port to the eleventh port correspond to $n_s$ mod 2=1, and the CP is a normal CP and supports only TDD; or $$k = k' + \begin{cases} -0, & p = \{0^{th} \text{ port, first port}\} \\ -3, & p = \{\text{second port, third port}\} \\ -6, & p = \{\text{fourth port, fifth port}\} \\ -9, & p = \{\text{sixth port, seventh port}\} \\ -8, & p = \{\text{eighth port, ninth port}\} \\ -11, & p = \{\text{tenth port, eleventh port}\} \end{cases}$$

$$l = \{l' + l'', \quad p = 0^{th} \text{ port to eleventh port}, l'' = 0, 1$$

where (k',l')=(11,4), the $0^{th}$ port to the eleventh port correspond to $n_s$ mod 2=0, and the CP is an extended CP and supports FDD and TDD; or $$k = k' + \begin{cases} -0, & p = \{0^{th} \text{ port, first port}\} \\ -3, & p = \{\text{second port, third port}\} \\ -6, & p = \{\text{fourth port, fifth port}\} \\ -9, & p = \{\text{sixth port, seventh port}\} \\ +2, & p = \{\text{eighth port, ninth port}\} \\ -1, & p = \{\text{tenth port, eleventh port}\} \end{cases}$$

$$l = \{l' + l'', \quad p = 0^{th} \text{ port to eleventh port}, l'' = 0, 1$$

where (k',l')=(9, 4), the $0^{th}$ port to the eleventh port correspond to $n_s$ mod 2=0, and the CP is an extended CP and supports FDD and TDD; or $$k = k' + \begin{cases} -0, & p = \{0^{th} \text{ port, first port}\} \\ -3, & p = \{\text{second port, third port}\} \\ -6, & p = \{\text{fourth port, fifth port}\} \\ -9, & p = \{\text{sixth port, seventh port}\} \\ -7, & p = \{\text{eighth port, ninth port}\} \\ -10, & p = \{\text{tenth port, eleventh port}\} \end{cases}$$

$$l = \{l' + l'', \quad p = 0^{th} \text{ port to eleventh port}, l'' = 0, 1$$

where (k',l')=(10,4), the $0^{th}$ port to the eleventh port correspond to $n_s$ mod 2=1, and the CP is an extended CP and supports FDD and TDD; or $$k = k' + \begin{cases} -0, & p = \{0^{th} \text{ port, first port}\} \\ -3, & p = \{\text{second port, third port}\} \\ -6, & p = \{\text{fourth port, fifth port}\} \\ -9, & p = \{\text{sixth port, seventh port}\} \\ -2, & p = \{\text{eighth port, ninth port}\} \\ -5, & p = \{\text{tenth port, eleventh port}\} \end{cases}$$

$$l = \{l' + l'', \quad p = 0^{th} \text{ port to eleventh port}, l'' = 0, 1$$

where (k',l')=(1,1), the $0^{th}$ port to the eleventh port correspond to $n_s$ mod 2=1, and the CP is an extended CP and supports only TDD; or $$k = k' + \begin{cases} -0, & p = \{0^{th} \text{ port, first port}\} \\ -3, & p = \{\text{second port, third port}\} \\ -6, & p = \{\text{fourth port, fifth port}\} \\ -9, & p = \{\text{sixth port, seventh port}\} \\ -7, & p = \{\text{eighth port, ninth port}\} \\ -10, & p = \{\text{tenth port, eleventh port}\} \end{cases}$$

$$l = \{l' + l'', \quad p = 0^{th} \text{ port to eleventh port}, l'' = 0, 1$$

where (k',l')=(10,1), the $0^{th}$ port to the eleventh port correspond to $n_s$ mod 2=1, and the CP is an extended CP and supports only TDD; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -4, & p = \{\text{eighth port, ninth port}\} \\ -10, & p = \{\text{tenth port, eleventh port}\} \end{cases}$$

$$l = \{l' + l'', \quad p = 0^{th} \text{ port to eleventh port}, l'' = 0, 1$$

where (k',l')=(11,2), the $0^{th}$ port to the eleventh port correspond to $n_s$ mod 2=1, and the CP is a normal CP and supports FDD and TDD; and in the foregoing formulas, p is a port number, k' is a number of a subcarrier in each PRB pair, l' is a number of an OFDM symbol in each slot, and a spreading factor satisfies the following condition:

spreading factor $w_{l''} =$ $$\begin{cases} 1, & p = \begin{cases} 0^{th} \text{ port, second port, fourth port} \\ \text{sixth port, eighth port, tenth port} \end{cases} \\ (-1)^{l''}, & p = \begin{cases} \text{first port, third port, fifth port} \\ \text{seventh port, ninth port, tenth port} \end{cases} \end{cases}.$$

With reference to the thirteenth possible implementation of the second aspect, in a thirty-first possible implementation of the second aspect, if X=16, $X_1$=8, and $X_2$=8, a time-frequency resource location of the second reference signal resource mapping diagram is (k,l), k is a subcarrier number of a resource element (RE), and l is a symbol corresponding to the RE, $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -4, & p = \{\text{eighth port, ninth port}\} \\ -10, & p = \{\text{tenth port, eleventh port}\} \\ -5, & p = \{\text{twelfth port, thirteenth port}\} \\ -11, & p = \{\text{fourteenth port, fifteenth port}\} \end{cases},$$

$l = \{l' + l''$, $p = 0^{th}$ port to fifteenth port, $l'' = 0, 1$;

where (k',l')=(11,2), the $0^{th}$ port to the fifteenth port correspond to $n_s$ mod 2=1, and the CP is a normal CP and supports FDD and TDD; and in the foregoing formulas, p is a port number, k' is a number of a subcarrier in each PRB pair, l' is a number of an OFDM symbol in each slot, and a spreading factor satisfies the following condition:

spreading factor $w_{l''} = $ $$\begin{cases} 1, & p = \begin{cases} 0^{th} \text{ port, second port, fourth port, sixth port} \\ \text{eighth port, tenth port, twelfth port,} \\ \text{fourteenth port} \end{cases} \\ (-1)^{l''}, & p = \begin{cases} \text{first port, third port, fifth port, seventh port} \\ \text{ninth port, eleventh port, thirteenth port,} \\ \text{fourteenth port} \end{cases} \end{cases}.$$

With reference to any one of the second aspect or the first to the thirty-first possible implementations of the second aspect, the method further includes: sending, by the base station, a configuration index of the second reference signal resource mapping diagram to the UE by using signaling, so that the UE determines, according to the configuration index of the second reference signal resource mapping diagram, a time-frequency resource location corresponding to the second reference signal resource mapping diagram.

With reference to any one of the second aspect or the first to the thirty-first possible implementations of the second aspect, if the second reference signal resource mapping diagram includes at least two first reference signal resource mapping diagrams of different quantities of ports, the base station notifies configuration information of each first reference signal resource mapping diagram included in the second reference signal resource mapping diagram, so that the UE obtains the second reference signal resource mapping diagram according to the at least two first reference signal resource mapping diagrams of different quantities of ports.

With reference to the thirty-third possible implementation of the second aspect, in a thirty-fourth possible implementation of the second aspect, in all configurations of the second reference signal resource mapping diagram of a same quantity of ports, there are two configurations whose resource mapping diagrams have overlapping resources.

With reference to the thirty-third possible implementation of the second aspect, in a thirty-fifth possible implementation of the second aspect, a range of a resource mapping diagram corresponding to the configuration information that is notified by the base station and that is of each first reference signal resource mapping diagram included in the second reference signal resource mapping diagram is a set of all first reference signal resource mapping diagrams.

With reference to the thirty-third possible implementation of the second aspect, in a thirty-sixth possible implementation of the second aspect, a range of a resource mapping diagram corresponding to the configuration information that is notified by the base station and that is of each first reference signal resource mapping diagram included in the second reference signal resource mapping diagram is a subset of a set of all first reference signal resource mapping diagrams.

With reference to any one of the second aspect or the first to the thirty-first possible implementations of the second aspect, the base station notifies an index of a resource mapping diagram of a second reference signal whose port quantity is X1, so that the UE obtains, according to a preset rule, a resource mapping diagram of a second reference signal whose port quantity is X2, where X1 and X2 are integers that are not equal, and X1 is greater than X2.

With reference to the thirty-seventh possible implementation of the second aspect, in a thirty-eighth possible implementation of the second aspect, the preset rule is: Resources corresponding to the $M^{th}$ port to the $(M+X2-1)^{th}$ port in X1 ports are the resource mapping diagram of the second reference signal whose port quantity is X2, and M is an integer greater than or equal to 0 and less than or equal to X1−X2−1.

With reference to any one of the second aspect or the first to the thirty-first possible implementations of the second aspect, in a thirty-ninth possible implementation of the second aspect, the base station notifies the UE of an index of a resource mapping diagram of a first reference signal whose port quantity is X1 and an index of a resource mapping diagram of a first reference signal whose port quantity is X2, so that the UE determines, according to the foregoing information, a resource mapping diagram of a second reference signal whose port quantity is X1−X2, where X1 is an integer greater than X2.

With reference to the thirty-ninth possible implementation of the second aspect, in a fortieth possible implementation of the second aspect, the first reference signal whose port quantity is X1 is a non-zero power reference signal, and the first reference signal whose port quantity is X2 is a zero power reference signal.

With reference to the second aspect, in a forty-first possible implementation of the second aspect, if a mapping diagram of a second reference signal whose port quantity is X includes a resource mapping diagram of a first reference signal whose port quantity is X1 and a resource mapping diagram of a first reference signal whose port quantity is X2, the X1-port first reference signal resource mapping diagram and the X2-port first reference signal resource mapping diagram occupy different OFDM symbol pairs in a PRB pair, the X1-port first reference signal resource mapping diagram corresponds to resources occupied by the $0^{th}$ port to the $(X1-1)^{th}$ port in the second reference signal whose port quantity is X, and the X2-port first reference signal resource mapping diagram corresponds to resources occupied by the $X1^{th}$ port to the $(X-1)^{th}$ port in the second reference signal whose port quantity is X, for the second reference signal whose port quantity is X, locations of OFDM symbol pairs of the $0^{th}$ port to the $(X1-1)^{th}$ port and the $X1^{th}$ port to the $(X-1)^{th}$ port in a PRB pair are respectively interchangeable with locations of OFDM symbol pairs of the $0^{th}$ port to the $(X1-1)^{th}$ port and the $X1^{th}$ port to the $(X1-1)^{th}$ port in a neighbouring PRB pair, where X=X1+X2, and X, X1, and X2 are positive integers.

With reference to the forty-first possible implementation of the second aspect, in a forty-second possible implementation of the second aspect, if X=12, $X_1$=8, and $X_2$=4, a time-frequency resource location of the second reference signal resource mapping diagram is (k,l), k is a subcarrier number of a resource element (RE), and l is a symbol corresponding to the RE, $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$l = \{l' + l''$, $p = 0^{th}$ port to eleventh port, $l'' = 0, 1$ where (k',l')=(9,5), the $0^{th}$ port to the seventh port correspond to $n_s$ mod 2=0, the eighth port to the eleventh port correspond to $n_s$ mod 2=1, the CP is a normal CP and supports FDD and TDD, PRB pair X mod 2=0, and X is a number of a PRB pair;

$$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$l = \{l' + l''$, $p = 0^{th}$ port to eleventh port, $l'' = 0, 1$ where (k',l')=(9,5), the $0^{th}$ port to the seventh port correspond to $n_s$ mod 2=1, the eighth port to the eleventh port correspond to $n_s$ mod 2=0, the CP is a normal CP and supports FDD and TDD, and PRB pair X mod 2=1; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$l = \{l' + l''$, $p = 0^{th}$ port to eleventh port, $l'' = 0, 1$ where (k',l')=(9,5), the $0^{th}$ port to the seventh port correspond to $n_s$ mod 2=0, the eighth port to the eleventh port correspond to $n_s$ mod 2=1, the CP is a normal CP and supports FDD and TDD, PRB pair X mod 2=1, and X is a number of a PRB pair;

$$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$l = \{l' + l''$, $p = 0^{th}$ port to eleventh port, $l'' = 0, 1$ where (k',l')=(9,5), the $0^{th}$ port to the seventh port correspond to $n_s$ mod 2=1, the eighth port to the eleventh port correspond to $n_s$ mod 2=0, the CP is a normal CP and supports FDD and TDD, and PRB pair X mod 2=0; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$l = \{l' - 3 + l''$, $p = 0^{th}$ port to eleventh port, $l'' = 0, 1$ where (k',l')=(9,5), the $0^{th}$ port to the seventh port correspond to $n_s$ mod 2=0, the eighth port to the eleventh port correspond to $n_s$ mod 2=1, the CP is a normal CP and supports FDD and TDD, PRB pair X mod 2=0, and X is a number of a PRB pair; and $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$l = \{l' + 3 + l''$, $p = 0^{th}$ port to eleventh port, $l'' = 0, 1$ where (k',l')(9,2), the $0^{th}$ port to the seventh port correspond to $n_s$ mod 2=1, the eighth port to the eleventh port correspond to $n_s$ mod 2=0, the CP is a normal CP and supports FDD and TDD, and PRB pair X mod 2=1; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$l = \{l' - 3 + l''$, $p = 0^{th}$ port to eleventh port, $l'' = 0, 1$ where (k',l')=(9,5), the $0^{th}$ port to the seventh port correspond to $n_s$ mod 2=0, the eighth port to the eleventh port correspond to $n_s$ mod 2=1, the CP is a normal CP and supports FDD and TDD, PRB pair X mod 2=1, and X is a number of a PRB pair;

$$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$$l = \{l' + 3 + l'', \ p = 0^{th} \text{ port to eleventh port}, l'' = 0, 1$$

where (k',l')=(9,2), the $0^{th}$ port to the seventh port correspond to $n_s$ mod 2=1, the eighth port to the eleventh port correspond to $n_s$ mod 2 the CP is a normal CP and supports FDD and TDD, and PRB pair X mod 2=0; and in the foregoing formulas, p is a port number, k' is a number of a subcarrier in each PRB pair, l' is a number of an OFDM symbol in each slot, and a spreading factor satisfies the following condition:

spreading factor $w_{l''} =$ $$\begin{cases} 1, & p = \begin{cases} 0^{th} \text{ port, second port, fourth port} \\ \text{sixth port, eighth port, tenth port} \end{cases} \\ (-1)^{l''}, & p = \begin{cases} \text{first port, third port, fifth port} \\ \text{seventh port, ninth port, tenth port} \end{cases} \end{cases}$$

With reference to the forty-first possible implementation of the second aspect, in a forty-third possible implementation of the second aspect, if X=16, $X_1$=8, and $X_2$=8, a time-frequency resource location of the second reference signal resource mapping diagram is (k,l), k is a subcarrier number of a resource element (RE), and l is a symbol corresponding to the RE, $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

$$l = \begin{cases} l' + l'', & p = 0^{th} \text{ port to seventh port} \\ l' - 3 + l'', & p = \text{eighth port to eleventh port}, l'' = 0, 1 \end{cases}$$

where (k',l')=(9,5), the $0^{th}$ port to the seventh port correspond to $n_s$ mod 2=0, the eighth port to the fifteenth port correspond to $n_s$ mod 2=1, the CP is a normal CP and supports FDD and TDD, PRB pair X mod 2=0, and X is a number of a PRB pair; and $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

$$l = \begin{cases} l' + l'', & p = 0^{th} \text{ port to seventh port} \\ l' + 3 + l'', & p = \text{eighth port to eleventh port}, l'' = 0, 1 \end{cases}$$

where (k',l')=(9,2), the $0^{th}$ port to the seventh port correspond to $n_s$ mod 2=1, the eighth port to the fifteenth port correspond to $n_s$ mod 2=0, the CP is a normal CP and supports FDD and TDD, and PRB pair X mod 2=1; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

$$l = \begin{cases} l' + l'', & p = 0^{th} \text{ port to seventh port} \\ l' + 3 + l'', & p = \text{eighth port to eleventh port}, l'' = 0, 1 \end{cases}$$

where (k',l')=(9,5), the $0^{th}$ port to the seventh port correspond to $n_s$ mod 2=0, the eighth port to the fifteenth port correspond to $n_s$ mod 2=1, the CP is a normal CP and supports FDD and TDD, PRB pair X mod 2=1, and X is a number of a PRB pair; and $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

$$l = \begin{cases} l' + l'', & p = 0^{th} \text{ port to seventh port} \\ l' - 3 + l'', & p = \text{eighth port to eleventh port}, l'' = 0, 1 \end{cases}$$

where (k',l')=(9,2), the $0^{th}$ port to the seventh port correspond to $n_s$ mod 2=1, the eighth port to the fifteenth port correspond to $n_s$ mod 2=0, the CP is a normal CP and supports FDD and TDD, and PRB pair X mod 2=0; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

$$l = \begin{cases} l' + l'', & p = 0^{th} \text{ port to seventh port} \\ l' + 3 + l'', & p = \text{eighth port to eleventh port, } l'' = 0, 1 \end{cases}$$

where (k',l')=(9,5), the $0^{th}$ port to the fifteenth port correspond to $n_s$ mod 2=1, the CP is a normal CP and supports FDD and TDD, PRB pair X mod 2=0, and X is a number of a PRB pair; and $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

$$l = \begin{cases} l' + l'', & p = 0^{th} \text{ port to seventh port} \\ l' - 3 + l'', & p = \text{eighth port to eleventh port, } l'' = 0, 1 \end{cases}$$

where (k',l')=(9,2), the $0^{th}$ port to the fifteenth port correspond to $n_s$ mod 2=1, the CP is a normal CP and supports FDD and TDD, and PRB pair X mod 2=1; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

$$l = \begin{cases} l' + l'', & p = 0^{th} \text{ port to seventh port} \\ l' + 3 + l'', & p = \text{eighth port to eleventh port, } l'' = 0, 1 \end{cases}$$

where (k',l')=(9,5), the $0^{th}$ port to the fifteenth port correspond to $n_s$ mod 2=1, the CP is a normal CP and supports FDD and TDD, and PRB pair X mod 2=1, and X is a number of a PRB pair;

$$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

$$l = \begin{cases} l' + l'', & p = 0^{th} \text{ port to seventh port} \\ l' - 3 + l'', & p = \text{eighth port to eleventh port, } l'' = 0, 1 \end{cases}$$

where (k',l')(9,2), the $0^{th}$ port to the fifteenth port correspond to $n_s$ mod 2=1, the CP is a normal CP and supports FDD and TDD, and PRB pair X mod 2=0; and in the foregoing formulas, p is a port number, k' is a number of a subcarrier in each PRB pair, l' is a number of an OFDM symbol in each slot, and a spreading factor satisfies the following condition:

spreading factor $w_{l''} =$ $$\begin{cases} 1, & p = \begin{cases} 0^{th} \text{ port, second port, fourth port, sixth port} \\ \text{eighth port, tenth port, twelfth port, fourteenth port} \end{cases} \\ (-1)^{l''}, & p = \begin{cases} \text{first port, third port, fifth port, seventh port} \\ \text{ninth port, eleventh port, thirteenth port, fifteenth port} \end{cases} \end{cases}.$$

According to a fifth aspect, user equipment UE is provided, including:

a processor, configured to: obtain a reference signal resource mapping diagram, and obtain a reference signal according to the reference signal resource mapping diagram; and perform channel measurement according to the reference signal obtained by the obtaining unit, determine channel state information, and feed back the channel state information to a base station, where the reference signal resource mapping diagram is a location to which a time-frequency resource of the reference signal is mapped, the reference signal resource mapping diagram is a first reference signal resource mapping diagram or a second reference signal resource mapping diagram, and an association relationship exists between each of K2 second reference signal resource mapping diagrams and at least one of K1 first reference signal resource mapping diagrams, where K2 is a quantity of the second reference signal resource mapping diagrams, K1 is a quantity of the first reference signal resource mapping diagrams, and K1 and K2 are integers greater than or equal to 1; and the first reference signal resource mapping diagram is a Y-port reference signal resource mapping diagram, the second reference signal resource mapping diagram is an X-port reference signal resource mapping diagram, Y is an integer less than or equal to 8 and satisfying $2^n$, and X is an integer greater than 8 or an integer less than 8 and not satisfying $2^n$.

With reference to the fifth aspect, in a first possible implementation of the fifth aspect, when X is greater than 8, X does not satisfy $2^n$, and n is an integer greater than or equal to 0.

With reference to the fifth aspect or the first possible implementation of the fifth aspect, in a second possible implementation of the fifth aspect, the processor is further configured to obtain the second reference signal resource mapping diagram the association relationship is: Time-frequency resources and code resources of X consecutive ports in Y ports of any one of the K2 second reference signal resource mapping diagrams are the same as time-frequency resources and code resources of X consecutive ports in Y ports of any one of the K1 first reference signal resource mapping diagrams, where Y is an integer closest to X and satisfying $2^n$ in integers greater than X, and the code resource is an orthogonal spreading code or a sequence of a reference signal.

With reference to the second possible implementation of the fifth aspect, in a third possible implementation of the fifth aspect, the X consecutive ports are the $0^{th}$ port to the $(X-1)^{th}$ port in the Y ports, or the X consecutive ports are the $(Y-X)^{th}$ port to the $(Y-1)^{th}$ port in the Y ports.

With reference to the second or the third possible implementation of the fifth aspect, in a fourth possible implementation of the fifth aspect, K2=K1, or $$K2 = \left\lceil \frac{Y*K1}{X} \right\rceil,$$

and ⌈ ⌉ represents rounding down.

With reference to any one of the fifth aspect or the first to the fourth possible implementations of the fifth aspect, in a fifth possible implementation of the fifth aspect, at least one of the K2 second reference signal resource mapping diagrams includes time-frequency resources of at least two of the first reference signal resource mapping diagrams.

With reference to the fifth possible implementation of the fifth aspect, in a sixth possible implementation of the fifth aspect, an X-port second reference signal resource mapping diagram in the K2 second reference signal resource mapping diagrams includes K3 first reference signal resource mapping diagrams, each of the K3 first reference signal resource mapping diagrams includes time-frequency resources corresponding to H ports, H=X/K3, and K3 is a positive integer less than X.

With reference to the sixth possible implementation of the fifth aspect, in a seventh possible implementation of the fifth aspect, the H ports are the $0^{th}$ port to the $(H-1)^{th}$ port or the $(Y-H)^{th}$ port to the $(Y-1)^{th}$ port in the first reference signal resource mapping diagram.

With reference to the fifth aspect or the first possible implementation of the fifth aspect, in an eighth possible implementation of the fifth aspect, the processor is further configured to obtain the second reference signal resource mapping diagram, where the X-port second reference signal resource mapping diagram includes an $X_1$-port reference signal resource mapping diagram and an $X_2$-port reference signal resource mapping diagram;

$X_1+X_2=X$, a difference between $X_1$ and $X_2$ is less than 2, the $X_1$-port reference signal resource mapping diagram and the $X_2$-port reference signal resource mapping diagram are obtained by the UE from m subframes, and m is 1 or 2; and the $X_1$-port reference signal resource mapping diagram is the first reference signal resource mapping diagram and the $X_2$-port reference signal resource mapping diagram is the second reference signal resource mapping diagram; or the $X_1$-port reference signal resource mapping diagram and the $X_2$-port reference signal resource mapping diagram both are the second reference signal resource mapping diagrams.

With reference to the seventh possible implementation of the fifth aspect, in a ninth possible implementation of the fifth aspect, X is an integer greater than 8.

With reference to the eighth or the ninth possible implementation of the fifth aspect, in a tenth possible implementation of the fifth aspect, the UE further includes:

a receiver, configured to receive a sequence that is notified by the base station and that is of subframes carrying the $X_1$-port reference signal resource mapping diagram and the $X_2$-port reference signal resource mapping diagram; or a sequence of subframes carrying the $X_1$-port reference signal resource mapping diagram and the $X_2$-port reference signal resource mapping diagram is preset, and the sequence is a descending order of port quantities or an ascending order of port quantities.

With reference to the eighth or the ninth possible implementation of the fifth aspect, in an eleventh possible implementation of the fifth aspect, the UE further includes:

a receiver, configured to receive a number of a subframe carrying the $X_1$-port reference signal resource mapping diagram and a number of a subframe carrying the $X_2$-port reference signal resource mapping diagram that are notified by the base station; or the receiver, configured to receive a number of a subframe carrying the $X_1$-port reference signal resource mapping diagram and a subframe interval between a subframe carrying the $X_2$-port reference signal resource mapping diagram and the subframe carrying the $X_1$-port reference signal resource mapping diagram.

With reference to the fifth aspect or the first possible implementation of the fifth aspect, in a twelfth possible implementation of the fifth aspect, the processor is further configured to obtain the second reference signal resource mapping diagram, where the second reference signal resource mapping diagram includes each of an $X_1$-port reference signal resource mapping diagram, an $X_2$-port reference signal resource mapping diagram, . . . , and an $X_i$-port reference signal resource mapping diagram, $X_1+X_2$ . . . $+X_i=X$, and each of $X_1, X_2, \ldots, X_i$ can be represented as $2^n$; and the $X_1$-port reference signal resource mapping diagram, the $X_2$-port reference signal resource mapping diagram, . . . , and the $X_i$-port reference signal resource mapping diagram are obtained by the UE from at least one subframe.

With reference to the twelfth possible implementation of the fifth aspect, in a thirteenth possible implementation of the fifth aspect, each of the $X_1$-port reference signal resource mapping diagram, the $X_2$-port reference signal resource mapping diagram, . . . , and the $X_i$-port reference signal resource mapping diagram is the first reference signal resource mapping diagram; and each of $X_1, X_2, \ldots, X_i$ is less than or equal to 8 and values of n corresponding to $X_1, X_2, \ldots, X_i$ are different.

With reference to the twelfth or the thirteenth possible implementation of the fifth aspect, in a fourteenth possible implementation of the fifth aspect, X is an integer greater than 8.

With reference to the twelfth to the fourteenth possible implementations of the fifth aspect, in a fifteenth possible implementation of the fifth aspect, the $X_1$-port reference signal resource mapping diagram, the $X_2$-port reference signal resource mapping diagram, . . . , and the $X_i$-port reference signal resource mapping diagram are obtained by the UE from one subframe; or the $X_1$-port reference signal resource mapping diagram, the $X_2$-port reference signal resource mapping diagram, . . . , and the $X_i$-port reference signal resource mapping diagram are obtained by the UE from i subframes.

With reference to any one of the twelfth to the fifteenth possible implementations of the fifth aspect, in a sixteenth possible implementation of the fifth aspect, the receiver is configured to receive a sequence that is notified by the base station and that is of subframes carrying the $X_1$-port reference signal resource mapping diagram, the $X_2$-port reference signal resource mapping diagram, . . . , and the $X_i$-port reference signal resource mapping diagram; or a sequence of subframes carrying the $X_1$-port reference signal resource mapping diagram, the $X_2$-port reference signal resource mapping diagram, . . . , and the $X_i$-port reference signal resource mapping diagram is predefined, where the sequence of the subframes is an ascending order of port quantities, or a descending order of port quantities, or a sequence of a largest port quantity, a smallest port quantity, a second largest port quantity, a second smallest port quantity, . . . .

With reference to any one of the twelfth to the fifteenth possible implementations of the fifth aspect, in a seventeenth possible implementation of the fifth aspect, the receiver is further configured to receive configuration information that is notified by the base station and that is of each of the $X_1$-port reference signal resource mapping diagram, the $X_2$-port reference signal resource mapping diagram, . . . , and the $X_i$-port reference signal resource mapping diagram; or the receiver is further configured to receive joint coding signaling sent by the base station, where the joint coding signaling is used to indicate configuration information of the $X_1$-port reference signal resource mapping diagram, configuration information of the $X_2$-port reference signal resource mapping diagram, . . . , and configuration information of the $X_i$-port reference signal resource mapping diagram; or the receiver is further configured to receive configuration information of the $X_1$-port reference signal resource mapping diagram and a correspondence between configuration information of an $X_j$-port reference signal resource mapping diagram and the configuration information of the $X_1$-port reference signal resource mapping diagram, where j is an integer greater than 1 and less than or equal to i; or configuration information of the $X_1$-port reference signal resource mapping diagram, configuration information of the $X_2$-port reference signal resource mapping diagram, . . . , and configuration information of the $X_i$-port reference signal resource mapping diagram are predefined.

With reference to any one of the twelfth to the sixteenth possible implementations of the fifth aspect, in an eighteenth possible implementation of the fifth aspect, a number of the subframe carrying the $X_1$-port reference signal resource mapping diagram, a number of the subframe carrying the $X_2$-port reference signal resource mapping diagram, . . . , and a number of the subframe carrying the $X_i$-port reference signal resource mapping diagram are predefined; or the receiver is further configured to receive a number of the subframe carrying the $X_1$-port reference signal resource mapping diagram, a number of the subframe carrying the $X_2$-port reference signal resource mapping diagram, . . . , and a number of the subframe carrying the $X_i$-port reference signal resource mapping diagram that are notified by the base station; or the receiver is further configured to receive a number of the subframe carrying the $X_1$-port reference signal resource mapping diagram and a subframe interval between a subframe carrying an $X_j$-port reference signal resource mapping diagram and the subframe carrying the $X_1$-port reference signal resource mapping diagram that are notified by the base station, where j is an integer greater than 1 and less than or equal to i.

With reference to the thirteenth possible implementation of the fifth aspect, in a nineteenth possible implementation of the fifth aspect, if an $X_t$-port reference signal resource mapping diagram and the $X_j$-port reference signal resource mapping diagram are in different subframes, t is an integer greater than or equal to 1 and less than or equal to i, and t is not equal to j, the $X_t$-port reference signal resource mapping diagram and the $X_j$-port reference signal resource mapping diagram have L same relative time-frequency resource locations in each PRB pair, where L is a smallest value in $X_t$, $X_j$; or time-frequency resource locations of the $X_t$-port reference signal resource mapping diagram and the $X_j$-port reference signal resource mapping diagram in each PRB pair are different.

With reference to the thirteenth possible implementation of the fifth aspect, in a twentieth possible implementation of the fifth aspect, there are Q same relative time-frequency resource locations in time-frequency resource locations of the $X_1$-port reference signal resource mapping diagram, the $X_2$-port reference signal resource mapping diagram, . . . , and the $X_i$-port reference signal resource mapping diagram, and the relative time-frequency resource location is a time-frequency resource location of a reference signal resource mapping diagram in each PRB pair.

With reference to the twentieth possible implementation of the fifth aspect, in a twenty-first possible implementation of the fifth aspect, Q is a smallest value in $X_1, X_2 \ldots X_i$.

With reference to the thirteenth possible implementation of the fifth aspect, in a twenty-second possible implementation of the fifth aspect, there are Q same subcarriers in time-frequency resource locations of the $X_1$-port reference signal resource mapping diagram, the $X_2$-port reference signal resource mapping diagram, . . . , and the $X_i$-port reference signal resource mapping diagram, and Q is an integer greater than 1.

With reference to the twenty-second possible implementation of the fifth aspect, in a twenty-third possible implementation of the fifth aspect, the Q same subcarriers are subcarriers occupied by an L-port reference signal resource mapping diagram, and L is a smallest value in $X_1, X_2 \ldots X_i$.

With reference to the thirteenth possible implementation of the fifth aspect, in a twenty-fourth possible implementation of the fifth aspect, subcarriers corresponding to time-frequency resource locations of the $X_1$-port reference signal resource mapping diagram, the $X_2$-port reference signal resource mapping diagram, . . . , and the $X_i$-port reference signal resource mapping diagram are different.

With reference to the twelfth to the fifteenth possible implementations of the fifth aspect, in a twenty-fifth possible implementation of the fifth aspect, orthogonal frequency division multiplexing (OFDM) symbols occupied by time-frequency resource locations of the $X_1$-port reference signal resource mapping diagram, the $X_2$-port reference signal resource mapping diagram, . . . , and the $X_i$-port reference signal resource mapping diagram are the same.

With reference to the twentieth possible implementation of the fifth aspect, in a twenty-sixth possible implementation of the fifth aspect, the Q same time-frequency resource locations are time-frequency resource locations corresponding to the $0^{th}$ port to the $(Q-1)^{th}$ port in the $X_j$-port reference signal resource mapping diagram, and $X_j$ is a smallest value in $X_1, X_2 \ldots X_i$.

With reference to the second possible implementation of the fifth aspect, in a twenty-seventh possible implementation of the fifth aspect, if X is 3, Y is 4, and K2=K1=10, a time-frequency resource location of the second reference signal resource mapping diagram is (k,l), k is a subcarrier number of a resource element (RE), and l is a symbol corresponding to the RE, $$k = k' + \begin{cases} -0, & p = \{0^{th} \text{ port, first port}\} \\ -6, & p = \{\text{second port}\} \end{cases}$$

$$l = l' + l'', l'' = 0, 1, l' = l'_1, l'_2 \ldots l'_{10}$$

$$w_{l''} = \begin{cases} 1, & p = \{0^{th} \text{ port, second port}\} \\ (-1)^{l''}, & p = \{\text{first port}\} \end{cases}$$

$$(k', l') = \begin{cases} k'_0 = 9, l'_0 = 5, n_s\text{mod}2 = 0 \\ \text{or } k'_1 = 11, l'_1 = 2, n_s\text{mod}2 = 1 \\ \text{or } k'_2 = 9, l'_2 = 2, n_s\text{mod}2 = 1 \\ \text{or } k'_3 = 7, l'_3 = 2, n_s\text{mod}2 = 1 \\ \text{or } k'_4 = 9, l'_4 = 5, n_s\text{mod}2 = 1 \\ \text{or } k'_5 = 8, l'_5 = 5, n_s\text{mod}2 = 0 \\ \text{or } k'_6 = 10, l'_6 = 2, n_s\text{mod}2 = 1 \\ \text{or } k'_7 = 8, l'_7 = 2, n_s\text{mod}2 = 1 \\ \text{or } k'_8 = 6, l'_8 = 2, n_s\text{mod}2 = 1 \\ \text{or } k'_9 = 8, l'_9 = 5, n_s\text{mod}2 = 1 \end{cases}$$

where in a first configuration of the second reference signal resource mapping diagram, (k',l')=(k',l'), in a second configuration, (k',l')=(k'$_1$,l'$_1$) . . . , and in a tenth configuration, (k',l') (k'$_4$',l'$_4$); $n_s$ mod 2=1 represents that the time-frequency resource location is in a second slot of a subframe, and $n_s$ mod 2=0 represents that the time-frequency resource location is in a first slot of a subframe.

With reference to the twenty-seventh possible implementation of the fifth aspect, in a twenty-eighth possible implementation of the fifth aspect, if K1=10, and K2=4*10/3, a time-frequency resource location of the second reference signal resource mapping diagram other than (k,l) is:

$$k = \begin{cases} k'_0 - 6, 0^{th} \text{ port} \\ k'_5 - 6, \text{ first port} \\ k'_1 - 4, \text{ second port} \end{cases}, l = \begin{cases} l'_1 + l'' \\ l'_2 + l'' \\ l'_3 + l'', l'' = 0, 1, w_{l''} = (-1)^{l''} \end{cases} ; \text{or}$$

$$k = \begin{cases} k'_6 - 6, 0^{th} \text{ port} \\ k'_2 - 6, \text{ first port} \\ k'_7 - 6, \text{ second port} \end{cases}, l = \begin{cases} l'_4 + l'' \\ l'_5 + l'' \\ l'_6 + l'', l'' = 0, 1, w_{l''} = (-1)^{l''} \end{cases} ; \text{or}$$

$$k = \begin{cases} k'_3 - 6, 0^{th} \text{ port} \\ k'_8 - 6, \text{ first port} \\ k'_4 - 6, \text{ second port} \end{cases}, l = \begin{cases} l'_7 + l'' \\ l'_8 + l'' \\ l'_9 + l'', l'' = 0, 1, w_{l''} = (-1)^{l''} \end{cases} ;$$

With reference to the second possible implementation of the fifth aspect, in a twenty-ninth possible implementation of the fifth aspect, if X is 5, Y is 8, and K2=K1=5, a time-frequency resource location of the second reference signal resource mapping diagram is (k,l), k is a subcarrier number of the RE, and l is a symbol corresponding to the RE, $$k = k' + \begin{cases} -0, & p = \{0^{th} \text{ port, first port}\} \\ -6, & p = \{\text{second port, third port}\}, \\ -1 & p = \{\text{fourth port}\} \end{cases}$$

$$l = l' + l'', l'' = 0, 1, l' = l'_1, l'_2 \ldots l'_5$$

spreading factor $w_{l''} =$ $$\begin{cases} 1, & p = \{0^{th} \text{ port, second port, fourth port}\} \\ (-1)^{l''}, & p = \{\text{first port, third port}\} \end{cases}$$

$$(k', l') = \begin{cases} k'_0 = 9, l'_0 = 5, n_s\text{mod}2 = 0 \\ \text{or } k'_1 = 11, l'_1 = 2, n_s\text{mod}2 = 1 \\ \text{or } k'_2 = 9, l'_2 = 2, n_s\text{mod}2 = 1 \\ \text{or } k'_3 = 7, l'_3 = 2, n_s\text{mod}2 = 1 \\ \text{or } k'_4 = 9, l'_4 = 5, n_s\text{mod}2 = 1 \end{cases}$$

where in a first configuration of the second reference signal resource mapping diagram, (k', l')=(k'$_0$,l'$_0$), in a second configuration, (k', l')=(k'$_1$,h'$_1$) . . . , and in a fifth configuration, (k',l')=(k'$_4$,l'$_4$); $n_s$ mod 2=1 represents that the time-frequency resource location is in a second slot of a subframe, and $n_s$ mod 2=0 represents that the time-frequency resource location is in a first slot of a subframe.

With reference to the thirteenth possible implementation of the fifth aspect, in a thirtieth possible implementation of the fifth aspect, if X=12, $X_1$=8, and $X_2$=4, a time-frequency resource location of the second reference signal resource mapping diagram is (k,l), k is a subcarrier number of a resource element (RE), and l is a symbol corresponding to the RE, $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases},$$

$$l = \begin{cases} l' + l'', & p = 0^{th} \text{ port to seventh port} \\ l' - 3 + l'', & p = \text{eighth port to eleventh port}, l'' = 0, 1 \end{cases},$$

where (k',l')=(9,5), the $0^{th}$ port to the seventh port correspond to $n_s$ mod 2=0, the eighth port to the eleventh port correspond to $n_s$ mod 2=1, and the CP is a normal CP and supports frequency division multiplexing (FDD) and time division multiplexing (TDD); or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -1, & p = \{\text{eighth port, ninth port}\} \\ -7, & p = \{\text{tenth port, eleventh port}\} \end{cases}$$

$$l = \begin{cases} l' + l'', & p = 0^{th} \text{ port to seventh port} \\ l' - 3 + l'', & p = \text{eighth port to eleventh port } l'' = 0, 1 \end{cases},$$

where (k',l')=(9,5), the $0^{th}$ port to the seventh port correspond to $n_s$ mod 2=0, the eighth port to the eleventh port correspond to $n_s$ mod 2=0, and the CP is a normal CP and supports FDD and TDD; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$$l = \begin{cases} l' + l'', & p = 0^{th} \text{ port to seventh port} \\ l' - 3 + l'', & p = \text{eighth port to eleventh port } l'' = 0, 1 \end{cases},$$

where (k',l')(9,5), the $0^{th}$ port to the eleventh port correspond to $n_s$ mod 2=1, and the CP is a normal CP and supports FDD and TDD; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -1, & p = \{\text{eighth port, ninth port}\} \\ -7, & p = \{\text{tenth port, eleventh port}\} \end{cases}$$

$$l = \begin{cases} l' + l'', & p = 0^{th} \text{ port to seventh port} \\ l' - 3 + l'', & p = \text{eighth port to eleventh port } l'' = 0, 1 \end{cases},$$

where (k',l')=(9,5), the $0^{th}$ port to the eleventh port correspond to $n_s$ mod 2=1, and the CP is a normal CP and supports FDD and TDD; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$$l = \{l' + l'', \quad p = 0^{th} \text{ port to eleventh port}, l'' = 0, 1$$

where (k',l')=(9,5), the $0^{th}$ port to the seventh port correspond to $n_s$ mod 2=0, the eighth port to the eleventh port correspond to $n_s$ mod 2=1, and the CP is a normal CP and supports FDD and TDD; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -3, & p = \{\text{eighth port, ninth port}\} \\ -9, & p = \{\text{tenth port, eleventh port}\} \end{cases}$$

$$l = \begin{cases} l', & p = 0^{th}, \text{ second, fourth, sixth, eighth, or twelfth port} \\ l' + 2, & p = \text{first, third, fifth, seventh, ninth, or eleventh port} \end{cases}$$

where (k',l')=(11,1), the $0^{th}$ port to the eleventh port correspond to $n_s$ mod 2=1, and the CP is a normal CP and supports only TDD; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ +2, & p = \{\text{eighth port, ninth port}\} \\ -4, & p = \{\text{tenth port, eleventh port}\} \end{cases}$$

$$l = \begin{cases} l', & p = 0^{th}, \text{ second, fourth, sixth, eighth, or twelfth port} \\ l' + 2, & p = \text{first, third, fifth, seventh, ninth, or eleventh port} \end{cases}$$

where (k',l')=(7,1), the $0^{th}$ port to the eleventh port correspond to $n_s$ mod 2=1, and the CP is a normal CP and supports only TDD; or $$k = k' + \begin{cases} -0, & p = \{0^{th} \text{ port, first port}\} \\ -3, & p = \{\text{second port, third port}\} \\ -6, & p = \{\text{fourth port, fifth port}\} \\ -9, & p = \{\text{sixth port, seventh port}\} \\ -8, & p = \{\text{eighth port, ninth port}\} \\ -11, & p = \{\text{tenth port, eleventh port}\} \end{cases}$$

$$l = \{l' + l'', \quad p = 0^{th} \text{ port to eleventh port}, l'' = 0, 1$$

where (k',l')=(11,4), the $0^{th}$ port to the eleventh port correspond to $n_s$ mod 2=0, and the CP is an extended CP and supports FDD and TDD; or $$k = k' + \begin{cases} -0, & p = \{0^{th} \text{ port, first port}\} \\ -3, & p = \{\text{second port, third port}\} \\ -6, & p = \{\text{fourth port, fifth port}\} \\ -9, & p = \{\text{sixth port, seventh port}\} \\ +2, & p = \{\text{eighth port, ninth port}\} \\ -1, & p = \{\text{tenth port, eleventh port}\} \end{cases}$$

$l = \{l' + l''\}, \; p = 0^{th}$ port to eleventh port, $l'' = 0, 1$ where (k',l')=(9,4), the $0^{th}$ port to the eleventh port correspond to $n_s$ mod 2=0, and the CP is an extended CP and supports FDD and TDD; or $$k = k' + \begin{cases} -0, & p = \{0^{th} \text{ port, first port}\} \\ -3, & p = \{\text{second port, third port}\} \\ -6, & p = \{\text{fourth port, fifth port}\} \\ -9, & p = \{\text{sixth port, seventh port}\} \\ -7, & p = \{\text{eighth port, ninth port}\} \\ -10, & p = \{\text{tenth port, eleventh port}\} \end{cases}$$

$l = \{l' + l''\}, \; p = 0^{th}$ port to eleventh port, $l'' = 0, 1$ where (k',l')=(10,4), the $0^{th}$ port to the eleventh port correspond to $n_s$ mod 2=1, and the CP is an extended CP and supports FDD and TDD; or $$k = k' + \begin{cases} -0, & p = \{0^{th} \text{ port, first port}\} \\ -3, & p = \{\text{second port, third port}\} \\ -6, & p = \{\text{fourth port, fifth port}\} \\ -9, & p = \{\text{sixth port, seventh port}\} \\ -2, & p = \{\text{eighth port, ninth port}\} \\ -5, & p = \{\text{tenth port, eleventh port}\} \end{cases}$$

$l = \{l' + l''\}, \; p = 0^{th}$ port to eleventh port, $l'' = 0, 1$ where (k',l')=(11,1), the $0^{th}$ port to the eleventh port correspond to $n_s$ mod 2=1, and the CP is an extended CP and supports only TDD; or $$k = k' + \begin{cases} -0, & p = \{0^{th} \text{ port, first port}\} \\ -3, & p = \{\text{second port, third port}\} \\ -6, & p = \{\text{fourth port, fifth port}\} \\ -9, & p = \{\text{sixth port, seventh port}\} \\ -7, & p = \{\text{eighth port, ninth port}\} \\ -10, & p = \{\text{tenth port, eleventh port}\} \end{cases}$$

$l = \{l' + l''\}, \; p = 0^{th}$ port to eleventh port, $l'' = 0, 1$ where (k',l')=(10,1), the $0^{th}$ port to the eleventh port correspond to $n_s$ mod 2=1, and the CP is an extended CP and supports only TDD; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -4, & p = \{\text{eighth port, ninth port}\} \\ -10, & p = \{\text{tenth port, eleventh port}\} \end{cases}$$

$l = \{l' + l''\}, \; p = 0^{th}$ port to eleventh port, $l'' = 0, 1$ where (k',l')=(11,2), the $0^{th}$ port to the eleventh port correspond to $n_s$ mod 2=1, and the CP is a normal CP and supports FDD and TDD; and in the foregoing formulas, p is a port number, k' is a number of a subcarrier in each PRB pair, l' is a number of an OFDM symbol in each slot, and a spreading factor satisfies the following condition:

spreading factor $w_{l''} = $ $$\begin{cases} 1, & p = \left\{ \begin{array}{l} 0^{th} \text{ port, second port, fourth port} \\ \text{sixth port, eighth port, tenth port} \end{array} \right\} \\ (-1)^{l''}, & p = \left\{ \begin{array}{l} \text{first port, third port, fifth port} \\ \text{seventh port, ninth port, tenth port} \end{array} \right\} \end{cases}.$$

With reference to the thirteenth possible implementation of the fifth aspect, in a thirty-first possible implementation of the fifth aspect, if X=16, $X_1$=8, and $X_2$=8, a time-frequency resource location of the second reference signal resource mapping diagram is (k,l), k is a subcarrier number of a resource element (RE), and l is a symbol corresponding to the RE, $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -4, & p = \{\text{eighth port, ninth port}\} \\ -10, & p = \{\text{tenth port, eleventh port}\} \\ -5, & p = \{\text{twelfth port, thirteenth port}\} \\ -11, & p = \{\text{fourteenth port, fifteenth port}\} \end{cases},$$

$l = \{l' + l''\}, \; p = 0^{th}$ port to fifteenth port, $l'' = 0, 1$;

where (k',l')=(11,2), the $0^{th}$ port to the fifteenth port correspond to $n_s$ mod 2=1, and the CP is a normal CP and supports FDD and TDD; and in the foregoing formulas, p is a port number, k' is a number of a subcarrier in each PRB pair, l' is a number of an OFDM symbol in each slot, and a spreading factor satisfies the following condition:

spreading factor $w_{l''} =$ $$\begin{cases} 1, & p = \begin{cases} 0^{th} \text{ port, second port, fourth port, sixth port} \\ \text{eighth port, tenth port, twelfth port,} \\ \text{fourteenth port} \end{cases} \\ (-1)^{l'''}, & p = \begin{cases} \text{first port, third port, fifth port, seventh port} \\ \text{ninth port, eleventh port, thirteenth port,} \\ \text{fourteenth port} \end{cases} \end{cases}$$

With reference to any one of the fifth aspect or the first to the thirty-first possible implementations of the fifth aspect, in a thirty-second possible implementation of the fifth aspect, the receiver is further configured to receive a configuration index that is sent by the base station and that is of the second reference signal resource mapping diagram; and the processor is further configured to determine, according to the configuration index of the second reference signal resource mapping diagram, a time-frequency resource location corresponding to the second reference signal resource mapping diagram.

With reference to any one of the fifth aspect or the first to the thirty-first possible implementations of the fifth aspect, in a thirty-third possible implementation of the fifth aspect, if the second reference signal resource mapping diagram includes at least two first reference signal resource mapping diagrams of different quantities of port, the receiver is further configured to receive configuration information that is separately notified by the base station and that is of each first reference signal resource mapping diagram included in the second reference signal resource mapping diagram; and the processor is further configured to obtain the second reference signal resource mapping diagram according to the at least two first reference signal resource mapping diagrams of different quantities of ports.

With reference to the thirty-third possible implementation of the fifth aspect, in a thirty-fourth possible implementation of the fifth aspect, in all configurations of the second reference signal resource mapping diagram of a same quantity of ports, there are two configurations whose resource mapping diagrams have overlapping resources.

With reference to the thirty-third possible implementation of the fifth aspect, in a thirty-fifth possible implementation of the fifth aspect, a range of a resource mapping diagram corresponding to the configuration information that is notified by the base station and that is of each first reference signal resource mapping diagram included in the second reference signal resource mapping diagram is a set of all first reference signal resource mapping diagrams.

With reference to the thirty-third possible implementation of the fifth aspect, in a thirty-sixth possible implementation of the fifth aspect, a range of a resource mapping diagram corresponding to the configuration information that is notified by the base station and that is of each first reference signal resource mapping diagram included in the second reference signal resource mapping diagram is a subset of a set of all first reference signal resource mapping diagrams.

With reference to any one of the fifth aspect or the first to the thirty-first possible implementations of the fifth aspect, in a thirty-seventh possible implementation of the fifth aspect, the receiver is further configured to receive an index that is notified by the base station and that is of a resource mapping diagram of a second reference signal whose port quantity is X1; and the processor is further configured to obtain, according to a preset rule, the resource mapping diagram of the second reference signal whose port quantity is X2, where X1 and X2 are integers that are not equal, and X1 is greater than X2.

With reference to the thirty-seventh possible implementation of the fifth aspect, in a thirty-eighth possible implementation of the fifth aspect, the preset rule is: Resources corresponding to the $M^{th}$ port to the $(M+X2-1)^{th}$ port in X1 ports are the resource mapping diagram of the second reference signal whose port quantity is X2, and M is an integer greater than or equal to 0 and less than or equal to X1−X2−1.

With reference to any one of the fifth aspect or the first to the thirty-first possible implementations of the fifth aspect, in a thirty-ninth possible implementation of the fifth aspect, the receiver is further configured to receive an index of a resource mapping diagram of a first reference signal whose port quantity is X1 and an index of a resource mapping diagram of a first reference signal whose port quantity is X2 of the UE that are notified by the base station; and the processor is further configured to determine, according to the foregoing information, a resource mapping diagram of a second reference signal whose port quantity is X1−X2, where X1 is an integer greater than X2.

With reference to the thirty-ninth possible implementation of the fifth aspect, in a fortieth possible implementation of the fifth aspect, the first reference signal whose port quantity is X1 is a non-zero power reference signal, and the first reference signal whose port quantity is X2 is a zero power reference signal.

With reference to the fifth aspect, in a forty-first possible implementation of the fifth aspect, if a mapping diagram of a second reference signal whose port quantity is X includes a resource mapping diagram of a first reference signal whose port quantity is X1 and a resource mapping diagram of a first reference signal whose port quantity is X2, the X1-port first reference signal resource mapping diagram and the X2-port first reference signal resource mapping diagram occupy different OFDM symbol pairs in a PRB pair, the X1-port first reference signal resource mapping diagram corresponds to resources occupied by the $0^{th}$ port to the $(X1-1)^{th}$ port in the second reference signal whose port quantity is X, and the X2-port first reference signal resource mapping diagram corresponds to resources occupied by the $X1^{th}$ port to the $(X-1)^{th}$ port in the second reference signal whose port quantity is X, for the second reference signal whose port quantity is X, locations of OFDM symbol pairs of the $0^{th}$ port to the $(X1-1)^{th}$ port and the $X1^{th}$ port to the $(X-1)^{th}$ port in a PRB pair are respectively interchangeable with locations of OFDM symbol pairs of the $0^{th}$ port to the $(X1-1)^{th}$ port and the $X1^{th}$ port to the $(X1-1)^{th}$ port in a neighbouring PRB pair, where X=X1+X2, and X, X1, and X2 are positive integers.

With reference to the forty-first possible implementation of the fifth aspect, in a forty-second possible implementation of the fifth aspect, if X=12, $X_1$=8, and $X_2$=4, a time-frequency resource location of the second reference signal resource mapping diagram is (k,l), k is a subcarrier number of a resource element (RE), and l is a symbol corresponding to the RE, $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$$l = \{l' + l''\}, \ p = 0^{th} \text{ port to eleventh port}, \ l'' = 0, 1$$

where (k',l')=(9,5), the $0^{th}$ port to the seventh port correspond to $n_s$ mod 2=0, the eighth port to the eleventh port correspond to $n_s$ mod 2=1, the CP is a normal CP and supports FDD and TDD, PRB pair X mod 2=0, and X is a number of a PRB pair;

$$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$$l = \{l' + l''\}, \ p = 0^{th} \text{ port to eleventh port}, \ l'' = 0, 1$$

where (k',l')=(9,5), the $0^{th}$ port to the seventh port correspond to $n_s$ mod 2=0, the eighth port to the eleventh port correspond to $n_s$ mod 2=1, the CP is a normal CP and supports FDD and TDD, PRB pair X mod 2=0, and X is a number of a PRB pair;
where (k',l')=(9,5), the $0^{th}$ port to the seventh port correspond to $n_s$ mod 2=1, the eighth port to the eleventh port correspond to $n_s$ mod 2=0, the CP is a normal CP and supports FDD and TDD, and PRB pair X mod 2=1; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$$l = \{l' + l''\}, \ p = 0^{th} \text{ port to eleventh port}, \ l'' = 0, 1$$

where (k',l')=(9,5), the $0^{th}$ port to the seventh port correspond to $n_s$ mod 2=1, the eighth port to the eleventh port correspond to $n_s$ mod 2=0, the CP is a normal CP and supports FDD and TDD, PRB pair X mod 2=1, and X is a number of a PRB pair;

$$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$$l = \{l' + l''\}, \ p = 0^{th} \text{ port to eleventh port}, \ l'' = 0, 1$$

where (k',l')=(9,5), the $0^{th}$ port to the seventh port correspond to $n_s$ mod 2=0, the eighth port to the eleventh port correspond to $n_s$ mod 2=1, the CP is a normal CP and supports FDD and TDD, and PRB pair X mod 2=0; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$$l = \{l' - 3 + l''\}, \ p = 0^{th} \text{ port to eleventh port}, \ l'' = 0, 1$$

where (k',l')=(9,5), the $0^{th}$ port to the seventh port correspond to $n_s$ mod 2=0, the eighth port to the eleventh port correspond to $n_s$ mod 2=1, the CP is a normal CP and supports FDD and TDD, PRB pair X mod 2=0, and X is a number of a PRB pair;

$$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$$l = \{l' + 3 + l''\}, \ p = 0^{th} \text{ port to eleventh port}, \ l'' = 0, 1$$

where (k',l')=(9,2), the $0^{th}$ port to the seventh port correspond to $n_s$ mod 2=1, the eighth port to the eleventh port correspond to $n_s$ mod 2=0, the CP is a normal CP and supports FDD and TDD, and PRB pair X mod 2=1; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$$l = \{l' - 3 + l''\}, \ p = 0^{th} \text{ port to eleventh port}, \ l'' = 0, 1$$

where (k',l')=(9,5), the $0^{th}$ port to the seventh port correspond to $n_s$ mod 2=0, the eighth port to the eleventh port correspond to $n_s$ mod 2=1, the CP is a normal CP and supports FDD and TDD, PRB pair X mod 2=1, and X is a number of a PRB pair;

$$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$$l = \{l' + 3 + l''\}, \ p = 0^{th} \text{ port to eleventh port}, \ l'' = 0, 1$$

where (k',l')=(9,2), the $0^{th}$ port to the seventh port correspond to $n_s$ mod 2=1, the eighth port to the eleventh port correspond to $n_s$ mod 2=0, the CP is a normal CP and supports FDD and TDD, and PRB pair X mod 2=0; and in the foregoing formulas, p is a port number, k' is a number of a subcarrier in each PRB pair, l' is a number of an OFDM symbol in each slot, and a spreading factor satisfies the following condition:

$$\text{spreading factor } w_{l''} = \begin{cases} 1, p = \begin{Bmatrix} 0^{th} \text{ port, second port, fourth port} \\ \text{sixth port, eighth port, tenth port} \end{Bmatrix} \\ (-1)^{l''}, p = \begin{Bmatrix} \text{first port, third port, fifth port} \\ \text{seventh port, ninth port, tenth port} \end{Bmatrix} \end{cases}.$$

With reference to the forty-first possible implementation of the fifth aspect, in a forty-third possible implementation of the fifth aspect, if X=16, $X_1$=8, and $X_2$=8, a time-frequency resource location of the second reference signal resource mapping diagram is (k,l), k is a subcarrier number of a resource element (RE), and l is a symbol corresponding to the RE, $$k = k' + \begin{cases} -0, p = \{0^{th} \text{ port, first port}\} \\ -6, p = \{\text{second port, third port}\} \\ -1, p = \{\text{fourth port, fifth port}\} \\ -7, p = \{\text{sixth port, seventh port}\} \\ -0, p = \{\text{eighth port, ninth port}\} \\ -6, p = \{\text{tenth port, eleventh port}\} \\ -1, p = \{\text{twelfth port, thirteenth port}\} \\ -7, p = (\text{fourteenth port, fifteenth port}) \end{cases}$$

$$l = \begin{cases} l' + l'', p = 0^{th} \text{ port to seventh port} \\ l' - 3 + l'', p = \text{eighth port to eleventh port}, l'' = 0, 1 \end{cases}$$

where (k',l')=(9,5), the $0^{th}$ port to the seventh port correspond to $n_s$ mod 2=0, the eighth port to the fifteenth port correspond to $n_s$ mod 2=1, the CP is a normal CP and supports FDD and TDD, PRB pair X mod 2=0, and X is a number of a PRB pair;

$$k = k' + \begin{cases} -0, p = \{0^{th} \text{ port, first port}\} \\ -6, p = \{\text{second port, third port}\} \\ -1, p = \{\text{fourth port, fifth port}\} \\ -7, p = \{\text{sixth port, seventh port}\} \\ -0, p = \{\text{eighth port, ninth port}\} \\ -6, p = \{\text{tenth port, eleventh port}\} \\ -1, p = \{\text{twelfth port, thirteenth port}\} \\ -7, p = (\text{fourteenth port, fifteenth port}) \end{cases}$$

$$l = \begin{cases} l' + l'', p = 0^{th} \text{ port to seventh port} \\ l' + 3 + l'', p = \text{eighth port to eleventh port}, l'' = 0, 1 \end{cases}$$

where (k',l')=(9,2), the $0^{th}$ port to the seventh port correspond to $n_s$ mod 2=1, the eighth port to the fifteenth port correspond to $n_s$ mod 2=0, the CP is a normal CP and supports FDD and TDD, and PRB pair X mod 2=1; or $$k = k' + \begin{cases} -0, p = \{0^{th} \text{ port, first port}\} \\ -6, p = \{\text{second port, third port}\} \\ -1, p = \{\text{fourth port, fifth port}\} \\ -7, p = \{\text{sixth port, seventh port}\} \\ -0, p = \{\text{eighth port, ninth port}\} \\ -6, p = \{\text{tenth port, eleventh port}\} \\ -1, p = \{\text{twelfth port, thirteenth port}\} \\ -7, p = (\text{fourteenth port, fifteenth port}) \end{cases}$$

$$l = \begin{cases} l' + l'', p = 0^{th} \text{ port to seventh port} \\ l' - 3 + l'', p = \text{eighth port to eleventh port}, l'' = 0, 1 \end{cases}$$

where (k',l')=(9,5), the $0^{th}$ port to the seventh port correspond to $n_s$ mod 2=1, the eighth port to the fifteenth port correspond to $n_s$ mod 2=0, the CP is a normal CP and supports FDD and TDD, PRB pair X mod 2=1, and X is a number of a PRB pair;

$$k = k' + \begin{cases} -0, p = \{0^{th} \text{ port, first port}\} \\ -6, p = \{\text{second port, third port}\} \\ -1, p = \{\text{fourth port, fifth port}\} \\ -7, p = \{\text{sixth port, seventh port}\} \\ -0, p = \{\text{eighth port, ninth port}\} \\ -6, p = \{\text{tenth port, eleventh port}\} \\ -1, p = \{\text{twelfth port, thirteenth port}\} \\ -7, p = (\text{fourteenth port, fifteenth port}) \end{cases}$$

$$l = \begin{cases} l' + l'', p = 0^{th} \text{ port to seventh port} \\ l' + 3 + l'', p = \text{eighth port to eleventh port}, l'' = 0, 1 \end{cases}$$

where (k',l')=(9,2), the $0^{th}$ port to the seventh port correspond to $n_s$ mod 2=1, the eighth port to the fifteenth port correspond to $n_s$ mod 2=0, the CP is a normal CP and supports FDD and TDD, and PRB pair X mod 2=0; or $$k = k' + \begin{cases} -0, p = \{0^{th} \text{ port, first port}\} \\ -6, p = \{\text{second port, third port}\} \\ -1, p = \{\text{fourth port, fifth port}\} \\ -7, p = \{\text{sixth port, seventh port}\} \\ -0, p = \{\text{eighth port, ninth port}\} \\ -6, p = \{\text{tenth port, eleventh port}\} \\ -1, p = \{\text{twelfth port, thirteenth port}\} \\ -7, p = (\text{fourteenth port, fifteenth port}) \end{cases}$$

$$l = \begin{cases} l' + l'', p = 0^{th} \text{ port to seventh port} \\ l' - 3 + l'', p = \text{eighth port to eleventh port}, l'' = 0, 1 \end{cases}$$

where (k',l')=(9,5), the $0^{th}$ port to the fifteenth port correspond to $n_s$ mod 2=1, the CP is a normal CP and supports FDD and TDD, PRB pair X mod 2=0, and X is a number of a PRB pair;

$$k = k' + \begin{cases} -0, p = \{0^{th} \text{ port, first port}\} \\ -6, p = \{\text{second port, third port}\} \\ -1, p = \{\text{fourth port, fifth port}\} \\ -7, p = \{\text{sixth port, seventh port}\} \\ -0, p = \{\text{eighth port, ninth port}\} \\ -6, p = \{\text{tenth port, eleventh port}\} \\ -1, p = \{\text{twelfth port, thirteenth port}\} \\ -7, p = \{\text{fourteenth port, fifteenth port}\} \end{cases}$$

$$l = \begin{cases} l' + l'', p = 0^{th} \text{ port to seventh port} \\ l' + 3 + l'', p = \text{eighth port to eleventh port}, l'' = 0, 1 \end{cases}$$

where (k',l')=(9,2), the $0^{th}$ port to the fifteenth port correspond to $n_s$ mod 2=1, the CP is a normal CP and supports FDD and TDD, and PRB pair X mod 2=1; or $$k = k' + \begin{cases} -0, p = \{0^{th} \text{ port, first port}\} \\ -6, p = \{\text{second port, third port}\} \\ -1, p = \{\text{fourth port, fifth port}\} \\ -7, p = \{\text{sixth port, seventh port}\} \\ -0, p = \{\text{eighth port, ninth port}\} \\ -6, p = \{\text{tenth port, eleventh port}\} \\ -1, p = \{\text{twelfth port, thirteenth port}\} \\ -7, p = \{\text{fourteenth port, fifteenth port}\} \end{cases}$$

$$l = \begin{cases} l' + l'', p = 0^{th} \text{ port to seventh port} \\ l' - 3 + l'', p = \text{eighth port to eleventh port}, l'' = 0, 1 \end{cases}$$

where (k',l')=(9,5), the $0^{th}$ port to the fifteenth port correspond to $n_s$ mod 2=1, the CP is a normal CP and supports FDD and TDD, and PRB pair X mod 2=1, and X is a number of a PRB pair;

$$k = k' + \begin{cases} -0, p = \{0^{th} \text{ port, first port}\} \\ -6, p = \{\text{second port, third port}\} \\ -1, p = \{\text{fourth port, fifth port}\} \\ -7, p = \{\text{sixth port, seventh port}\} \\ -0, p = \{\text{eighth port, ninth port}\} \\ -6, p = \{\text{tenth port, eleventh port}\} \\ -1, p = \{\text{twelfth port, thirteenth port}\} \\ -7, p = \{\text{fourteenth port, fifteenth port}\} \end{cases}$$

$$l = \begin{cases} l' + l'', p = 0^{th} \text{ port to seventh port} \\ l' + 3 + l'', p = \text{eighth port to eleventh port}, l'' = 0, 1 \end{cases}$$

where (k',l')=(9,2), the $0^{th}$ port to the fifteenth port correspond to $n_s$ mod 2=1, the CP is a normal CP and supports FDD and TDD, and PRB pair X mod 2=0; and in the foregoing formulas, p is a port number, k' is a number of a subcarrier in each PRB pair, l' is a number of an OFDM symbol in each slot, and a spreading factor satisfies the following condition:

spreading factor $w_{l''} =$ $$\begin{cases} 1, p = \begin{cases} 0^{th} \text{ port, second port, fourth port, sixth port} \\ \text{eighth port, tenth port, twelfth port, fourteenth port} \end{cases} \\ (-1), p = \begin{cases} \text{first port, third port, fifth port, seventh port} \\ \text{ninth port, eleventh port, thirteenth port, fifteenth port} \end{cases} \end{cases}.$$

According to a fifth aspect, a base station is provided, including:

a processor, configured to configure a reference signal resource mapping diagram;

a transmitter, configured to send the reference signal resource mapping diagram to user equipment UE; and a receiver, configured to receive channel state information fed back by the UE, where the reference signal resource mapping diagram is a location to which a time-frequency resource of the reference signal is mapped, the reference signal resource mapping diagram is a first reference signal resource mapping diagram or a second reference signal resource mapping diagram, and an association relationship exists between each of K2 second reference signal resource mapping diagrams and at least one of K1 first reference signal resource mapping diagrams, where K2 is a quantity of the second reference signal resource mapping diagrams, K1 is a quantity of the first reference signal resource mapping diagrams, and K1 and K2 are integers greater than or equal to 1; and the first reference signal resource mapping diagram is a Y-port reference signal resource mapping diagram, the second reference signal resource mapping diagram is an X-port reference signal resource mapping diagram, Y is an integer less than or equal to 8 and satisfying $2^n$, and X is an integer greater than 8 or an integer less than 8 and not satisfying $2^n$.

With reference to the sixth aspect, in a first possible implementation of the sixth aspect, when X is greater than 8, X does not satisfy $2^n$, and n is an integer greater than or equal to 0.

With reference to the sixth aspect or the first possible implementation of the sixth aspect, in a second possible implementation of the sixth aspect, the association relationship is: Time-frequency resources and code resources of X consecutive ports in Y ports of any one of the K2 second reference signal resource mapping diagrams are the same as time-frequency resources and code resources of X consecutive ports in Y ports of any one of the K1 first reference signal resource mapping diagrams, where Y is an integer closest to X and satisfying $2^n$ in integers greater than X, and the code resource is an orthogonal spreading code or a sequence of a reference signal.

With reference to the second possible implementation of the sixth aspect, in a third possible implementation of the sixth aspect, the X consecutive ports are the $0^{th}$ port to the $(X-1)^{th}$ port in the Y ports, or the X consecutive ports are the $(Y-X)^{th}$ port to the $(Y-1)^{th}$ port in the Y ports.

With reference to the second or the third possible implementation of the sixth aspect, in a fourth possible implementation of the sixth aspect, K2=K1, or $$K2 = \left\lceil \frac{Y * K1}{X} \right\rceil,$$

and ⌈ ⌉ represents rounding down.

With reference to the fifth possible implementation of the sixth aspect, in a sixth possible implementation of the sixth aspect, at least one of the K2 second reference signal resource mapping diagrams includes time-frequency resources of at least two of the first reference signal resource mapping diagrams.

With reference to the sixth possible implementation of the sixth aspect, in a seventh possible implementation of the sixth aspect, an X-port second reference signal resource mapping diagram in the K2 second reference signal resource mapping diagrams includes K3 first reference signal resource mapping diagrams, each of the K3 first reference signal resource mapping diagrams includes time-frequency resources corresponding to H ports, H=X/K3, and K3 is a positive integer less than X.

With reference to the sixth aspect or the first possible implementation of the sixth aspect, in an eighth possible implementation of the sixth aspect, the H ports are the $0^{th}$ port to the $(H-1)^{th}$ port or the $(Y-H)^{th}$ port to the $(Y-1)^{th}$ port in the first reference signal resource mapping diagram.

With reference to the seventh possible implementation of the sixth aspect, in a ninth possible implementation of the sixth aspect, the transmitter is further configured to send the second reference signal resource mapping diagram to the UE, where the X-port second reference signal resource mapping diagram includes an $X_1$-port reference signal resource mapping diagram and an $X_2$-port reference signal resource mapping diagram;

$X_1+X_2=X$, a difference between $X_1$ and $X_2$ is less than 2, the $X_1$-port reference signal resource mapping diagram and the $X_2$-port reference signal resource mapping diagram are obtained by the UE from m subframes, and m is 1 or 2; and the $X_1$-port reference signal resource mapping diagram is the first reference signal resource mapping diagram and the $X_2$-port reference signal resource mapping diagram is the second reference signal resource mapping diagram; or the $X_1$-port reference signal resource mapping diagram and the $X_2$-port reference signal resource mapping diagram both are the second reference signal resource mapping diagrams.

With reference to the seventh possible implementation of the sixth aspect, in a ninth possible implementation of the sixth aspect, X is an integer greater than 8.

With reference to the eighth or the ninth possible implementation of the sixth aspect, in a tenth possible implementation of the sixth aspect, the transmitter is further configured to notify the UE of a sequence of subframes carrying the $X_1$-port reference signal resource mapping diagram and the $X_2$-port reference signal resource mapping diagram; or a sequence of subframes carrying the $X_1$-port reference signal resource mapping diagram and the $X_2$-port reference signal resource mapping diagram is preset, where the sequence is a descending order of port quantities or an ascending order of port quantities.

With reference to the eighth or the ninth possible implementation of the sixth aspect, in an eleventh possible implementation of the sixth aspect, the transmitter is further configured to notify the UE of a number of a subframe carrying the $X_1$-port reference signal resource mapping diagram and a number of a subframe carrying the $X_2$-port reference signal resource mapping diagram; or the transmitter is further configured to notify the UE of a number of a subframe carrying the $X_1$-port reference signal resource mapping diagram and a subframe interval between a subframe carrying the $X_2$-port reference signal resource mapping diagram and the subframe carrying the $X_1$-port reference signal resource mapping diagram.

With reference to the sixth aspect or the first possible implementation of the sixth aspect, in a twelfth possible implementation of the sixth aspect, the transmitter is further configured to send the second reference signal resource mapping diagram to the UE, where the second reference signal resource mapping diagram includes each of an $X_1$-port reference signal resource mapping diagram, an $X_2$-port reference signal resource mapping diagram, . . . , and an $X_i$-port reference signal resource mapping diagram, $X_1+X_2 \ldots +X_i=X$, and each of $X_1, X_2, \ldots, X_i$ Can be represented as $2^n$; and the $X_1$-port reference signal resource mapping diagram, the $X_2$-port reference signal resource mapping diagram, . . . , and the $X_i$-port reference signal resource mapping diagram are obtained by the UE from at least one subframe.

With reference to the twelfth possible implementation of the sixth aspect, in a thirteenth possible implementation of the sixth aspect, each of the $X_1$-port reference signal resource mapping diagram, the $X_2$-port reference signal resource mapping diagram, . . . , and the $X_i$-port reference signal resource mapping diagram is the first reference signal resource mapping diagram; and each of $X_1, X_2, \ldots, X_i$ is less than or equal to 8 and values of n corresponding to $X_1, X_2, \ldots, X_i$ are different.

With reference to the twelfth or the thirteenth possible implementation of the sixth aspect, in a fourteenth possible implementation of the sixth aspect, X is an integer greater than 8.

With reference to the twelfth to the fourteenth possible implementations of the sixth aspect, in a fifteenth possible implementation of the sixth aspect, the $X_1$-port reference signal resource mapping diagram, the $X_2$-port reference signal resource mapping diagram, . . . , and the $X_1$-port reference signal resource mapping diagram are sent by the base station in one subframe; or the $X_1$-port reference signal resource mapping diagram, the $X_2$-port reference signal resource mapping diagram, . . . , and the $X_i$-port reference signal resource mapping diagram are sent by the base station in i subframes.

With reference to any one of the twelfth to the fifteenth possible implementations of the sixth aspect, in a sixteenth possible implementation of the sixth aspect, the transmitter is further configured to notify the UE of a sequence of subframes carrying the $X_1$-port reference signal resource mapping diagram, the $X_2$-port reference signal resource mapping diagram, . . . and the $X_i$-port reference signal resource mapping diagram; or a sequence of subframes carrying the $X_1$-port reference signal resource mapping diagram, the $X_2$-port reference signal resource mapping diagram, . . . , and the $X_i$-port reference signal resource mapping diagram is predefined, where the sequence of the subframes is an ascending order of port quantities, or a descending order of port quantities, or a sequence of a largest port quantity, a smallest port quantity, a second largest port quantity, a second smallest port quantity, . . . .

With reference to any one of the twelfth to the fifteenth possible implementations of the sixth aspect, in a seventeenth possible implementation of the sixth aspect, the transmitter is further configured to notify the UE of configuration information of each of the $X_1$-port reference signal resource mapping diagram, the $X_2$-port reference signal resource mapping diagram, . . . , and the $X_i$-port reference signal resource mapping diagram; or the transmitter is further configured to send joint coding signaling to the UE, where the joint coding signaling is used to indicate configuration information of the $X_1$-port reference signal resource mapping diagram, configuration information of the $X_2$-port reference signal resource mapping diagram, . . . , and configuration information of the $X_i$-port reference signal resource mapping diagram; or the transmitter is further configured to notify the UE of configuration information of the $X_1$-port reference signal resource mapping diagram and a correspondence between configuration information of an $X_j$-port reference signal resource mapping diagram and the configuration information of the $X_1$-port reference signal resource mapping diagram, where j is an integer greater than 1 and less than or equal to i; or configuration information of the $X_1$-port reference signal resource mapping diagram, configuration information of the $X_2$-port reference signal resource mapping diagram, . . . , and configuration information of the $X_i$-port reference signal resource mapping diagram are predefined.

With reference to any one of the twelfth to the sixteenth possible implementations of the sixth aspect, in an eighteenth possible implementation of the sixth aspect, a number of a subframe carrying the $X_1$-port reference signal resource mapping diagram, a number of a subframe carrying the $X_2$-port reference signal resource mapping diagram, . . . , and a number of a subframe carrying the $X_i$-port reference signal resource mapping diagram are predefined; or the transmitter is further configured to notify the UE of a number of a subframe carrying the $X_1$-port reference signal resource mapping diagram, a number of a subframe carrying the $X_2$-port reference signal resource mapping diagram, . . . , and a number of a subframe carrying the $X_i$-port reference signal resource mapping diagram; or the transmitter is further configured to notify the UE of a number of a subframe carrying the $X_1$-port reference signal resource mapping diagram and a subframe interval between a subframe carrying an $X_j$-port reference signal resource mapping diagram and the subframe carrying the $X_1$-port reference signal resource mapping diagram, where j is an integer greater than 1 and less than or equal to i.

With reference to the thirteenth possible implementation of the sixth aspect, in a nineteenth possible implementation of the sixth aspect, if an $X_t$-port reference signal resource mapping diagram and the $X_j$-port reference signal resource mapping diagram are in different subframes, t is an integer greater than or equal to 1 and less than or equal to i, and t is not equal to j, the $X_t$-port reference signal resource mapping diagram and the $X_j$-port reference signal resource mapping diagram have L same relative time-frequency resource locations in each PRB pair, where L is a smallest value in $X_t$, $X_j$; or time-frequency resource locations of the $X_t$-port reference signal resource mapping diagram and the $X_j$-port reference signal resource mapping diagram in each PRB pair are different.

With reference to the thirteenth possible implementation of the sixth aspect, in a twentieth possible implementation of the sixth aspect, there are Q same relative time-frequency resource locations in time-frequency resource locations of the $X_1$-port reference signal resource mapping diagram, the $X_2$-port reference signal resource mapping diagram, . . . , and the $X_i$-port reference signal resource mapping diagram, and the relative time-frequency resource location is a time-frequency resource location of a reference signal resource mapping diagram in each PRB pair.

With reference to the twentieth possible implementation of the sixth aspect, in a twenty-first possible implementation of the sixth aspect, Q is a smallest value in $X_1$, $X_2$ . . . $X_i$.

With reference to the thirteenth possible implementation of the sixth aspect, in a twenty-second possible implementation of the sixth aspect, there are Q same subcarriers in time-frequency resource locations of the $X_1$-port reference signal resource mapping diagram, the $X_2$-port reference signal resource mapping diagram, . . . , and the $X_i$-port reference signal resource mapping diagram, and Q is an integer greater than 1.

With reference to the twenty-second possible implementation of the sixth aspect, in a twenty-third possible implementation of the sixth aspect, the Q same subcarriers are subcarriers occupied by an L-port reference signal resource mapping diagram, and L is a smallest value in $X_1$, $X_2$ . . . $X_i$.

With reference to the thirteenth possible implementation of the sixth aspect, in a twenty-fourth possible implementation of the sixth aspect, subcarriers corresponding to time-frequency resource locations of the $X_1$-port reference signal resource mapping diagram, the $X_2$-port reference signal resource mapping diagram, . . . , and the $X_i$-port reference signal resource mapping diagram are different.

With reference to the twelfth to the fifteenth possible implementations of the sixth aspect, in a twenty-fifth possible implementation of the sixth aspect, orthogonal frequency division multiplexing (OFDM) symbols occupied by time-frequency resource locations of the $X_1$-port reference signal resource mapping diagram, the $X_2$-port reference signal resource mapping diagram, . . . , and the $X_i$-port reference signal resource mapping diagram are the same.

With reference to the twentieth possible implementation of the sixth aspect, in a twenty-sixth possible implementation of the sixth aspect, the Q overlapping time-frequency resource locations are time-frequency resource locations corresponding to the $0^{th}$ port to the $(Q-1)^{th}$ port in the $X_j$-port reference signal resource mapping diagram.

With reference to the second possible implementation of the sixth aspect, in a twenty-seventh possible implementation of the sixth aspect, if X is 3, Y is 4, and K2=K1=10, a time-frequency resource location of the second reference signal resource mapping diagram is (k,l), k is a subcarrier number of the RE, and l is a symbol corresponding to the RE, $$k = k' + \begin{cases} -0, p = \{0^{th} \text{ port, first port}\} \\ -6, p = \{\text{second port}\} \end{cases}$$

$$l = l' + l'', l'' = 0, 1, l'_1 = l'_2 \ldots l'_{10}$$

$$w_{l''} = \begin{cases} 1, p = \{0^{th} \text{ port, second port}\} \\ (-1)^{l''}, p = \{\text{first port}\} \end{cases}$$

$$(k', l') = \begin{cases} k'_0 = 9, l'_0 = 5, n_s \bmod 2 = 0 \\ \text{or } k'_1 = 11, l'_1 = 2, n_s \bmod 2 = 1 \\ \text{or } k'_2 = 9, l'_2 = 2, n_s \bmod 2 = 1 \\ \text{or } k'_3 = 7, l'_3 = 2, n_s \bmod 2 = 1 \\ \text{or } k'_4 = 9, l'_4 = 5, n_s \bmod 2 = 1 \\ \text{or } k'_5 = 8, l'_5 = 5, n_s \bmod 2 = 0 \\ \text{or } k'_6 = 10, l'_6 = 2, n_s \bmod 2 = 1 \\ \text{or } k'_7 = 8, l'_7 = 2, n_s \bmod 2 = 1 \\ \text{or } k'_8 = 6, l'_8 = 2, n_s \bmod 2 = 1 \\ \text{or } k'_9 = 8, l'_9 = 5, n_s \bmod 2 = 1 \end{cases}$$

where in a first configuration of the second reference signal resource mapping diagram, (k',l')=(k'$_0$,l'$_0$), in a second configuration, (k',l')=(k'$_1$,l'$_1$) . . . , and in a tenth configuration, (k',l') (k'$_4$,l'$_4$); n$_s$ mod 2=1 represents that the time-frequency resource location is in a second slot of a subframe, and n$_s$ mod 2=0 represents that the time-frequency resource location is in a first slot of a subframe.

With reference to the twenty-seventh possible implementation of the sixth aspect, in a twenty-eighth possible implementation of the sixth aspect, if K1=10, and K2=4*10/3, a time-frequency resource location of the second reference signal resource mapping diagram other than (k,l) is:

$$k = \begin{cases} k'_0 - 6, 0^{th} \text{ port} \\ k'_5 - 6, \text{ first port} \\ k'_1 - 4, \text{ second port} \end{cases}, \quad l = \begin{cases} l'_1 + l'' \\ l'_2 + l'' \\ l'_3 + l'' \end{cases}, \quad l'' = 0, 1, \quad w_{l''} = (-1)^{l''}; \text{ or}$$

$$k = \begin{cases} k'_6 - 6, 0^{th} \text{ port} \\ k'_2 - 6, \text{ first port} \\ k'_7 - 6, \text{ second port} \end{cases}, \quad l = \begin{cases} l'_4 + l'' \\ l'_5 + l'' \\ l'_6 + l'' \end{cases}, \quad l'' = 0, 1, \quad w_{l''} = (-1)^{l''}; \text{ or}$$

$$k = \begin{cases} k'_3 - 6, 0^{th} \text{ port} \\ k'_8 - 6, \text{ first port} \\ k'_4 - 6, \text{ second port} \end{cases}, \quad l = \begin{cases} l'_7 + l'' \\ l'_8 + l'' \\ l'_9 + l'' \end{cases}, \quad l'' = 0, 1, \quad w_{l''} = (-1)^{l''};$$

$$(k', l') = \begin{cases} k'_0 = 9, l'_0 = 5, n_s\text{mod}2 = 0 \\ \text{or } k'_1 = 11, l'_1 = 2, n_s\text{mod}2 = 1 \\ \text{or } k'_2 = 9, l'_2 = 2, n_s\text{mod}2 = 1 \\ \text{or } k'_3 = 7, l'_3 = 2, n_s\text{mod}2 = 1 \\ \text{or } k'_4 = 9, l'_4 = 5, n_s\text{mod}2 = 1 \\ \text{or } k'_5 = 8, l'_5 = 5, n_s\text{mod}2 = 0 \\ \text{or } k'_6 = 10, l'_6 = 2, n_s\text{mod}2 = 1 \\ \text{or } k'_7 = 8, l'_7 = 2, n_s\text{mod}2 = 1 \\ \text{or } k'_8 = 6, l'_8 = 2, n_s\text{mod}2 = 1 \\ \text{or } k'_9 = 8, l'_9 = 5, n_s\text{mod}2 = 1 \end{cases}.$$

With reference to the second possible implementation of the sixth aspect, in a twenty-ninth possible implementation of the sixth aspect, if X is 5, Y is 8, and K2=K1=5, a time-frequency resource location of the second reference signal resource mapping diagram is (k,l), k is a subcarrier number of the RE, and l is a symbol corresponding to the RE, $$k = k' + \begin{cases} -0, p = \{0^{th} \text{ port, first port}\} \\ -6, p = \{\text{second port, third port}\}, \\ -1, p = \{\text{fourth port}\} \end{cases}$$

$$l = l' + l'', l'' = 0, 1, l' = l'_1, l'_2 \ldots l'_5$$

spreading factor $w_{l''} = $ $$\begin{cases} 1, p = \{0^{th} \text{ port, second port, fourth port}\} \\ (-1)^{l''}, p = \{\text{first port, third port}\} \end{cases}$$

$$(k', l') = \begin{cases} k'_0 = 9, l'_0 = 5, n_s\text{mod}2 = 0 \\ \text{or } k'_1 = 11, l'_1 = 2, n_s\text{mod}2 = 1 \\ \text{or } k'_2 = 9, l'_2 = 2, n_s\text{mod}2 = 1 \\ \text{or } k'_3 = 7, l'_3 = 2, n_s\text{mod}2 = 1 \\ \text{or } k'_4 = 9, l'_4 = 5, n_s\text{mod}2 = 1 \end{cases}$$

where in a first configuration of the second reference signal resource mapping diagram, (k', l')=(k'$_0$,l'$_0$), in a second configuration, (k',l')=(k'$_1$,l'$_1$) . . . , and in a fifth configuration, (k',l')=(k'$_4$,l'$_4$); n$_s$ mod 2=1 represents that the time-frequency resource location is in a second slot of a subframe, and n$_s$ mod 2=0 represents that the time-frequency resource location is in a first slot of a subframe.

With reference to the thirteenth possible implementation of the sixth aspect, in a thirtieth possible implementation of the sixth aspect, if X=12, X$_1$=8, and X$_2$=4, a time-frequency resource location of the second reference signal resource mapping diagram is (k,l), k is a subcarrier number of a resource element (RE), and l is a symbol corresponding to the RE, $$k = k' + \begin{cases} -0, p = \{0^{th} \text{ port, first port}\} \\ -6, p = \{\text{second port, third port}\} \\ -1, p = \{\text{fourth port, fifth port}\} \\ -7, p = \{\text{sixth port, seventh port}\} \\ -0, p = \{\text{eighth port, ninth port}\} \\ -6, p = \{\text{tenth port, eleventh port}\} \end{cases},$$

$$l = \begin{cases} l' + l'', p = 0^{th} \text{ port to seventh port} \\ l' - 3 + l'', p = \text{eighth port to eleventh port}, l'' = 0, 1 \end{cases},$$

where (k',l')=(9,5), the 0$^{th}$ port to the seventh port correspond to n$_s$ mod 2=0, the eighth port to the eleventh port correspond to n$_s$ mod 2=1, and the CP is a normal CP and supports frequency division multiplexing (FDD) and time division multiplexing (TDD); or $$k = k' + \begin{cases} -0, p = \{0^{th} \text{ port, first port}\} \\ -6, p = \{\text{second port, third port}\} \\ -1, p = \{\text{fourth port, fifth port}\} \\ -7, p = \{\text{sixth port, seventh port}\} \\ -1, p = \{\text{eighth port, ninth port}\} \\ -7, p = \{\text{tenth port, eleventh port}\} \end{cases},$$

$$l = \begin{cases} l' + l'', p = 0^{th} \text{ port to seventh port} \\ l' - 3 + l'', p = \text{eighth port to eleventh port}, l'' = 0, 1 \end{cases},$$

where (k',l')=(9,5), the 0$^{th}$ port to the seventh port correspond to n$_s$ mod 2=0, the eighth port to the eleventh port correspond to n$_s$ mod 2=1, and the CP is a normal CP and supports FDD and TDD; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$$l = \begin{cases} l' + l'', & p = 0^{th} \text{ port to seventh port} \\ l' - 3 + l'', & p = \text{eighth port to eleventh port}, l'' = 0, 1 \end{cases};$$

where (k',l')=(9,5), the $0^{th}$ port to the eleventh port correspond to $n_s$ mod 2=1, and the CP is a normal CP and supports FDD and TDD; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -1, & p = \{\text{eighth port, ninth port}\} \\ -7, & p = \{\text{tenth port, eleventh port}\} \end{cases}$$

$$l = \begin{cases} l' + l'', & p = 0^{th} \text{ port to seventh port} \\ l' - 3 + l'', & p = \text{eighth port to eleventh port}, l'' = 0, 1 \end{cases}$$

where (k',l')=(9,5), the $0^{th}$ port to the eleventh port correspond to $n_s$ mod 2=1, and the CP is a normal CP and supports FDD and TDD; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$$l = \{l' + l'', p = 0^{th} \text{ port to eleventh port}, l'' = 0, 1$$

where (k',l')=(9,5), the $0^{th}$ port to the seventh port correspond to $n_s$ mod 2=0, the eighth port to the eleventh port correspond to $n_s$ mod 2=1, and the CP is a normal CP and supports FDD and TDD; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -3, & p = \{\text{eighth port, ninth port}\} \\ -9, & p = \{\text{tenth port, eleventh port}\} \end{cases}$$

$$l = \begin{cases} l', & p = 0^{th} \text{ second, fourth, sixth, eighth, or twelfth port} \\ l' + 2, & p = \text{first, third, fifth, seventh, ninth, or eleventh port} \end{cases}$$

where (k',l')=(11,1), the $0^{th}$ port to the eleventh port correspond to $n_s$ mod 2=1, and the CP is a normal CP and supports only TDD; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ +2, & p = \{\text{eighth port, ninth port}\} \\ -4, & p = \{\text{tenth port, eleventh port}\} \end{cases}$$

$$l = \begin{cases} l', & p = 0^{th} \text{ second, fourth, sixth, eighth, or twelfth port} \\ l' + 2, & p = \text{first, third, fifth, seventh, ninth, or eleventh port} \end{cases}$$

where (k',l')=(7,1), the $0^{th}$ port to the eleventh port correspond to $n_s$ mod 2=1, and the CP is a normal CP and supports only TDD; or $$k = k' + \begin{cases} -0, & p = \{0^{th} \text{ port, first port}\} \\ -3, & p = \{\text{second port, third port}\} \\ -6, & p = \{\text{fourth port, fifth port}\} \\ -9, & p = \{\text{sixth port, seventh port}\} \\ -8, & p = \{\text{eighth port, ninth port}\} \\ -11, & p = \{\text{tenth port, eleventh port}\} \end{cases}$$

$$l = \{l' + l'', p = 0^{th} \text{ port to eleventh port}, l'' = 0, 1$$

where (k',l')=(11,4), the $0^{th}$ port to the eleventh port correspond to $n_s$ mod 2=0, and the CP is an extended CP and supports FDD and TDD; or $$k = k' + \begin{cases} -0, & p = \{0^{th} \text{ port, first port}\} \\ -3, & p = \{\text{second port, third port}\} \\ -6, & p = \{\text{fourth port, fifth port}\} \\ -9, & p = \{\text{sixth port, seventh port}\} \\ +2, & p = \{\text{eighth port, ninth port}\} \\ -1, & p = \{\text{tenth port, eleventh port}\} \end{cases}$$

$$l = \{l' + l'', p = 0^{th} \text{ port to eleventh port}, l'' = 0, 1$$

where (k',l')=(9,4), the $0^{th}$ port to the eleventh port correspond to $n_s$ mod 2=0, and the CP is an extended CP and supports FDD and TDD; or $$k = k' + \begin{cases} -0, & p = \{0^{th} \text{ port, first port}\} \\ -3, & p = \{\text{second port, third port}\} \\ -6, & p = \{\text{fourth port, fifth port}\} \\ -9, & p = \{\text{sixth port, seventh port}\} \\ -7, & p = \{\text{eighth port, ninth port}\} \\ -10, & p = \{\text{tenth port, eleventh port}\} \end{cases}$$

$$l = \{l' + l'', p = 0^{th} \text{ port to eleventh port}, l'' = 0, 1$$

where (k',l')=(10,4), the $0^{th}$ port to the eleventh port correspond to $n_s$ mod 2=1, and the CP is an extended CP and supports FDD and TDD; or $$k = k' + \begin{cases} -0, & p = \{0^{th} \text{ port, first port}\} \\ -3, & p = \{\text{second port, third port}\} \\ -6, & p = \{\text{fourth port, fifth port}\} \\ -9, & p = \{\text{sixth port, seventh port}\} \\ -2, & p = \{\text{eighth port, ninth port}\} \\ -5, & p = \{\text{tenth port, eleventh port}\} \end{cases}$$

$$l = \{l' + l'', p = 0^{th} \text{ port to eleventh port}, l'' = 0, 1\}$$

where (k',l')=(11,1), the $0^{th}$ port to the eleventh port correspond to $n_s$ mod 2=1, and the CP is an extended CP and supports only TDD; or $$k = k' + \begin{cases} -0, & p = \{0^{th} \text{ port, first port}\} \\ -3, & p = \{\text{second port, third port}\} \\ -6, & p = \{\text{fourth port, fifth port}\} \\ -9, & p = \{\text{sixth port, seventh port}\} \\ -7, & p = \{\text{eighth port, ninth port}\} \\ -10, & p = \{\text{tenth port, eleventh port}\} \end{cases}$$

$$l = \{l' + l'', p = 0^{th} \text{ port to eleventh port}, l'' = 0, 1\}$$

where (k',l')=(10,1), the $0^{th}$ port to the eleventh port correspond to $n_s$ mod 2=1, and the CP is an extended CP and supports only TDD; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -4, & p = \{\text{eighth port, ninth port}\} \\ -10, & p = \{\text{tenth port, eleventh port}\} \end{cases}$$

-continued $$l = \{l' + l'', p = 0^{th} \text{ port to eleventh port}, l'' = 0, 1\}$$

where (k',l')=(11,2), the $0^{th}$ port to the eleventh port correspond to $n_s$ mod 2=1, and the CP is a normal CP and supports FDD and TDD; and in the foregoing formulas, p is a port number, k' is a number of a subcarrier in each PRB pair, l' is a number of an OFDM symbol in each slot, and a spreading factor satisfies the following condition:

$$\text{spreading factor } w_{l''} = \begin{cases} 1, & p = \begin{cases} 0^{th} \text{ port, second port, fourth port} \\ \text{sixth port, eighth port, tenth port} \end{cases} \\ (-1)^{l''}, & p = \begin{cases} \text{first port, third port, fifth port} \\ \text{seventh port, ninth port, tenth port} \end{cases} \end{cases}$$

With reference to the thirteenth possible implementation of the sixth aspect, in a thirty-first possible implementation of the sixth aspect, if X=16, $X_1$=8, and $X_2$=8, a time-frequency resource location of the second reference signal resource mapping diagram is (k,l), k is a subcarrier number of a resource element (RE), and l is a symbol corresponding to the RE, $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -4, & p = \{\text{eighth port, ninth port}\} \\ -10, & p = \{\text{tenth port, eleventh port}\} \\ -5, & p = \{\text{twelfth port, thirteenth port}\} \\ -11, & p = \{\text{fourteenth port, fifteenth port}\} \end{cases}$$

$$l = \{l' + l'', p = 0^{th} \text{ port to fifteenth port}, l'' = 0, 1\};$$

where (k',l')=(11,2), the $0^{th}$ port to the fifteenth port correspond to $n_s$ mod 2=1, and the CP is a normal CP and supports FDD and TDD; and in the foregoing formulas, p is a port number, k' is a number of a subcarrier in each PRB pair, l' is a number of an OFDM symbol in each slot, and a spreading factor satisfies the following condition:

$$\text{spreading factor } w_{l''} = \begin{cases} 1, & p = \begin{cases} 0^{th} \text{ port, second port, fourth port, sixth port,} \\ \text{eighth port, tenth port, twelfth port, fourteenth port} \end{cases} \\ (-1)^{l''}, & p = \begin{cases} \text{first port, third port, fifth port, seventh port,} \\ \text{ninth port, eleventh port, thirteenth port, fourteenth port} \end{cases} \end{cases}$$

With reference to any one of the sixth aspect or the first to the thirty-first possible implementations of the sixth aspect, in a thirty-second possible implementation of the sixth aspect, the transmitter is further configured to send a configuration index of the second reference signal resource mapping diagram to the UE by using signaling, so that the UE determines, according to the configuration index of the second reference signal resource mapping diagram, a time-frequency resource location corresponding to the second reference signal resource mapping diagram.

With reference to any one of the sixth aspect or the first to the thirty-first possible implementations of the sixth aspect, in a thirty-third possible implementation of the sixth aspect, if the second reference signal resource mapping diagram includes at least two first reference signal resource mapping diagrams of different quantities of ports, the transmitter separately notifies configuration information of each first reference signal resource mapping diagram included in the second reference signal resource mapping diagram, so that the UE obtains the second reference signal resource mapping diagram according to the at least two first reference signal resource mapping diagrams of different quantities of ports.

With reference to the thirty-third possible implementation of the sixth aspect, in a thirty-fourth possible implementation of the sixth aspect, in all configurations of the second reference signal resource mapping diagram of a same quantity of ports, there are two configurations whose resource mapping diagrams have overlapping resources.

With reference to the thirty-third possible implementation of the sixth aspect, in a thirty-fifth possible implementation of the sixth aspect, a range of a resource mapping diagram corresponding to the configuration information that is notified by the transmitter and that is of each first reference signal resource mapping diagram included in the second reference signal resource mapping diagram is a set of all first reference signal resource mapping diagrams.

With reference to the thirty-third possible implementation of the sixth aspect, in a thirty-sixth possible implementation of the sixth aspect, a range of a resource mapping diagram corresponding to the configuration information that is notified by the transmitted and that is of each first reference signal resource mapping diagram included in the second reference signal resource mapping diagram is a subset of a set of all first reference signal resource mapping diagrams.

With reference to any one of the sixth aspect or the first to the thirty-first possible implementations of the sixth aspect, in a thirty-seventh possible implementation of the sixth aspect, the transmitter is further configured to notify an index of a resource mapping diagram of a second reference signal whose port quantity is X1, so that a resource mapping diagram of a second reference signal whose port quantity is X2 is obtained according to a preset rule, where X1 and X2 are integers that are not equal, and X1 is greater than X2.

With reference to the thirty-seventh possible implementation of the sixth aspect, in a thirty-eighth possible implementation of the sixth aspect, the preset rule is: Resources corresponding to the $M^{th}$ port to the $(M+X2-1)^{th}$ port in X1 ports are the resource mapping diagram of the second reference signal whose port quantity is X2, and M is an integer greater than or equal to 0 and less than or equal to X1−X2−1.

With reference to any one of the sixth aspect or the first to the thirty-first possible implementations of the sixth aspect, in a thirty-ninth possible implementation of the sixth aspect, the transmitter is further configured to notify the UE of an index of a resource mapping diagram of a first reference signal whose port quantity is X1 and an index of a resource mapping diagram of a first reference signal whose port quantity is X2, so that a resource mapping diagram of a second reference signal whose port quantity is X1−X2 is determined according to the foregoing information, where X1 is an integer greater than X2.

With reference to the thirty-ninth possible implementation of the sixth aspect, in a fortieth possible implementation of the sixth aspect, the first reference signal whose port quantity is X1 is a non-zero power reference signal, and the first reference signal whose port quantity is X2 is a zero power reference signal.

With reference to the sixth aspect, in a forty-first possible implementation of the sixth aspect, if a mapping diagram of a second reference signal whose port quantity is X includes a resource mapping diagram of a first reference signal whose port quantity is X1 and a resource mapping diagram of a first reference signal whose port quantity is X2, the X1-port first reference signal resource mapping diagram and the X2-port first reference signal resource mapping diagram occupy different OFDM symbol pairs in a PRB pair, the X1-port first reference signal resource mapping diagram corresponds to resources occupied by the $0^{th}$ port to the $(X1-1)^{th}$ port in the second reference signal whose port quantity is X, and the X2-port first reference signal resource mapping diagram corresponds to resources occupied by the $X1^{th}$ port to the $(X-1)^{th}$ port in the second reference signal whose port quantity is X, for the second reference signal whose port quantity is X, locations of OFDM symbol pairs of the $0^{th}$ port to the $(X1-1)^{th}$ port and the $X1^{th}$ port to the $(X-1)^{th}$ port in a PRB pair are respectively interchangeable with locations of OFDM symbol pairs of the $0^{th}$ port to the $(X1-1)^{th}$ port and the $X1^{th}$ port to the $(X1-1)^{th}$ port in a neighbouring PRB pair, where X=X1+X2, and X, X1, and X2 are positive integers.

With reference to the forty-first possible implementation of the sixth aspect, in a forty-second possible implementation of the sixth aspect, if X=12, $X_1$=8, and $X_2$=4, a time-frequency resource location of the second reference signal resource mapping diagram is (k,l), k is a subcarrier number of a resource element (RE), and l is a symbol corresponding to the RE, $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$l = \{l' + l'', p = 0^{th} \text{ port to eleventh port}, l'' = 0, 1$ where (k',l')=(9,5), the $0^{th}$ port to the seventh port correspond to $n_s$ mod 2=0, the eighth port to the eleventh port correspond to $n_s$ mod 2=1, the CP is a normal CP and supports FDD and TDD, PRB pair X mod 2=0, and X is a number of a PRB pair;

$$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$l = \{l' + l'', p = 0^{th} \text{ port to eleventh port}, l'' = 0, 1$ where (k',l')=(9,5), the $0^{th}$ port to the seventh port correspond to $n_s$ mod 2=1, the eighth port to the eleventh port correspond to $n_s$ mod 2=0, the CP is a normal CP and supports FDD and TDD, and PRB pair X mod 2=1; or $$k = k' + \begin{cases} -0, p = \{0^{th} \text{ port, first port}\} \\ -6, p = \{\text{second port, third port}\} \\ -1, p = \{\text{fourth port, fifth port}\} \\ -7, p = \{\text{sixth port, seventh port}\} \\ -0, p = \{\text{eighth port, ninth port}\} \\ -6, p = \{\text{tenth port, eleventh port}\} \end{cases}$$

$l = \{l' + l'', p = 0^{th} \text{ port to eleventh port}, l'' = 0, 1$ where (k',l')=(9,5), the $0^{th}$ port to the seventh port correspond to $n_s$ mod 2=0, the eighth port to the eleventh port correspond to $n_s$ mod 2=1 the CP is a normal CP and supports FDD and TDD, PRB pair X mod 2=1, and X is a number of a PRB pair;

$$k = k' + \begin{cases} -0, p = \{0^{th} \text{ port, first port}\} \\ -6, p = \{\text{second port, third port}\} \\ -1, p = \{\text{fourth port, fifth port}\} \\ -7, p = \{\text{sixth port, seventh port}\} \\ -0, p = \{\text{eighth port, ninth port}\} \\ -6, p = \{\text{tenth port, eleventh port}\} \end{cases}$$

$l = \{l' + l'', p = 0^{th} \text{ port to eleventh port}, l'' = 0, 1$ where (k',l')=(9,5), the $0^{th}$ port to the seventh port correspond to $n_s$ mod 2=1, the eighth port to the eleventh port correspond to $n_s$ mod 2=0, the CP is a normal CP and supports FDD and TDD, and PRB pair X mod 2=0;

$$k = k' + \begin{cases} -0, p = \{0^{th} \text{ port, first port}\} \\ -6, p = \{\text{second port, third port}\} \\ -1, p = \{\text{fourth port, fifth port}\} \\ -7, p = \{\text{sixth port, seventh port}\} \\ -0, p = \{\text{eighth port, ninth port}\} \\ -6, p = \{\text{tenth port, eleventh port}\} \end{cases}$$

$l = \{l' - 3 + l'', p = 0^{th} \text{ port to eleventh port}, l'' = 0, 1$ where (k',l')=(9,5), the $0^{th}$ port to the seventh port correspond to $n_s$ mod 2=0, the eighth port to the eleventh port correspond to $n_s$ mod 2=1, the CP is a normal CP and supports FDD and TDD, PRB pair X mod 2=0, and X is a number of a PRB pair;

$$k = k' + \begin{cases} -0, p = \{0^{th} \text{ port, first port}\} \\ -6, p = \{\text{second port, third port}\} \\ -1, p = \{\text{fourth port, fifth port}\} \\ -7, p = \{\text{sixth port, seventh port}\} \\ -0, p = \{\text{eighth port, ninth port}\} \\ -6, p = \{\text{tenth port, eleventh port}\} \end{cases}$$

$l = \{l' - 3 + l'', p = 0^{th} \text{ port to eleventh port}, l'' = 0, 1$ where (k',l')=(9,2), the $0^{th}$ port to the seventh port correspond to $n_s$ mod 2=1, the eighth port to the eleventh port correspond to $n_s$ mod 2=0, the CP is a normal CP and supports FDD and TDD, and PRB pair X mod 2=1; or $$k = k' + \begin{cases} -0, p = \{0^{th} \text{ port, first port}\} \\ -6, p = \{\text{second port, third port}\} \\ -1, p = \{\text{fourth port, fifth port}\} \\ -7, p = \{\text{sixth port, seventh port}\} \\ -0, p = \{\text{eighth port, ninth port}\} \\ -6, p = \{\text{tenth port, eleventh port}\} \end{cases}$$

$l = \{l' - 3 + l'', p = 0^{th} \text{ port to eleventh port}, l'' = 0, 1$ where (k',l')=(9,5), the $0^{th}$ port to the seventh port correspond to $n_s$ mod 2=0, the eighth port to the eleventh port correspond to $n_s$ mod 2=1, the CP is a normal CP and supports FDD and TDD, PRB pair X mod 2=1, and X is a number of a PRB pair;

$$k = k' + \begin{cases} -0, p = \{0^{th} \text{ port, first port}\} \\ -6, p = \{\text{second port, third port}\} \\ -1, p = \{\text{fourth port, fifth port}\} \\ -7, p = \{\text{sixth port, seventh port}\} \\ -0, p = \{\text{eighth port, ninth port}\} \\ -6, p = \{\text{tenth port, eleventh port}\} \end{cases}$$

$l = \{l' + 3 + l'', p = 0^{th} \text{ port to eleventh port}, l'' = 0, 1$ where (k',l')(9,2), the $0^{th}$ port to the seventh port correspond to $n_s$ mod 2=1, the eighth port to the eleventh port correspond to $n_s$ mod 2=0, the CP is a normal CP and supports FDD and TDD, and PRB pair X mod 2=0; and in the foregoing formulas, p is a port number, k' is a number of a subcarrier in each PRB pair, l' is a number of an OFDM symbol in each slot, and a spreading factor satisfies the following condition:

spreading factor $w_{l''} =$ $$\begin{cases} 1, p = \begin{Bmatrix} 0^{th} \text{ port, second port, fourth port} \\ \text{sixth port, eighth port, tenth port} \end{Bmatrix} \\ (-1)^{l''}, p = \begin{Bmatrix} \text{first port, third port, fifth port} \\ \text{seventh port, ninth port, tenth port} \end{Bmatrix} \end{cases}.$$

With reference to the forty-first possible implementation of the sixth aspect, in a forty-third possible implementation of the sixth aspect, if X=16, $X_1$=8, and $X_2$=8, a time-frequency resource location of the second reference signal resource mapping diagram is (k,l), k is a subcarrier number of a resource element (RE), and l is a symbol corresponding to the RE, $$k = k' + \begin{cases} -0, p = \{0^{th} \text{ port, first port}\} \\ -6, p = \{\text{second port, third port}\} \\ -1, p = \{\text{fourth port, fifth port}\} \\ -7, p = \{\text{sixth port, seventh port}\} \\ -0, p = \{\text{eighth port, ninth port}\} \\ -6, p = \{\text{tenth port, eleventh port}\} \\ -1, p = \{\text{twelfth port, thirteenth port}\} \\ -7, p = \{\text{fourteenth port, fifteenth port}\} \end{cases}$$

$$l = \begin{cases} l' + l'', & p = 0^{th} \text{ port to seventh port} \\ l' - 3 + l'', & p = \text{eighth port to eleventh port}, l'' = 0, 1 \end{cases}$$

where (k',l')=(9,5), the $0^{th}$ port to the seventh port correspond to $n_s$ mod 2=0, the eighth port to the fifteenth port correspond to $n_s$ mod 2=1, the CP is a normal CP and supports FDD and TDD, PRB pair X mod 2=0, and X is a number of a PRB pair;

$$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

$$l = \begin{cases} l' + l'', & p = 0^{th} \text{ port to seventh port} \\ l' + 3 + l'', & p = \text{eighth port to eleventh port}, l'' = 0, 1 \end{cases}$$

where (k',l')=(9,2), the $0^{th}$ port to the seventh port correspond to $n_s$ mod 2=1, the eighth port to the fifteenth port correspond to $n_s$ mod 2=0, the CP is a normal CP and supports FDD and TDD, and PRB pair X mod 2=1; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

$$l = \begin{cases} l' + l'', & p = 0^{th} \text{ port to seventh port} \\ l' - 3 + l'', & p = \text{eighth port to eleventh port}, l'' = 0, 1 \end{cases}$$

where (k',l')=(9,5), the $0^{th}$ port to the seventh port correspond to $n_s$ mod 2=0, the eighth port to the fifteenth port correspond to $n_s$ mod 2=1, the CP is a normal CP and supports FDD and TDD, PRB pair X mod 2=1, and X is a number of a PRB pair;

$$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

$$l = \begin{cases} l' + l'', & p = 0^{th} \text{ port to seventh port} \\ l' + 3 + l'', & p = \text{eighth port to eleventh port}, l'' = 0, 1 \end{cases}$$

where (k',l')=(9,2), the $0^{th}$ port to the seventh port correspond to $n_s$ mod 2=1, the eighth port to the fifteenth port correspond to $n_s$ mod 2=0, the CP is a normal CP and supports FDD and TDD, and PRB pair X mod 2=0; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

$$l = \begin{cases} l' + l'', & p = 0^{th} \text{ port to seventh port} \\ l' - 3 + l'', & p = \text{eighth port to eleventh port}, l'' = 0, 1 \end{cases}$$

where (k',l')=(9,5), the $0^{th}$ port to the fifteenth port correspond to $n_s$ mod 2=1, the CP is a normal CP and supports FDD and TDD, PRB pair X mod 2=0, and X is a number of a PRB pair;

$$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

$$l = \begin{cases} l' + l'', & p = 0^{th} \text{ port to seventh port} \\ l' + 3 + l'', & p = \text{eighth port to eleventh port}, l'' = 0, 1 \end{cases}$$

where (k',l')=(9,2), the $0^{th}$ port to the fifteenth port correspond to $n_s$ mod 2=1, the CP is a normal CP and supports FDD and TDD, PRB pair X mod 2=1; or $$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

$$l = \begin{cases} l' + l'', & p = 0^{th} \text{ port to seventh port} \\ l' - 3 + l'', & p = \text{eighth port to eleventh port}, l'' = 0, 1 \end{cases}$$

where (k',l')=(9,5), the $0^{th}$ port to the fifteenth port correspond to $n_s$ mod 2=1, the CP is a normal CP and supports FDD and TDD, PRB pair X mod 2=1, and X is a number of a PRB pair;

$$k = k' + \begin{cases} -0, p = \{0^{th} \text{ port, first port}\} \\ -6, p = \{\text{second port, third port}\} \\ -1, p = \{\text{fourth port, fifth port}\} \\ -7, p = \{\text{sixth port, seventh port}\} \\ -0, p = \{\text{eighth port, ninth port}\} \\ -6, p = \{\text{tenth port, eleventh port}\} \\ -1, p = \{\text{twelfth port, thirteenth port}\} \\ -7, p = \{\text{fourteenth port, fifteenth port}\} \end{cases}$$

$$l = \begin{cases} l' + l'', p = 0^{th} \text{ port to seventh port} \\ l' + 3 + l'', p = \text{eighth port to eleventh port}, l'' = 0, 1 \end{cases}$$

where (k',l')(9,2), the $0^{th}$ port to the fifteenth port correspond to $n_s$ mod 2=, the CP is a normal CP and supports FDD and TDD, and PRB pair X mod 2=0; and in the foregoing formulas, p is a port number, k' is a number of a subcarrier in each PRB pair, l' is a number of an OFDM symbol in each slot, and a spreading factor satisfies the following condition:

spreading factor $w_{l''} =$ $$\begin{cases} 1, p = \begin{cases} 0^{th} \text{ port, second port, fourth port, sixth port} \\ \text{eighth port, tenth port, twelfth port, fourteenth port} \end{cases} \\ (-1)^{l''}, p = \begin{cases} \text{first port, third port, fifth port, seventh port} \\ \text{ninth port, eleventh port, thirteenth port, fifteenth port} \end{cases} \end{cases}.$$

In the channel measurement method, the base station, and the UE that are provided in the embodiments of the present invention, the UE obtains a reference signal resource mapping diagram, and obtains a reference signal according to the reference signal resource mapping diagram. The UE performs channel measurement according to the reference signal to determine channel state information, and feeds back the channel state information to the base station. The reference signal resource mapping diagram is a first reference signal resource mapping diagram or a second reference signal resource mapping diagram, and an association relationship exists between each of K2 second reference signal resource mapping diagrams and at least one of K1 first reference signal resource mapping diagrams, where K2 is a quantity of the second reference signal resource mapping diagrams, K1 is a quantity of the first reference signal resource mapping diagrams, and K1 and K2 are integers greater than or equal to 1. Compared with the prior art that UE obtains a reference signal according to an indication of a base station and performs channel measurement, causing interference to downlink data transmission and deteriorating performance of a downlink system, in the present invention, an RE used to carry data is not occupied to carry a reference signal, so that channel measurement can be performed without affecting downlink data transmission.

BRIEF DESCRIPTION OF DRAWINGS

To describe technical solutions in embodiments of the present invention more clearly, the following briefly describes the accompanying drawings for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

A communications system usually uses different types of reference signals. One type of reference signal is used for channel estimation, so that coherent demodulation can be performed on a received signal that includes control information or data. Another type of reference signal is used for channel state measurement or channel quality measurement, so that UE is scheduled. In a 3GPP LTE R10 downlink system, a reference signal used for coherent demodulation is referred to as a DMRS (demodulation reference signal), and a reference signal used for channel state information measurement is referred to as a CSI-RS (channel state information reference signal). In addition, the reference signal further includes a CRS (cell-specific reference signal) of a legacy R8/R9 system. The CRS is used by the UE to perform channel estimation, so that a PDCCH (physical downlink control channel) and another common channel are demodulated.

The foregoing different types of reference signals support different quantities of antenna ports in an LTE system. In LTE R10, a DMRS supports a maximum of eight antenna ports. In LTE R10, a CSI-RS supports a maximum of eight antenna ports, and a quantity of antenna ports may be 1, 2, 4, or 8. In LTE R8 to LTE R10, a CRS supports a maximum of four antenna ports, and a quantity of antenna ports may be 1, 2, or 4. In LTE R10, a DMRS supports a maximum of eight antenna ports, and a quantity of antenna ports may be 1 to 8. To further improve spectrum efficiency, in a current to-be-started LTE R12 standard, it is considered that more antenna configurations are introduced, especially, an AAS (active antenna system)-based antenna configuration of more than eight antenna ports. For example, a quantity of antenna ports may be 16, 32, or 64.

Embodiment 1

Figure 1:
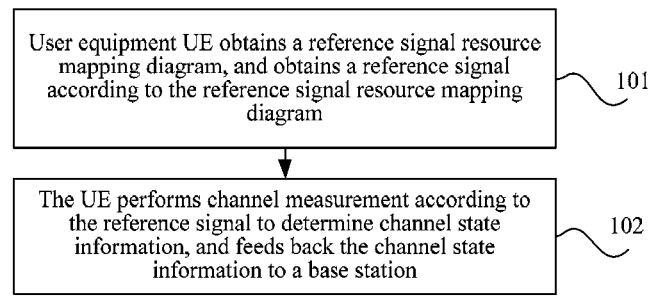
FIG. 1 is a schematic flowchart of a channel measurement method according to Embodiment 1 of the present invention.

This embodiment of the present invention provides a channel measurement method. The method is executed by UE. As shown in FIG. 1, the method includes the following steps.

101: The user equipment (UE) obtains a reference signal resource mapping diagram, and obtains a reference signal according to the reference signal resource mapping diagram.

The reference signal resource mapping diagram is a location to which a time-frequency resource of the reference signal is mapped, the reference signal resource mapping diagram is a first reference signal resource mapping diagram or a second reference signal resource mapping diagram, and an association relationship exists between each of K2 second reference signal resource mapping diagrams and at least one of K1 first reference signal resource mapping diagrams, where K2 is a quantity of the second reference signal resource mapping diagrams, K1 is a quantity of the first reference signal resource mapping diagrams, and K1 and K2 are integers greater than or equal to 1.

The first reference signal resource mapping diagram is a Y-port reference signal resource mapping diagram, the second reference signal resource mapping diagram is an X-port reference signal resource mapping diagram, Y is an integer less than or equal to 8 and satisfying $2^n$, and X is an integer greater than 8 or an integer less than 8 and not satisfying $2^n$.

The association relationship is: Time-frequency resources and code resources of X consecutive ports in Y ports of any one of K2 second reference signal resource mapping diagrams are the same as time-frequency resources and code resources of X consecutive ports in Y ports of any one of K1 first reference signal resource mapping diagrams, Y is an integer closest to X and satisfying $2^n$ in integers greater than X, and the code resource is an orthogonal spreading code or a sequence of a reference signal. For example, time-frequency resources and code resources of a 5-port reference signal resource mapping diagram may be the same as time-frequency resources and code resources of five consecutive ports in an 8-port reference signal resource mapping diagram.

102: The UE performs channel measurement according to the reference signal to determine channel state information, and feeds back the channel state information to a base station.

In a preferred implementation of the present invention, the X consecutive ports are the $0^{th}$ port to the $(X-1)^{th}$ port in the Y ports, or the X consecutive ports are the $(Y-X)^{th}$ port to the $(Y-1)^{th}$ port in the Y ports.

In this way, a resource mapping diagram of a reference signal whose port quantity does not satisfy $2^n$ and is less than or equal to 8 can be obtained according to an existing resource mapping diagram of a reference signal whose port quantity satisfies $2^n$ and is less than or equal to 8.

In another preferred implementation of the present invention, K2=K1, or $$K2 = \left\lceil \frac{Y*K1}{X} \right\rceil,$$

and ⌈ ⌉ represents rounding down. For example, if 40 time-frequency resource locations in one subframe are used to carry a reference signal, an existing 8-port reference signal resource mapping diagram may have 40/8=5 configurations. If K2=K1, that is, a 5-port reference signal resource mapping diagram also has five configurations, time-frequency resource locations corresponding to five consecutive ports in one configuration of the 8-port reference signal resource mapping diagram are used as time-frequency resource locations of the 5-port reference signal resource mapping diagram. If $$K2 = \left\lceil \frac{5 \cdot 8}{5} \right\rceil = 8,$$

the 5-port reference signal resource mapping diagram has eight configurations.

In another preferred implementation of the present invention, at least one of the K2 second reference signal resource mapping diagrams includes time-frequency resources of at least two of the first reference signal resource mapping diagrams.

For example, if the first reference signal resource mapping diagram is a 4-port reference signal resource mapping diagram, the second reference signal resource mapping diagram is a 3-port reference signal resource mapping diagram, and 40 time-frequency resource locations in one subframe are used to carry a reference signal, the existing 4-port reference signal resource mapping diagram may have 40/4=10 configurations, and the 3-port reference signal resource mapping diagram may have $$\left\lceil \frac{4 \cdot 10}{3} \right\rceil = 13$$

configurations. In this case, there may be ten 3-port reference signal resource mapping diagrams when time-frequency resource locations corresponding to three consecutive ports in the 4-port reference signal resource mapping diagram are used. In this case, one port other than the three consecutive ports in the 4-port reference signal resource mapping diagram remains, and one 3-port reference signal resource mapping diagram may be obtained when time-frequency resource locations corresponding to the remaining ports in three 4-port reference signal resource mapping diagrams are used. Therefore, one 3-port reference signal resource mapping diagram may include three 4-port reference signal resource mapping diagrams.

Further, an X-port second reference signal resource mapping diagram in the K2 second reference signal resource mapping diagrams includes K3 first reference signal resource mapping diagrams, each of the K3 first reference signal resource mapping diagrams includes time-frequency resources corresponding to H ports, H=X/K3, and K3 is a positive integer less than X.

For example, if the second reference signal resource mapping diagram is a 6-port reference signal resource mapping diagram, and the first reference signal resource mapping diagram is an 8-port reference signal resource mapping diagram, assuming that the 6-port reference signal resource mapping diagram includes three 8-port reference signal resource mapping diagrams, each of the three 8-port reference signal resource mapping diagrams includes time-frequency resource locations corresponding to 6/3=2 ports.

Further, the H ports are the $0^{th}$ port to the $(H-1)^{th}$ port or the $(Y-H)^{th}$ port to the $(Y-1)^{th}$ port in the first reference signal resource mapping diagram.

In another preferred implementation of the present invention, the UE obtains the second reference signal resource mapping diagram.

The X-port second reference signal resource mapping diagram includes an $X_1$-port reference signal resource mapping diagram and an $X_2$-port reference signal resource mapping diagram.

$X_1+X_2=X$, a difference between $X_1$ and $X_2$ is less than 2, the $X_1$-port reference signal resource mapping diagram and $X_2$-port reference signal resource mapping diagram are obtained by the UE from m subframes, and m is 1 or 2.

The $X_1$-port reference signal resource mapping diagram is the first reference signal resource mapping diagram, and the $X_2$-port reference signal resource mapping diagram is the second reference signal resource mapping diagram; or the $X_1$-port reference signal resource mapping diagram and the $X_2$-port reference signal resource mapping diagram both are the second reference signal resource mapping diagrams.

For example, for an 11-port reference signal resource mapping diagram, 11=3+8, or 11=4+7, . . . , or 11=5+6, and a difference between 5 and 6 is less than 2. Therefore, the 11-port reference signal resource mapping diagram is a 5-port reference signal resource mapping diagram and a 6-port reference signal resource mapping diagram. The 11-port reference signal resource mapping diagram is the second reference signal resource mapping diagram.

Further, X may be an integer greater than 8.

In another preferred implementation of the present invention, the UE receives a sequence that is notified by the base station and that is of subframes carrying the $X_1$-port reference signal resource mapping diagram and the $X_2$-port reference signal resource mapping diagram.

Alternatively, a sequence of subframes carrying the $X_1$-port reference signal resource mapping diagram and the $X_2$-port reference signal resource mapping diagram is preset, and the sequence is a descending order of port quantities or an ascending order of port quantities.

For example, the 11-port reference signal resource mapping diagram is the 5-port reference signal resource mapping diagram and the 6-port reference signal resource mapping diagram. The sequence notified by the base station and received by the UE is the 5-port reference signal resource mapping diagram and the 6-port reference signal resource mapping diagram, or the 6-port reference signal resource mapping diagram and the 5-port reference signal resource mapping diagram. The 11-port reference signal resource mapping diagram is the second reference signal resource mapping diagram.

In another preferred implementation of the present invention, the UE receives a number of a subframe carrying the $X_1$-port reference signal resource mapping diagram and a number of a subframe carrying the $X_2$-port reference signal resource mapping diagram that are notified by the base station.

Alternatively, the UE receives a number of a subframe carrying the $X_1$-port reference signal resource mapping diagram and a subframe interval between a subframe carrying the $X_2$-port reference signal resource mapping diagram and the subframe carrying the $X_1$-port reference signal resource mapping diagram that are notified by the base station.

In another preferred implementation of the present invention, the UE obtains the second reference signal resource mapping diagram.

The second reference signal resource mapping diagram includes each of an $X_1$-port reference signal resource mapping diagram, an $X_2$-port reference signal resource mapping diagram, . . . , and an $X_i$-port reference signal resource mapping diagram. $X_1+X_2 \ldots +X_i=X$, and each of $X_1, X_2, \ldots$, and $X_i$ can be represented as $2^n$.

The $X_1$-port reference signal resource mapping diagram, the $X_2$-port reference signal resource mapping diagram, . . . , and the $X_i$-port reference signal resource mapping diagram are obtained by the UE from at least one subframe.

For example, a 14-port reference signal resource mapping diagram may include an 8-port reference signal resource mapping diagram, a 4-port reference signal resource mapping diagram, and a 2-port reference signal resource mapping diagram. The 14-port reference signal resource mapping diagram is the second reference signal resource mapping diagram, and each of the 8-port reference signal resource mapping diagram, the 4-port reference signal resource mapping diagram, and the 2-port reference signal resource mapping diagram is the first reference signal resource mapping diagram.

Further, X may be an integer greater than 8.

Further, the $X_1$-port reference signal resource mapping diagram, the $X_2$-port reference signal resource mapping diagram, . . . , and the $X_i$-port reference signal resource mapping diagram are obtained by the UE from one subframe, or the $X_1$-port reference signal resource mapping diagram, the $X_2$-port reference signal resource mapping diagram, . . . , and the $X_i$-port reference signal resource mapping diagram are obtained by the UE from i subframes.

In another preferred implementation of the present invention, the UE receives a sequence that is notified by the base station and that is of subframes carrying the $X_1$-port reference signal resource mapping diagram, the $X_2$-port reference signal resource mapping diagram, . . . , and the $X_i$-port reference signal resource mapping diagram.

Alternatively, a sequence of subframes carrying the $X_1$-port reference signal resource mapping diagram, the $X_2$-port reference signal resource mapping diagram, . . . , and the $X_i$-port reference signal resource mapping diagram is predefined.

The sequence of the subframes is an ascending order of port quantities, or a descending order of port quantities, or a sequence of a largest port quantity, a smallest port quantity, a second largest port quantity, a second smallest port quantity, . . . .

For example, a sequence of the 14-port reference signal resource mapping diagram may be: the 8-port reference signal resource mapping diagram, the 4-port reference signal resource mapping diagram, and the 2-port reference signal resource mapping diagram; or the 2-port reference signal resource mapping diagram, the 4-port reference signal resource mapping diagram, and the 8-port reference signal resource mapping diagram; or the 8-port reference signal resource mapping diagram, the 2-port reference signal resource mapping diagram, and the 4-port reference signal resource mapping diagram.

In another preferred implementation of the present invention, the UE receives configuration information that is notified by the base station and that is of each reference signal resource mapping diagram of the $X_1$-port reference signal resource mapping diagram, the $X_2$-port reference signal resource mapping diagram, . . . , and the $X_i$-port reference signal resource mapping diagram.

Alternatively, the UE receives joint coding signaling sent by the base station. The joint coding signaling is used to indicate configuration information of $X_1$-port reference signal resource mapping diagram, configuration information of the $X_2$-port reference signal resource mapping diagram, . . . , and configuration information of the $X_i$-port reference signal resource mapping diagram.

Alternatively, the UE receives configuration information of the $X_1$-port reference signal resource mapping diagram and a correspondence between configuration information of an $X_j$-port reference signal resource mapping diagram and the configuration information of the $X_1$-port reference signal resource mapping diagram that are notified by the base station, where j is an integer greater than 1 and less than or equal to i.

Alternatively, configuration information of the $X_1$-port reference signal resource mapping diagram, configuration information of the $X_2$-port reference signal resource mapping diagram, . . . , and configuration information of the $X_i$-port reference signal resource mapping diagram are predefined.

In another preferred implementation of the present invention, a number of the subframe carrying the $X_1$-port reference signal resource mapping diagram, a number of the subframe carrying the $X_2$-port reference signal resource mapping diagram, . . . , and a number of the subframe carrying the $X_i$-port reference signal resource mapping diagram are predefined.

Alternatively, the UE receives a number of the subframe carrying the $X_1$-port reference signal resource mapping diagram, a number of the subframe carrying the $X_2$-port reference signal resource mapping diagram, . . . , and a number of the subframe carrying the $X_i$-port reference signal resource mapping diagram that are notified by the base station.

Alternatively, the UE receives a number of the subframe carrying the $X_1$-port reference signal resource mapping diagram, and a subframe interval between a number of a subframe carrying the $X_j$-port reference signal resource mapping diagram and the number of the subframe carrying the $X_1$-port reference signal resource mapping diagram that are notified by the base station, where j is an integer greater than 1 and less than or equal to i.

In another preferred embodiment of the present invention, if an $X_t$-port reference signal resource mapping diagram and the $X_j$-port reference signal resource mapping diagram are in different subframes, t is an integer greater than or equal to 1 and less than or equal to i, and t is not equal to j, the $X_t$-port reference signal resource mapping diagram and the $X_j$-port reference signal resource mapping diagram have L same relative time-frequency resource locations in each PRB pair, and L is a smallest value in; or time-frequency resource locations of the $X_i$-port reference signal resource mapping diagram and the $X_j$-port reference signal resource mapping diagram in each PRB pair are different.

For example, for a 5-port reference signal resource mapping diagram and a 6-port reference signal resource mapping diagram, because 5 is less than 6, there are five same relative time-frequency resource locations between the two. The relative time-frequency resource location means that the 5-port reference signal resource mapping diagram and the 6-port reference signal resource mapping diagram are not in a same subframe, but there are five same time-frequency resource locations between time-frequency resource locations of the 5-port reference signal resource mapping diagram in a subframe carrying the 5-port reference signal resource mapping diagram and time-frequency resource locations of the 6-port reference signal resource mapping diagram in a subframe carrying the 6-port reference signal resource mapping diagram. The five same time-frequency resource locations are referred to as five same relative time-frequency resource locations.

Alternatively, time-frequency resource locations of the $X_i$-port reference signal resource mapping diagram and the $X_j$-port reference signal resource mapping diagram are different.

Further, there are Q overlapping time-frequency resource locations between time-frequency resource locations of the $X_1$-port reference signal resource mapping diagram, the $X_2$-port reference signal resource mapping diagram, . . . , and the $X_i$-port reference signal resource mapping diagram, and Q is a smallest value in $X_1, X_2 \ldots X_i$.

For example, a 14-port reference signal resource mapping diagram may include an 8-port reference signal resource mapping diagram, a 4-port reference signal resource mapping diagram, and a 2-port reference signal resource mapping diagram. A quantity of overlapping time-frequency resource locations between them is a smallest value in 2, 4, and 8. That is, there are two overlapping time-frequency resource locations between time-frequency resource locations of the 8-port reference signal resource mapping diagram, the 4-port reference signal resource mapping diagram, and the 2-port reference signal resource mapping diagram.

Further, the Q overlapping time-frequency resource locations are time-frequency resource locations corresponding to the $0^{th}$ port to the $(Q-1)^{th}$ port in the $X_j$-port reference signal resource mapping diagram.

It should be noted that in the method provided in this embodiment of the present invention, a port number may start from 0. That is, a $0^{th}$ port in this application is the first port, and by analog, a $(Y-1)^{th}$ port is the $Y^{th}$ port.

In another preferred embodiment of the present invention, if the second reference signal resource mapping diagram is a 3-port reference signal resource mapping diagram, because an integer that is the closest to 3 and satisfies $2^n$ in integers greater than 3 is 4, the first reference signal resource mapping diagram is a 4-port reference signal resource mapping diagram. K1=K2=10, and time-frequency resources and code resources of three consecutive ports in four ports of the 4-port reference signal resource mapping diagram are the same time-frequency resources and code resources of the 3-port reference signal resource mapping diagram.

Figure 2:
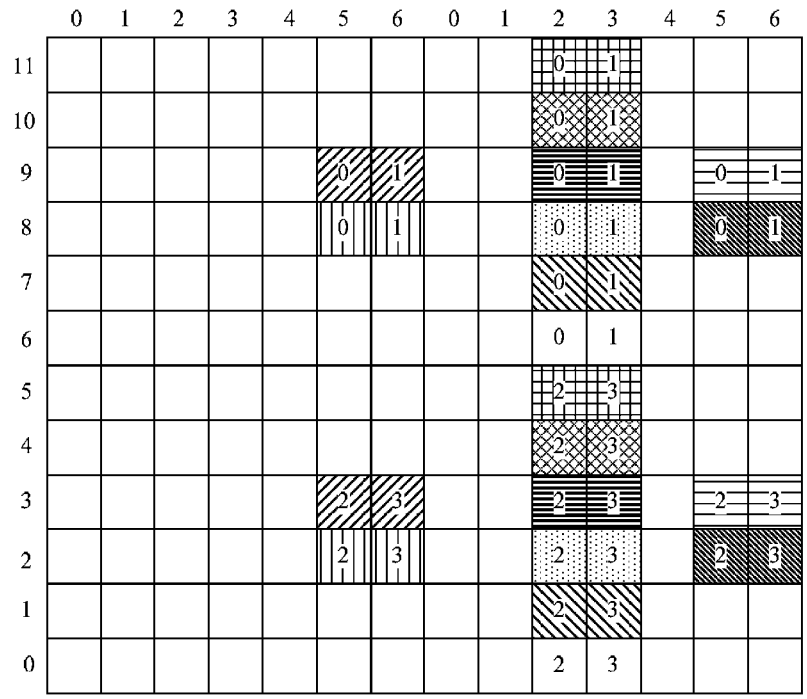
FIG. 2 is a schematic diagram of an existing 4-port reference signal resource mapping diagram.
Figure 3:
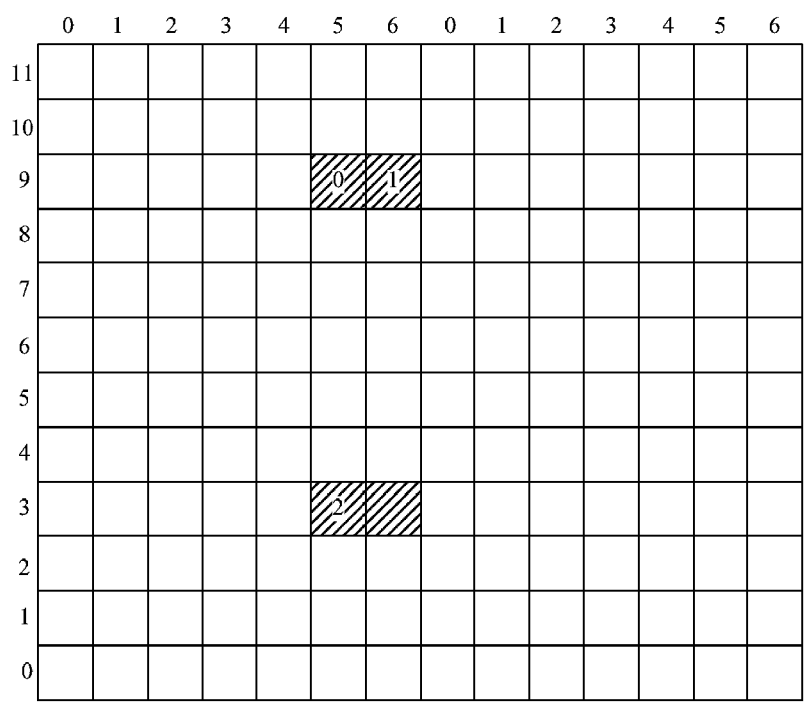
FIG. 3 is a schematic diagram of a 3-port reference signal resource mapping diagram according to an embodiment of the present invention.

FIG. 2 (including 10 types of 4-port reference signal resource mapping diagrams) shows the 4-port reference signal resource mapping diagram. FIG. 3 shows the 3-port reference signal resource mapping diagram (the 3-port reference signal resource mapping diagram is the second reference signal resource mapping diagram in the present invention). The three consecutive ports are the $0^{th}$ port to the second port in the four ports.

Specifically, the 4-port reference signal resource mapping diagram includes 40 time-frequency resource locations, and the 4-port reference signal resource mapping diagram includes 40/4=10 configurations. Assuming that a time-frequency resource location may be represented as (k,l), k and l satisfy the following conditions:

$$k = k' + \begin{cases} -0, p = \{0^{th} \text{ port, first port}\} \\ -6, p = \{\text{second port, third port}\} \end{cases}$$

$$l = l' + l'', l'' = 0, 1, l' = l'_1, l'_2 \ldots l'_{10}$$

$$w_{l''} = \begin{cases} 1, p = \{0^{th} \text{ port, second port}\} \\ (-1)^{l''}, p = \{\text{first port, third port}\} \end{cases}$$

$$(k', l') = \begin{cases} k'_0 = 9, l'_0 = 5, n_s \bmod 2 = 0 \\ k'_1 = 11, l'_1 = 2, n_s \bmod 2 = 1 \\ k'_2 = 9, l'_2 = 2, n_s \bmod 2 = 1 \\ k'_3 = 7, l'_3 = 2, n_s \bmod 2 = 1 \\ k'_4 = 9, l'_4 = 5, n_s \bmod 2 = 1 \\ k'_5 = 8, l'_5 = 5, n_s \bmod 2 = 0 \\ k'_6 = 10, l'_6 = 2, n_s \bmod 2 = 1 \\ k'_7 = 8, l'_7 = 2, n_s \bmod 2 = 1 \\ k'_8 = 6, l'_8 = 2, n_s \bmod 2 = 1 \\ k'_9 = 8, l'_9 = 5, n_s \bmod 2 = 1 \end{cases}$$

where (k',l') is coordinates of a time-frequency resource location corresponding to the $0^{th}$ port in each configuration in a resource mapping diagram corresponding to a subframe, time-frequency resource locations corresponding to the other three ports in this configuration may be deduced according to a condition that k satisfies, $n_s \bmod 2 = 1$ represents that the time-frequency resource location is in a second slot of a subframe, and $n_s \bmod 2 = 0$ represents that the time-frequency resource location is in a first slot of a subframe.

Because three consecutive ports in the 3-port reference signal resource mapping diagram are the $0^{th}$ port to the second port in the four ports in the 4-port reference signal resource mapping diagram, a time-frequency resource location of the 3-port reference signal resource mapping diagram may be represented as (k,l), and k and l satisfy the following conditions:

$$k = k' + \begin{cases} -0, p = \{0^{th} \text{ port, first port}\} \\ -6, p = \{\text{second port}\} \end{cases}$$

$$l = l' + l'', l'' = 0, 1, l' = l'_1, l'_2 \ldots l'_{10}$$

$$w_{l''} = \begin{cases} 1, p = \{0^{th} \text{ port, second port}\} \\ (-1)^{l''}, p = \{\text{first port}\} \end{cases}$$

$$(k', l') = \begin{cases} k'_0 = 9, l'_0 = 5, n_s \bmod 2 = 0 \\ \text{or } k'_1 = 11, l'_1 = 2, n_s \bmod 2 = 1 \\ \text{or } k'_2 = 9, l'_2 = 2, n_s \bmod 2 = 1 \\ \text{or } k'_3 = 7, l'_3 = 2, n_s \bmod 2 = 1 \\ \text{or } k'_4 = 9, l'_4 = 5, n_s \bmod 2 = 1 \\ \text{or } k'_5 = 8, l'_5 = 5, n_s \bmod 2 = 0 \\ \text{or } k'_6 = 10, l'_6 = 2, n_s \bmod 2 = 1 \\ \text{or } k'_7 = 8, l'_7 = 2, n_s \bmod 2 = 1 \\ \text{or } k'_8 = 6, l'_8 = 2, n_s \bmod 2 = 1 \\ \text{or } k'_9 = 8, l'_9 = 5, n_s \bmod 2 = 1 \end{cases}.$$

Further, with reference to FIG. 3, in a first configuration of the 3-port reference signal resource mapping diagram, (k',l')=(k'$_0$,l'$_0$)=(9, 5). It may be learned with reference to the foregoing formulas that a time-frequency resource location corresponding to the 0$^{th}$ port is (k'$_0$–0,l'$_0$+0) or (k'$_0$–0,l'$_0$+1), that is, (9, 5) or (9, 6), and a spreading code corresponding to (9, 5) or (9, 6) is (1, 1). A time-frequency resource location corresponding to the first port is (k'$_0$–0,l'$_0$+0) or (k'$_0$–0,l'$_0$+1), that is, (9, 5) or (9, 6), and a spreading code corresponding to (9, 5) or (9, 6) is (1, –1). A time-frequency resource location corresponding to the second port is (k'$_0$–6,l'$_0$+0) or (k'$_0$–6,l'$_0$+1), that is, (3, 5) or (3, 6), and a spreading code corresponding to (3, 5) or (3, 6) is (1, 1). Time-frequency resource locations corresponding to the three ports in the first configuration are in a first slot of a subframe.

In a second configuration of the 3-port reference signal resource mapping diagram, (k',l') (k'$_1$,l'$_1$)=(11, 2). It may be learned with reference to the foregoing formulas that a time-frequency resource location corresponding to the 0$^{th}$ port is (k'$_1$–0, l'$_1$+0) or (k'$_1$–0,l'$_1$+1) that is, (11, 2) or (11,3), and a spreading code corresponding to (11, 2) or (11, 3) is (1, 1). A time-frequency resource location corresponding to the first port is (k'$_1$–0,l'$_1$+0) or (k'$_1$–0,l'$_1$+1) that is, (11, 2) or (11, 3), and a spreading code corresponding to (11, 2) or (11, 3) is (1, –1). A time-frequency resource location corresponding to the second port is (k'$_1$–6,l'$_1$+0) or (k'$_0$–6,l'$_0$+1), that is, (5, 2) or (5, 3), and a spreading code corresponding to (5, 2) or (5, 3) is (1, 1).

In the other eight configurations, deduction processes for time-frequency resource locations corresponding to three ports of the 3-port reference signal resource mapping diagram are the same as the deduction processes for the time-frequency resource locations corresponding to the three ports in the first configuration and the second configuration, only values of (k',l') are different, and details are not described herein again.

In addition, the three consecutive ports are the first port to the third port in the four ports.

Specifically, the time-frequency resource location may be represented as (k,l), and k and l satisfy the following conditions:

$$k = k' + \begin{cases} -0, p = \{0^{th} \text{ port, first port}\} \\ -6, p = \{\text{second port}\} \end{cases}$$

$$l = l' + l'', l'' = 0, 1, l' = l'_1, l'_2 \ldots l'_{10}$$

$$w_{l''} = \begin{cases} 1, p = \{0^{th} \text{ port, second port}\} \\ (-1)^{l''}, p = \{\text{first port}\} \end{cases}$$

$$(k', l') = \begin{cases} k'_0 = 9, l'_0 = 5, n_s \bmod 2 = 0 \\ \text{or } k'_1 = 11, l'_1 = 2, n_s \bmod 2 = 1 \\ \text{or } k'_2 = 9, l'_2 = 2, n_s \bmod 2 = 1 \\ \text{or } k'_3 = 7, l'_3 = 2, n_s \bmod 2 = 1 \\ \text{or } k'_4 = 9, l'_4 = 5, n_s \bmod 2 = 1 \\ \text{or } k'_5 = 8, l'_5 = 5, n_s \bmod 2 = 0 \\ \text{or } k'_6 = 10, l'_6 = 2, n_s \bmod 2 = 1 \\ \text{or } k'_7 = 8, l'_7 = 2, n_s \bmod 2 = 1 \\ \text{or } k'_8 = 6, l'_8 = 2, n_s \bmod 2 = 1 \\ \text{or } k'_9 = 8, l'_9 = 5, n_s \bmod 2 = 1 \end{cases}.$$

It should be noted that in this embodiment of the present invention, the ports start from the 0$^{th}$ port.

In another preferred embodiment of the present invention, if the second reference signal resource mapping diagram is a 3-port reference signal resource mapping diagram, because an integer that is the closest to 3 and satisfies 2$^n$ in integers greater than 3 is 4, the first reference signal resource mapping diagram is a 4-port reference signal resource mapping diagram. K1=10, and $$K2 = \left\lceil \frac{4 \cdot 10}{3} \right\rceil = 13.$$

In addition to the 10 configurations of the 3-port reference signal resource mapping diagram in the previous preferred embodiment, the 3-port reference signal resource mapping diagram may further have three configurations. Each 3-port reference signal resource mapping diagram includes three 4-port reference signal resource mapping diagrams, and each 4-port reference signal resource mapping diagram includes a time-frequency resource location corresponding to one port.

Specifically, the following three are included:

$$k = \begin{cases} k'_0 - 6, 0^{th} \text{ port} \\ k'_5 - 6, \text{ first port} \\ k'_1 - 4, \text{ second port} \end{cases}$$

$$l = \begin{cases} l'_1 + l'' \\ l'_2 + l'' \\ l'_3 + l'', l'' = 0, 1, w_{l''} = (-1)^{l''} \end{cases} ; \text{ or}$$

$$k = \begin{cases} k'_6 - 6, 0^{th} \text{ port} \\ k'_2 - 6, \text{ first port} \\ k'_7 - 6, \text{ second port} \end{cases}$$

$$l = \begin{cases} l'_4 + l'' \\ l'_5 + l'' \\ l'_6 + l'', l'' = 0, 1, w_{l''} = (-1)^{l''} \end{cases} ; \text{ or}$$

$$k = \begin{cases} k'_3 - 6, 0^{th} \text{ port} \\ k'_8 - 6, \text{ first port} \\ k'_4 - 6, \text{ second port} \end{cases}$$

$$l = \begin{cases} l'_7 + l'' \\ l'_8 + l'' \\ l'_9 + l'', l'' = 0, 1, w_{l''} = (-1)^{l''} \end{cases} ;$$

$$(k', l') = \begin{cases} k'_0 = 9, l'_0 = 5, n_s \bmod 2 = 0 \\ \text{or } k'_1 = 11, l'_1 = 2, n_s \bmod 2 = 1 \\ \text{or } k'_2 = 9, l'_2 = 2, n_s \bmod 2 = 1 \\ \text{or } k'_3 = 7, l'_3 = 2, n_s \bmod 2 = 1 \\ \text{or } k'_4 = 9, l'_4 = 5, n_s \bmod 2 = 1 \\ \text{or } k'_5 = 8, l'_5 = 5, n_s \bmod 2 = 0 \\ \text{or } k'_6 = 10, l'_6 = 2, n_s \bmod 2 = 1 \\ \text{or } k'_7 = 8, l'_7 = 2, n_s \bmod 2 = 1 \\ \text{or } k'_8 = 6, l'_8 = 2, n_s \bmod 2 = 1 \\ \text{or } k'_9 = 8, l'_9 = 5, n_s \bmod 2 = 1 \end{cases}.$$

Figure 4:
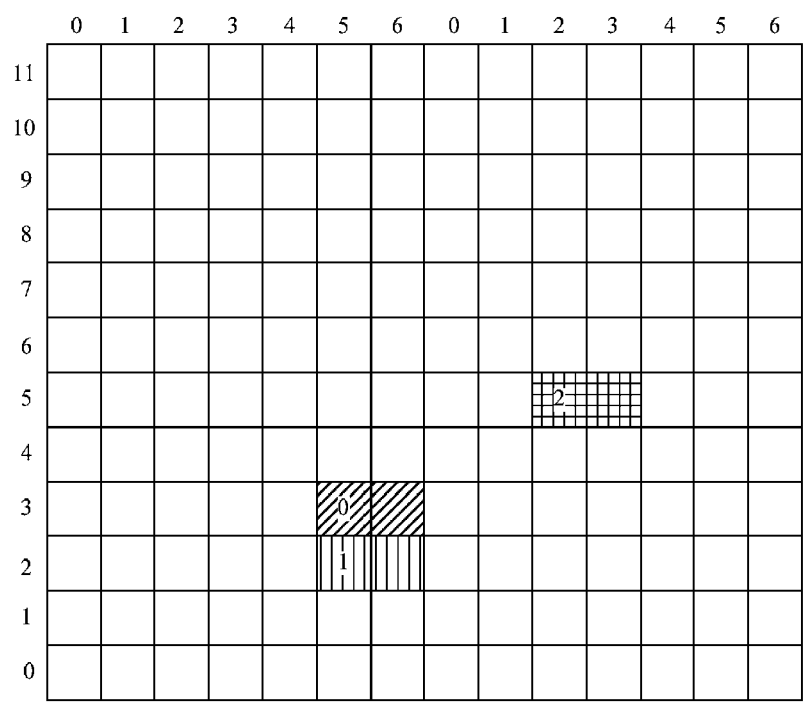
FIG. 4 is a schematic diagram of another 3-port reference signal resource mapping diagram according to an embodiment of the present invention.

FIG. 4 shows one of the three 3-port reference signal resource mapping diagrams.

In another preferred implementation of the present invention, if the second reference signal resource mapping diagram is a 5-port reference signal resource mapping diagram, because an integer that is the closest to 5 and satisfies $2^n$ in integers greater than 5 is 8, the first reference signal resource mapping diagram is an 8-port reference signal resource mapping diagram. K1=K2=5, and time-frequency resources and code resources of five consecutive ports in eight ports of the 8-port reference signal resource mapping diagram are the same as time-frequency resources and code resources of the 5-port reference signal resource mapping diagram.

Figure 5:
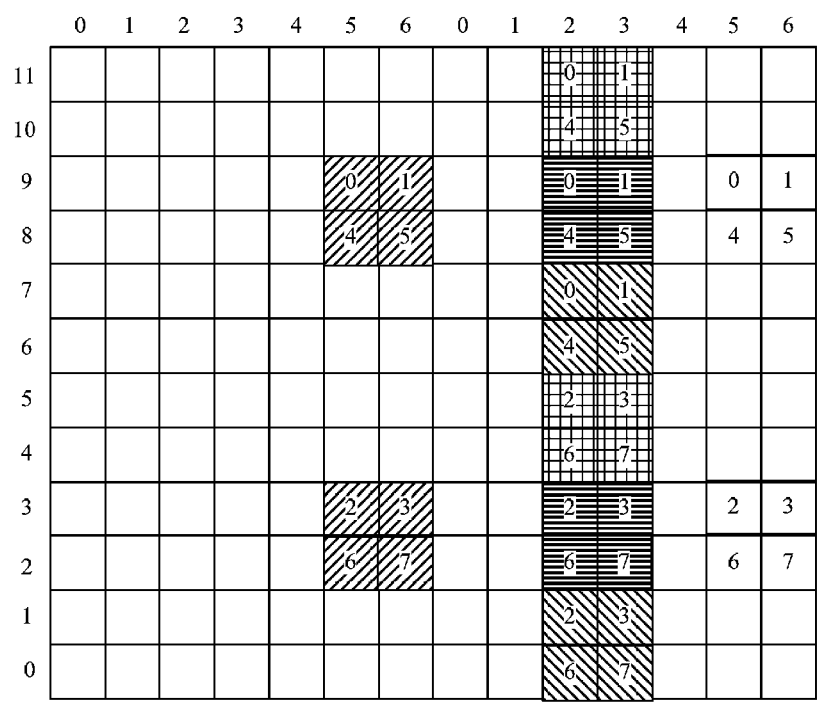
FIG. 5 is a schematic diagram of an existing 8-port reference signal resource mapping diagram.
Figure 6:
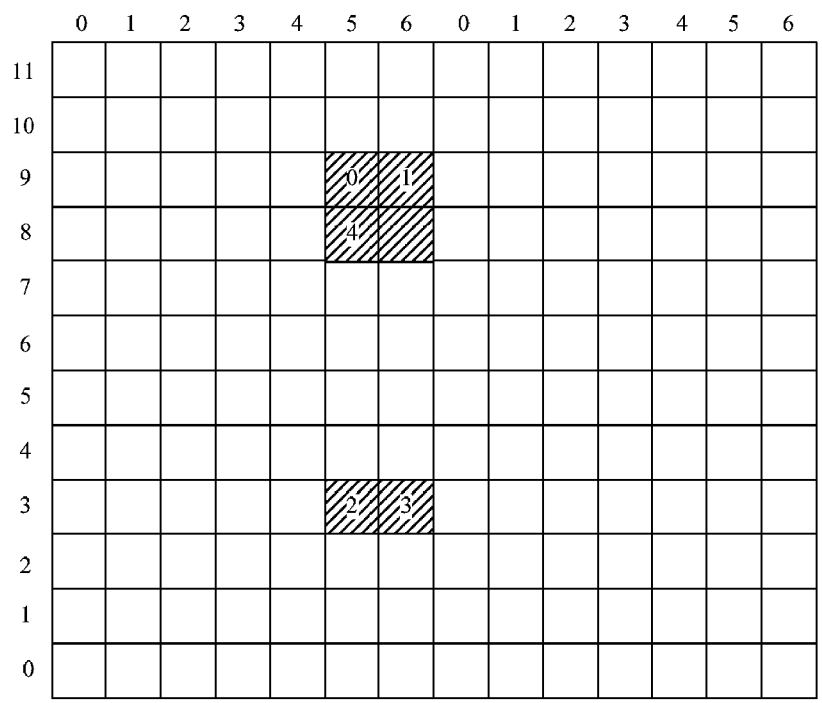
FIG. 6 is a schematic diagram of a 5-port reference signal resource mapping diagram according to an embodiment of the present invention.

FIG. 5 (including five 8-port reference signal resource mapping diagrams) shows the 8-port reference signal resource mapping diagram, and FIG. 6 shows the 5-port reference signal resource mapping diagram. The five consecutive ports are the $0^{th}$ port to the fourth port in the eight ports.

Specifically, the 8-port reference signal resource mapping diagram includes 40 time-frequency resource locations, and the 8-port reference signal resource mapping diagram includes 40/8=5 configurations. Assuming that a time-frequency resource location may be represented as (k,l), k and l satisfy the following conditions:

$$k = k' + \begin{cases} -0, & p = \{0^{th} \text{ port, first port}\} \\ -6, & p = \{\text{second port, third port}\}, \\ -1, & p = \{\text{fourth port}\} \end{cases}$$

$$l = l' + l'', l'' = 0, 1, l' = l'_1, l'_2 \ldots l'_5$$

$$\text{spreading factor } w_{l''} = \begin{cases} 1, & p = \{0^{th} \text{ port, second port, fourth port}\} \\ (-1)^{l''}, & p = \{\text{first port, third port}\} \end{cases}$$

$$(k', l') = \begin{cases} k'_0 = 9, l'_0 = 5, n_s \bmod 2 = 0 \\ \text{or } k'_1 = 11, l'_1 = 2, n_s \bmod 2 = 1 \\ \text{or } k'_2 = 9, l'_2 = 2, n_s \bmod 2 = 1 \\ \text{or } k'_3 = 7, l'_3 = 2, n_s \bmod 2 = 1 \\ \text{or } k'_4 = 9, l'_4 = 5, n_s \bmod 2 = 1 \end{cases}.$$

Further, with reference to FIG. 6, in a first configuration of the 5-port reference signal resource mapping diagram, (k',l')=(k'$_0$,l'$_0$)=(9, 5). It may be learned with reference to the foregoing formulas that a time-frequency resource location corresponding to the $0^{th}$ port is (k'$_0$−0,l'$_0$+0) or (k'$_0$−0,l'$_0$+1), that is, (9, 5) or (9, 6), and a spreading code corresponding to (9, 5) or (9, 6) is (1, 1). A time-frequency resource location corresponding to the first port is (k'$_0$−0,l'$_0$+0) or (k'$_0$−0,l'$_0$+1), that is, (9,5) or (9, 6), and a spreading code corresponding to (9, 5) or (9, 6) is (1, −1). A time-frequency resource location corresponding to the second port is (k'$_0$−6,l'$_0$+0) or (k'$_0$−6,l'$_0$+1), that is, (3, 5) or (3, 6), and a spreading code corresponding to (3, 5) or (3, 6) is (1, 1). A time-frequency resource location corresponding to the third port is (k'$_0$−6, l'$_0$+0) or (k'$_0$−6,l'$_0$+1), that is, (3, 5) or (3, 6), and a spreading code corresponding to (3, 5) or (3, 6) is (1, −1). A time-frequency resource location corresponding to the fourth port is (k'$_0$−6,l'$_0$+0) or (k'$_0$−6,l'$_0$+1), that is, (8, 5) or (8, 6), and a spreading code corresponding to (8, 5) or (8, 6) is (1, 1).

In the other four configurations, deduction processes for time-frequency resource locations corresponding to five ports in the 5-port reference signal resource mapping diagram are the same as the deduction process for the time-frequency resource locations corresponding to the five ports in the first configuration, only values of (k',l') are different, and details are not described herein again.

In addition, if the five consecutive ports are the third to the seventh ports in the eight ports, the time-frequency resource location (k,l) satisfy the following conditions:

$$k = k' + \begin{cases} -6, & p = \{\text{third port}\} \\ -1, & p = \{\text{fourth port, fifth port}\}, \\ -7, & p = \{\text{sixth port, seventh port}\} \end{cases}$$

$$l = l' + l'', l'' = 0, 1, l' = l'_1, l'_2 \ldots l'_5$$

$$\text{spreading factor } w_{l''} = \begin{cases} 1, & p = \{\text{fourth port, sixth port}\} \\ (-1)^{l''}, & p = \{\text{third port, fifth port, seventh port}\} \end{cases}$$

$$(k', l') = \begin{cases} k'_0 = 9, l'_0 = 5, n_s \bmod 2 = 0 \\ k'_1 = 11, l'_1 = 2, n_s \bmod 2 = 1 \\ k'_2 = 9, l'_2 = 2, n_s \bmod 2 = 1 \\ k'_3 = 7, l'_3 = 2, n_s \bmod 2 = 1 \\ k'_4 = 9, l'_4 = 5, n_s \bmod 2 = 1 \end{cases}.$$

Figure 7:
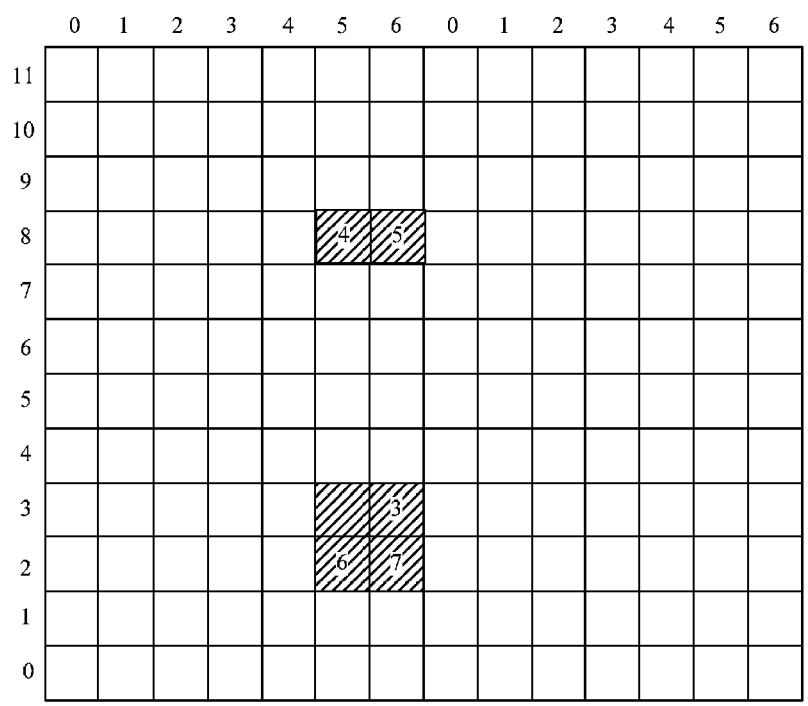
FIG. 7 is a schematic diagram of another 5-port reference signal resource mapping diagram according to an embodiment of the present invention.

FIG. 7 shows a corresponding 5-port reference signal resource mapping diagram when the five consecutive ports are the third port to the seventh port in the eight ports. A spreading code corresponding to the third port is (1, −1), a spreading code corresponding to the fourth port is (1, 1), a spreading code corresponding to the fifth port is (1, −1), a spreading code corresponding to the sixth port is (1, 1), and a spreading code corresponding to the seventh port is (1, −1).

In another preferred embodiment of the present invention, if the second reference signal resource mapping diagram is a 5-port reference signal resource mapping diagram, the first reference signal resource mapping diagram is an 8-port reference signal resource mapping diagram. K1=5, $$K2 = \left\lceil \frac{5 \cdot 8}{2} \right\rceil = 13.$$

Figure 8:
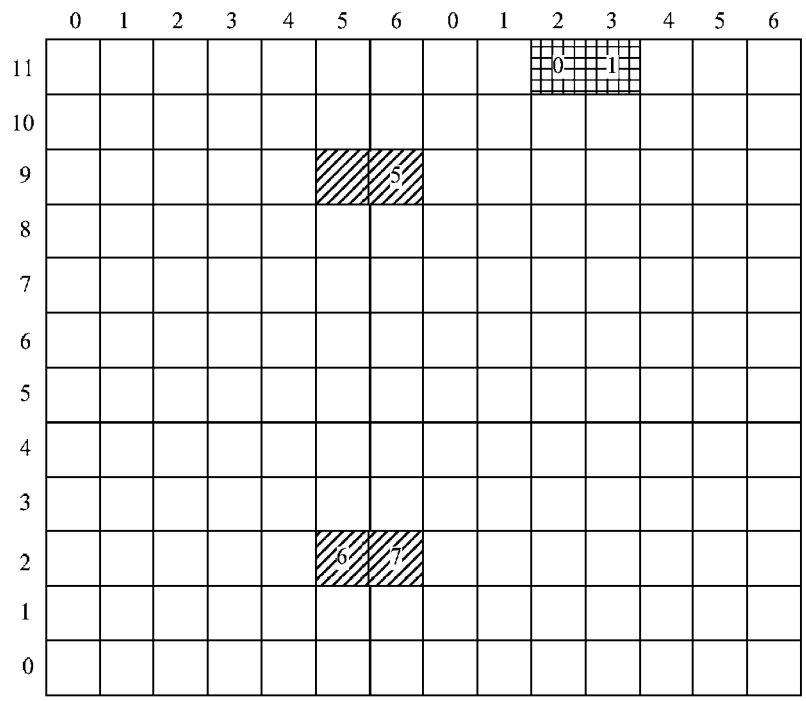
FIG. 8 is a schematic diagram of another 5-port reference signal resource mapping diagram according to an embodiment of the present invention.

In addition to five configurations obtained by means of occupying time-frequency resource locations corresponding to five consecutive ports in the 8-port reference signal resource mapping diagram, the 5-port reference signal resource mapping diagram may further have three configurations. Each 5-port reference signal resource mapping diagram includes five 8-port reference signal resource mapping diagrams, and each 8-port reference signal resource mapping diagram includes a time-frequency resource location corresponding to one port. For example, FIG. 8 shows a 5-port reference signal resource mapping diagram. Each 5-port reference signal resource mapping diagram includes two 8-port reference signal resource mapping diagrams, one 8-port reference signal resource mapping diagram includes time-frequency resource locations corresponding to two ports, and the other 8-port reference signal resource mapping diagram includes time-frequency resource locations corresponding to three ports. Three ports in one 8-port reference signal resource mapping diagram may be the fifth port, the sixth port, and the seventh port, and two ports in the other 8-port reference signal resource mapping diagram may be the $0^{th}$ port and the first port. A spreading code corresponding to the fifth port is (1, −1), a spreading code corresponding to the sixth port is (1, 1), a spreading code corresponding to the seventh port is (1, −1), a spreading code corresponding to the $0^{th}$ port is (1, 1), and a spreading code corresponding to the first port is (1, −1).

Herein, the 5-port reference signal resource mapping diagram may include K3 first reference signal resource mapping diagrams, each of the K3 first reference signal resource mapping diagrams includes time-frequency resources corresponding to H ports, H=X/K3, and K3 is a positive integer less than X.

In a preferred embodiment of the present invention, the method further includes:

sending, by the base station, a configuration index of the second reference signal resource mapping diagram to the UE by using signaling, so that the UE determines, according to the configuration index of the second reference signal resource mapping diagram, a time-frequency resource location corresponding to the second reference signal resource mapping diagram.

In a preferred embodiment of the present invention, if the second reference signal resource mapping diagram includes at least two first reference signal resource mapping diagrams of different quantities of ports, the sending unit separately notifies configuration information of each first reference signal resource mapping diagram included in the at least two first reference signal resource mapping diagrams, so that the UE obtains the second reference signal resource mapping diagram according to the at least two first reference signal resource mapping diagrams of different quantities of ports.

In a preferred embodiment of the present invention, for all configurations of the second reference signal resource mapping diagram of a same quantity of ports, there are two configurations whose resource mapping diagrams have overlapping resources.

In a preferred embodiment of the present invention, a range of a resource mapping diagram corresponding to the received configuration information that is notified by the base station and that is of each first reference signal resource mapping diagram included in the second reference signal resource mapping diagram is a set of all first reference signal resource mapping diagrams.

In a preferred embodiment of the present invention, a range of a resource mapping diagram corresponding to the received configuration information that is notified by the base station and that is of each first reference signal resource mapping diagram included in the second reference signal resource mapping diagram is a subset of a set of all first reference signal resource mapping diagrams.

In a preferred embodiment of the present invention, an index that is notified by the base station and that is of a resource mapping diagram of a second reference signal whose port quantity is X1 is received, and a resource mapping diagram of a second reference signal whose port quantity is X2 is obtained according to a preset rule, where X1 and X2 are integers that are not equal, and X1 is greater than X2.

In a preferred embodiment of the present invention, the preset rule is: Resources corresponding to the $M^{th}$ port to the $(M+X2-1)^{th}$ port in X1 ports are the resource mapping diagram of the second reference signal whose port quantity is X2, where M is an integer greater than or equal to 0 and less than or equal to X1−X2−1.

In a preferred embodiment of the present invention, an index of a resource mapping diagram of a first reference signal whose port quantity is X1 and an index of a resource mapping diagram of a first reference signal whose port quantity is X2 that are notified by the base station are received, and a resource mapping diagram of a second reference signal whose port quantity is X1−X2 is determined according to the foregoing information, where X1 is an integer greater than X2.

In a preferred embodiment of the present invention, the first reference signal whose port quantity is X1 is a non-zero power reference signal, and the first reference signal whose port quantity is X2 is a zero power reference signal.

In a preferred embodiment of the present invention, if a resource mapping diagram of a second reference signal whose port quantity is X includes a resource mapping diagram of a first reference signal whose port quantity is X1 and a resource mapping diagram of a first reference signal whose port quantity is X2, the X1-port first reference signal resource mapping diagram and the X2-port first reference signal resource mapping diagram occupy different OFDM symbol pairs in a PRB pair, the X1-port first reference signal resource mapping diagram corresponds to resources occupied by the $0^{th}$ port to the $(X1-1)^{th}$ port in the second reference signal whose port quantity is X, and the X2-port first reference signal resource mapping diagram corresponds to resources occupied by the $X1^{th}$ port to the $(X-1)^{th}$ port in the second reference signal whose port quantity is X, for the second reference signal whose port quantity is X, locations of OFDM symbols of the $0^{th}$ port to the $(X1-1)^{th}$ port and the $X1^{th}$ port to the $(X-1)^{th}$ port in a PRB pair are respectively interchangeable with locations of OFDM symbols of the $0^{th}$ port to the $(X1-1)^{th}$ port and the $X1^{th}$ port to the $(X-1)^{th}$ port in a neighbouring PRB pair, where X=X1+X2.

In the channel measurement method provided in this embodiment of the present invention, UE obtains a reference signal resource mapping diagram, and obtains a reference signal according to the reference signal resource mapping diagram. The UE performs channel measurement according to the reference signal to determine channel state information, and feeds back the channel state information to a base station. The reference signal resource mapping diagram is a first reference signal resource mapping diagram or a second reference signal resource mapping diagram, and an association relationship exists between each of K2 second reference signal resource mapping diagrams and at least one of K1 first reference signal resource mapping diagrams, where K2 is a quantity of the second reference signal resource mapping diagrams, K1 is a quantity of the first reference signal resource mapping diagrams, and K1 and K2 are integers greater than or equal to 1. Compared with the prior art that UE obtains a reference signal according to an indication of a base station and performs channel measurement, causing interference to downlink data transmission and deteriorating performance of a downlink system, in the present invention, an RE used to carry data is not occupied to carry a reference signal, so that channel measurement can be performed without affecting downlink data transmission.

Embodiment 2

Figure 9:
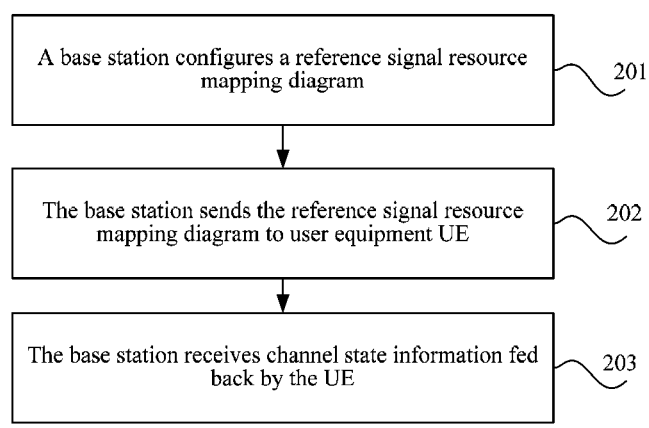
FIG. 9 is a schematic flowchart of a channel measurement method according to Embodiment 2 of the present invention.

This embodiment of the present invention provides a channel measurement method. The method is executed by a base station. As shown in FIG. 9, the method includes the following steps.

201: The base station configures a reference signal resource mapping diagram.

The reference signal resource mapping diagram is a location to which a time-frequency resource of the reference signal is mapped, the reference signal resource mapping diagram is a first reference signal resource mapping diagram or a second reference signal resource mapping diagram, and an association relationship exists between each of K2 second reference signal resource mapping diagrams and at least one of K1 first reference signal resource mapping diagrams, where K2 is a quantity of the second reference signal resource mapping diagrams, K1 is a quantity of the first reference signal resource mapping diagrams, and K1 and K2 are integers greater than or equal to 1.

The first reference signal resource mapping diagram is a Y-port reference signal resource mapping diagram, the second reference signal resource mapping diagram is an X-port reference signal resource mapping diagram, Y is an integer less than or equal to 8 and satisfying $2^n$, and X is an integer greater than 8 or an integer less than 8 and not satisfying $2^n$.

The association relationship is: Time-frequency resources and code resources of X consecutive ports in Y ports of any one of K2 second reference signal resource mapping diagrams are the same as time-frequency resources and code resources of X consecutive ports in Y ports of any one of K1 first reference signal resource mapping diagrams, Y is an integer closest to X and satisfying $2^n$ in integers greater than X, and the code resource is an orthogonal spreading code or a sequence of a reference signal. For example, time-frequency resources and code resources of a 5-port reference signal resource mapping diagram may be the same as time-frequency resources and code resources of five consecutive ports in an 8-port reference signal resource mapping diagram.

202: The base station sends the reference signal resource mapping diagram to a user equipment (UE).

203: The base station receives channel state information fed back by the UE.

In a preferred implementation of the present invention, the X consecutive ports are the $0^{th}$ port to the $(X-1)^{th}$ port in the Y ports, or the X consecutive ports are the $(Y-X)^{th}$ port to the $(Y-1)^{th}$ port in the Y ports.

In this way, a resource mapping diagram of a reference signal whose port quantity does not satisfy $2^n$ and is less than or equal to 8 can be obtained according to an existing resource mapping diagram of a reference signal whose port quantity satisfies $2^n$ and is less than or equal to 8.

In another preferred implementation of the present invention, K2=K1, or $$K2 = \left\lceil \frac{Y * K1}{X} \right\rceil,$$

and ⌈ ⌉ represents rounding down. For example, if 40 time-frequency resource locations in one subframe are used to carry a reference signal, an existing 8-port reference signal resource mapping diagram may have 40/8=5 configurations. If K2=K1, that is, a 5-port reference signal resource mapping diagram also has five configurations, time-frequency resource locations corresponding to five consecutive ports in one configuration of the 8-port reference signal resource mapping diagram are used as time-frequency resource locations of the 5-port reference signal resource mapping diagram. If $$K2 = \left\lceil \frac{5 \cdot 8}{2} \right\rceil = 8,$$

the 5-port reference signal resource mapping diagram has eight configurations.

In another preferred implementation of the present invention, at least one of the K2 second reference signal resource mapping diagrams includes time-frequency resources of at least two of the first reference signal resource mapping diagrams.

For example, if the first reference signal resource mapping diagram is a 4-port reference signal resource mapping diagram, the second reference signal resource mapping diagram is a 3-port reference signal resource mapping diagram, and 40 time-frequency resource locations in one subframe are used to carry a reference signal, the existing 4-port reference signal resource mapping diagram may have 40/4=10 configurations, and the 3-port reference signal resource mapping diagram may have $$\left\lceil \frac{4 \cdot 10}{3} \right\rceil = 13$$

configurations. In this case, there may be ten 3-port reference signal resource mapping diagrams when time-frequency resource locations corresponding to three consecutive ports in the 4-port reference signal resource mapping diagram are used. In this case, one port other than the three consecutive ports in the 4-port reference signal resource mapping diagram remains, and one 3-port reference signal resource mapping diagram may be obtained when time-frequency resource locations corresponding to the remaining ports in three 4-port reference signal resource mapping diagrams are used. Therefore, one 3-port reference signal resource mapping diagram may include three 4-port reference signal resource mapping diagrams.

Further, an X-port second reference signal resource mapping diagram in the K2 second reference signal resource mapping diagrams includes K3 first reference signal resource mapping diagrams, each of the K3 first reference signal resource mapping diagrams includes time-frequency resources corresponding to H ports, H=X/K3, and K3 is a positive integer less than X.

For example, if the second reference signal resource mapping diagram is a 6-port reference signal resource mapping diagram, and the first reference signal resource mapping diagram is an 8-port reference signal resource mapping diagram, assuming that the 6-port reference signal resource mapping diagram includes three 8-port reference signal resource mapping diagrams, each of the three 8-port reference signal resource mapping diagrams includes time-frequency resource locations corresponding to 6/3=2 ports.

Further, the H ports are the $0^{th}$ port to the $(H-1)^{th}$ port or the $(Y-H)^{th}$ port to the $(Y-1)^{th}$ port in the first reference signal resource mapping diagram.

In another preferred implementation of the present invention, the UE obtains the second reference signal resource mapping diagram.

The X-port second reference signal resource mapping diagram includes an $X_1$-port reference signal resource mapping diagram and an $X_2$-port reference signal resource mapping diagram.

$X_1+X_2=X$, a difference between $X_1$ and $X_2$ is less than 2, the $X_1$-port reference signal resource mapping diagram and $X_2$-port reference signal resource mapping diagram are obtained by the UE from m subframes, and m is 1 or 2.

The $X_1$-port reference signal resource mapping diagram is the first reference signal resource mapping diagram, and the $X_2$-port reference signal resource mapping diagram is the second reference signal resource mapping diagram; or the $X_1$-port reference signal resource mapping diagram and the $X_2$-port reference signal resource mapping diagram both are the second reference signal resource mapping diagrams.

For example, for an 11-port reference signal resource mapping diagram, 11=3+8, or 11=4+7, ..., or 11=5+6, and a difference between 5 and 6 is less than 2. Therefore, the 11-port reference signal resource mapping diagram is a 5-port reference signal resource mapping diagram and a 6-port reference signal resource mapping diagram. For a 12-port reference signal resource mapping diagram, 12=4+8, or 12=5+7, ..., or 12=6+6, and a result of 6–6 is less than 2. Therefore, the 12-port reference signal resource mapping diagram is two 6-port reference signal resource mapping diagrams.

Further, X may be an integer greater than 8.

In another preferred implementation of the present invention, the UE receives a sequence that is notified by the base station and that is of subframes carrying the $X_1$-port reference signal resource mapping diagram and the $X_2$-port reference signal resource mapping diagram.

Alternatively, a sequence of subframes carrying the $X_1$-port reference signal resource mapping diagram and the $X_2$-port reference signal resource mapping diagram is preset, and the sequence is a descending order of port quantities or an ascending order of port quantities.

For example, the 11-port reference signal resource mapping diagram is the 5-port reference signal resource mapping diagram and the 6-port reference signal resource mapping diagram. The sequence notified by the base station and received by the UE is the 5-port reference signal resource mapping diagram and the 6-port reference signal resource mapping diagram, or the 6-port reference signal resource mapping diagram and the 5-port reference signal resource mapping diagram.

In another preferred implementation of the present invention, the UE receives a number of a subframe carrying the $X_1$-port reference signal resource mapping diagram and a number of a subframe carrying the $X_2$-port reference signal resource mapping diagram that are notified by the base station.

Alternatively, the UE receives a number of a subframe carrying the $X_1$-port reference signal resource mapping diagram and a subframe interval between a subframe carrying the $X_2$-port reference signal resource mapping diagram and the subframe carrying the $X_1$-port reference signal resource mapping diagram that are notified by the base station.

In another preferred implementation of the present invention, the UE obtains the second reference signal resource mapping diagram.

The second reference signal resource mapping diagram includes each of an $X_1$-port reference signal resource mapping diagram, an $X_2$-port reference signal resource mapping diagram, ..., and an $X_i$-port reference signal resource mapping diagram. $X_1+X_2 ... +X_i=X$, each of $X_1$, $X_2$ ..., and $X_i$ can be represented as $2^n$, and values of n corresponding to $X_1$ to $X_i$ are different.

The $X_1$-port reference signal resource mapping diagram, the $X_2$-port reference signal resource mapping diagram, ..., and the $X_i$-port reference signal resource mapping diagram are obtained by the UE from at least one subframe.

For example, the 14-port reference signal resource mapping diagram may include an 8-port first reference signal resource mapping diagram, a 4-port reference signal resource mapping diagram, and a 2-port reference signal resource mapping diagram, that is, X1=8, X2=4, and X3=2.

Further, X may be an integer greater than 8.

Further, the $X_1$-port reference signal resource mapping diagram, the $X_2$-port reference signal resource mapping diagram, ..., and the $X_i$-port reference signal resource mapping diagram are obtained by the UE from one subframe, or the $X_1$-port reference signal resource mapping diagram, the $X_2$-port reference signal resource mapping diagram, ..., and the $X_i$-port reference signal resource mapping diagram are obtained by the UE from i subframes.

In another preferred implementation of the present invention, the UE receives a sequence that is notified by the base station and that is of subframes carrying the $X_1$-port reference signal resource mapping diagram, the $X_2$-port reference signal resource mapping diagram, ..., and the $X_i$-port reference signal resource mapping diagram.

Alternatively, a sequence of subframes carrying the $X_1$-port reference signal resource mapping diagram, the $X_2$-port reference signal resource mapping diagram, ..., and the $X_i$-port reference signal resource mapping diagram is predefined.

The sequence of the subframes is an ascending order of port quantities, or a descending order of port quantities, or a sequence of a largest port quantity, a smallest port quantity, a second largest port quantity, a second smallest port quantity, ....

For example, a sequence of the 14-port reference signal resource mapping diagram may be: the 8-port reference signal resource mapping diagram, the 4-port reference signal resource mapping diagram, and the 2-port reference signal resource mapping diagram; or the 2-port reference signal resource mapping diagram, the 4-port reference signal resource mapping diagram, and the 8-port reference signal resource mapping diagram; or the 8-port reference signal resource mapping diagram, the 2-port reference signal resource mapping diagram, and the 4-port reference signal resource mapping diagram.

In another preferred implementation of the present invention, the UE receives configuration information that is notified by the base station and that is of each reference signal resource mapping diagram of the $X_1$-port reference signal resource mapping diagram, the $X_2$-port reference signal resource mapping diagram, ..., and the $X_i$-port reference signal resource mapping diagram.

Alternatively, the UE receives joint coding signaling sent by the base station. The joint coding signaling is used to indicate configuration information of $X_1$-port reference signal resource mapping diagram, configuration information of the $X_2$-port reference signal resource mapping diagram, ..., and configuration information of the $X_i$-port reference signal resource mapping diagram.

Alternatively, the UE receives configuration information of the $X_1$-port reference signal resource mapping diagram and a correspondence between configuration information of an $X_j$-port reference signal resource mapping diagram and the configuration information of the $X_1$-port reference signal resource mapping diagram that are notified by the base station, where j is an integer greater than 1 and less than or equal to i.

Alternatively, configuration information of the $X_1$-port reference signal resource mapping diagram, configuration information of the $X_2$-port reference signal resource mapping diagram, . . . , and configuration information of the $X_i$-port reference signal resource mapping diagram are predefined.

In another preferred implementation of the present invention, a number of the subframe carrying the $X_1$-port reference signal resource mapping diagram, a number of the subframe carrying the $X_2$-port reference signal resource mapping diagram, . . . , and a number of the subframe carrying the $X_i$-port reference signal resource mapping diagram are predefined.

Alternatively, the UE receives a number of the subframe carrying the $X_1$-port reference signal resource mapping diagram, a number of the subframe carrying the $X_2$-port reference signal resource mapping diagram, . . . , and a number of the subframe carrying the $X_i$-port reference signal resource mapping diagram that are notified by the base station.

Alternatively, the UE receives a number of the subframe carrying the $X_1$-port reference signal resource mapping diagram, and a subframe interval between a number of a subframe carrying the $X_j$-port reference signal resource mapping diagram and the number of the subframe carrying the $X_1$-port reference signal resource mapping diagram that are notified by the base station, where j is an integer greater than 1 and less than or equal to i.

In another preferred embodiment of the present invention, if an $X_i$-port reference signal resource mapping diagram and the $X_j$-port reference signal resource mapping diagram are in different subframes, t is an integer greater than or equal to 1 and less than or equal to i, and t is not equal to j, the $X_i$-port reference signal resource mapping diagram and the $X_j$-port reference signal resource mapping diagram have L same relative time-frequency resource locations in each PRB pair, and L is a smallest value in $X_i$, $X_j$; or time-frequency resource locations of the $X_i$-port reference signal resource mapping diagram and the $X_j$-port reference signal resource mapping diagram in each PRB pair are different.

For example, for a 5-port reference signal resource mapping diagram and a 6-port reference signal resource mapping diagram, because 5 is less than 6, there are five same relative time-frequency resource locations between the two. The relative time-frequency resource location means that the 5-port reference signal resource mapping diagram and the 6-port reference signal resource mapping diagram are not in a same subframe, but there are five same time-frequency resource locations between time-frequency resource locations of the 5-port reference signal resource mapping diagram in a subframe carrying the 5-port reference signal resource mapping diagram and time-frequency resource locations of the 6-port reference signal resource mapping diagram in a subframe carrying the 6-port reference signal resource mapping diagram. The five same time-frequency resource locations are referred to as five same relative time-frequency resource locations.

Further, there are Q overlapping time-frequency resource locations between time-frequency resource locations of the $X_1$-port reference signal resource mapping diagram, the $X_2$-port reference signal resource mapping diagram, . . . , and the $X_i$-port reference signal resource mapping diagram, and Q is a smallest value in $X_1$, $X_2$ . . . $X_i$.

For example, a 14-port reference signal resource mapping diagram may include an 8-port reference signal resource mapping diagram, a 4-port reference signal resource mapping diagram, and a 2-port reference signal resource mapping diagram. A quantity of overlapping time-frequency resource locations between them is a smallest value in 2, 4, and 8. That is, there are two overlapping time-frequency resource locations between time-frequency resource locations of the 8-port reference signal resource mapping diagram, the 4-port reference signal resource mapping diagram, and the 2-port reference signal resource mapping diagram.

Further, the Q overlapping time-frequency resource locations are time-frequency resource locations corresponding to the $0^{th}$ port to the $(Q-1)^{th}$ port in the $X_j$-port reference signal resource mapping diagram.

In the channel measurement method provided in this embodiment of the present invention, UE obtains a reference signal resource mapping diagram, and obtains a reference signal according to the reference signal resource mapping diagram. The UE performs channel measurement according to the reference signal to determine channel state information, and feeds back the channel state information to a base station. The reference signal resource mapping diagram is a first reference signal resource mapping diagram or a second reference signal resource mapping diagram, and an association relationship exists between each of K2 second reference signal resource mapping diagrams and at least one of K1 first reference signal resource mapping diagrams, where K2 is a quantity of the second reference signal resource mapping diagrams, K1 is a quantity of the first reference signal resource mapping diagrams, and K1 and K2 are integers greater than or equal to 1. Compared with the prior art that UE obtains a reference signal according to an indication of a base station and performs channel measurement, causing interference to downlink data transmission and deteriorating performance of a downlink system, in the present invention, an RE used to carry data is not occupied to carry a reference signal, so that channel measurement can be performed without affecting downlink data transmission.

Embodiment 3

Figure 10:
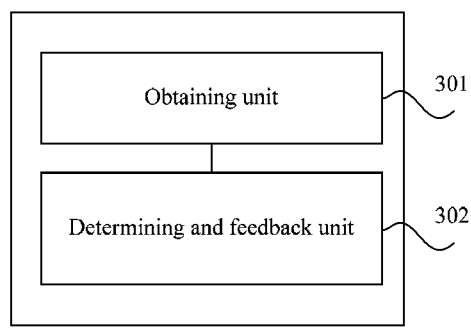
FIG. 10 is a structural block diagram of UE according to Embodiment 3 of the present invention.

This embodiment of the present invention provides UE. As shown in FIG. 10, the UE includes an obtaining unit 301 and a determining and feedback unit 302.

The obtaining unit 301 is configured to: obtain a reference signal resource mapping diagram, and obtain a reference signal according to the reference signal resource mapping diagram.

The determining and feedback unit 302 is configured to: perform channel measurement according to the reference signal obtained by the obtaining unit, determine channel state information, and feed back the channel state information to a base station.

The reference signal resource mapping diagram is a location to which a time-frequency resource of the reference signal is mapped, the reference signal resource mapping diagram is a first reference signal resource mapping diagram or a second reference signal resource mapping diagram, and an association relationship exists between each of K2 second reference signal resource mapping diagrams and at least one of K1 first reference signal resource mapping diagrams, where K2 is a quantity of the second reference signal resource mapping diagrams, K1 is a quantity of the first reference signal resource mapping diagrams, and K1 and K2 are integers greater than or equal to 1.

The first reference signal resource mapping diagram is a Y-port reference signal resource mapping diagram, the second reference signal resource mapping diagram is an X-port reference signal resource mapping diagram, Y is an integer less than or equal to 8 and satisfying $2^n$, and X is an integer greater than 8 or an integer less than 8 and not satisfying $2^n$.

In a first implementation, when X is less than 8 and does not satisfy $2^n$, the obtaining unit is further configured to obtain the second reference signal resource mapping diagram.

The association relationship is: Time-frequency resources and code resources of X consecutive ports in Y ports of any one of K2 second reference signal resource mapping diagrams are the same as time-frequency resources and code resources of X consecutive ports in Y ports of any one of K first reference signal resource mapping diagrams, Y is an integer closest to X and satisfying $2^n$ in integers greater than X, and the code resource is an orthogonal spreading code or a sequence of a reference signal.

In a second possible implementation, the X consecutive ports are the $0^{th}$ port to the $(X-1)^{th}$ port in the Y ports, or the X consecutive ports are the $(Y-X)^{th}$ port to the $(Y-1)^{th}$ port in the Y ports.

In a third possible implementation of a third aspect, K2=K1, or $$K2 = \left\lceil \frac{Y*K1}{X} \right\rceil,$$

and ⌈ ⌉ represents rounding down.

In a fourth possible implementation, at least one of the K2 second reference signal resource mapping diagrams includes time-frequency resources of at least two of the first reference signal resource mapping diagrams.

In a fifth possible implementation, an X-port second reference signal resource mapping diagram in the K2 second reference signal resource mapping diagrams includes K3 first reference signal resource mapping diagrams, each of the K3 first reference signal resource mapping diagrams includes time-frequency resources corresponding to H ports, H=X/K3, and K3 is a positive integer less than X.

In a sixth possible implementation, the H ports are the $0^{th}$ port to the $(H-1)^{th}$ port or the $(Y-H)^{th}$ port to the $(Y-1)^{th}$ port in the first reference signal resource mapping diagram.

In a seventh possible implementation, the obtaining unit is further configured to obtain the second reference signal resource mapping diagram.

The X-port second reference signal resource mapping diagram includes an $X_1$-port reference signal resource mapping diagram and an $X_2$-port reference signal resource mapping diagram.

$X_1+X_2=X$, a difference between $X_1$ and $X_2$ is less than 2, the $X_1$-port reference signal resource mapping diagram and the $X_2$-port reference signal resource mapping diagram are obtained by the UE from m subframes, and m is 1 or 2.

The $X_1$-port reference signal resource mapping diagram is the first reference signal resource mapping diagram, and the $X_2$-port reference signal resource mapping diagram is the second reference signal resource mapping diagram; or the $X_1$-port reference signal resource mapping diagram and the $X_2$-port reference signal resource mapping diagram both are the second reference signal resource mapping diagrams.

In an eighth possible implementation, X is an integer greater than 8.

In a ninth possible implementation, the UE further includes:

a receiving unit, configured to receive a sequence that is notified by the base station and that is of subframes carrying the $X_1$-port reference signal resource mapping diagram and the $X_2$-port reference signal resource mapping diagram; or a sequence of subframes carrying the $X_1$-port reference signal resource mapping diagram and the $X_2$-port reference signal resource mapping diagram is preset, and the sequence is a descending order of port quantities or an ascending order of port quantities.

In a tenth possible implementation, the UE further includes:

a receiving unit, configured to receive a number of a subframe carrying the $X_1$-port reference signal resource mapping diagram and a number of a subframe carrying the $X_2$-port reference signal resource mapping diagram that are notified by the base station; or the receiving unit, configured to receive a number of a subframe carrying the $X_1$-port reference signal resource mapping diagram and a subframe interval between a subframe carrying the $X_2$-port reference signal resource mapping diagram and the subframe carrying the $X_1$-port reference signal resource mapping diagram that are notified by the base station.

In an eleventh possible implementation, the obtaining unit is further configured to obtain the second reference signal resource mapping diagram.

The second reference signal resource mapping diagram includes each of an $X_1$-port reference signal resource mapping diagram, an $X_2$-port reference signal resource mapping diagram, . . . , and an $X_i$-port reference signal resource mapping diagram, $X_1+X_2$ . . . $+X_i=X$, and each of $X_1, X_2, \ldots,$ and $X_i$ can be represented as $2^n$.

The $X_1$-port reference signal resource mapping diagram, the $X_2$-port reference signal resource mapping diagram, . . . , and the $X_i$-port reference signal resource mapping diagram are obtained by the UE from at least one subframe.

In a twelfth possible implementation, X is an integer greater than 8.

In a thirteenth possible implementation, the $X_1$-port reference signal resource mapping diagram, the $X_2$-port reference signal resource mapping diagram, . . . , and the $X_i$-port reference signal resource mapping diagram are obtained by the UE from one subframe; or the $X_1$-port reference signal resource mapping diagram, the $X_2$-port reference signal resource mapping diagram, . . . , and the $X_i$-port reference signal resource mapping diagram are obtained by the UE from i subframes.

In a fourteenth possible implementation, the UE further includes: a receiving unit, configured to receive a sequence that is notified by the base station and that is of subframes carrying the $X_1$-port reference signal resource mapping diagram, the $X_2$-port reference signal resource mapping diagram, . . . , and the $X_i$-port reference signal resource mapping diagram; or a sequence of subframes carrying the $X_1$-port reference signal resource mapping diagram, the $X_2$-port reference signal resource mapping diagram, . . . , and the $X_i$-port reference signal resource mapping diagram is predefined, where the sequence of the subframes is an ascending order of port quantities, or a descending order of port quantities, or a sequence of a largest port quantity, a smallest port quantity, a second largest port quantity, a second smallest port quantity, . . . .

In a fifteenth possible implementation, the receiving unit is further configured to receive configuration information that is notified by the base station and that is of each reference signal resource mapping diagram of the $X_1$-port reference signal resource mapping diagram, the $X_2$-port reference signal resource mapping diagram, . . . , and the $X_i$-port reference signal resource mapping diagram; or the receiving unit is further configured to receive joint coding signaling sent by the base station, where the joint coding signaling is used to indicate configuration information of the $X_1$-port reference signal resource mapping diagram, configuration information of the $X_2$-port reference signal resource mapping diagram, . . . , and configuration information of the $X_i$-port reference signal resource mapping diagram; or the receiving unit is further configured to receive configuration information of the $X_1$-port reference signal resource mapping diagram and a correspondence between configuration information of an $X_j$-port reference signal resource mapping diagram and the configuration information of the $X_1$-pr reference signal resource mapping diagram that are notified by the base station, where j is an integer greater than 1 and less than or equal to i; or configuration information of the $X_1$-port reference signal resource mapping diagram, configuration information of the $X_2$-port reference signal resource mapping diagram, . . . , and configuration information of the $X_i$-port reference signal resource mapping diagram are predefined.

In a sixteenth possible implementation, a number of the subframe carrying the $X_1$-port reference signal resource mapping diagram, a number of the subframe carrying the $X_2$-port reference signal resource mapping diagram, . . . , and a number of the subframe carrying the $X_i$-port reference signal resource mapping diagram are predefined; or the receiving unit is further configured to receive a number of the subframe carrying the $X_1$-port reference signal resource mapping diagram, a number of the subframe carrying the $X_2$-port reference signal resource mapping diagram, . . . , and a number of the subframe carrying the $X_i$-port reference signal resource mapping diagram that are notified by the base station; or the receiving unit is further configured to receive a number of the subframe carrying the $X_1$-port reference signal resource mapping diagram and a subframe interval between a number of a subframe carrying an $X_j$-port reference signal resource mapping diagram and the number of the subframe carrying the $X_1$-port reference signal resource mapping diagram that are notified by the base station, where j is an integer greater than 1 and less than or equal to i.

In a seventeenth possible implementation, if an $X_t$-port reference signal resource mapping diagram and the $X_j$-port reference signal resource mapping diagram are in different subframes, t is an integer greater than or equal to 1 and less than or equal to i, and t is not equal to j,
the $X_t$-port reference signal resource mapping diagram and the $X_j$-port reference signal resource mapping diagram have L same relative time-frequency resource locations in each PRB pair, and is a smallest value in $X_t$, $X_j$; or time-frequency resource locations of the $X_t$-port reference signal resource mapping diagram and the $X_j$-port reference signal resource mapping diagram in each PRB pair are different.

In an eighteenth possible implementation, there are Q overlapping time-frequency resource locations between time-frequency resource locations of the $X_1$-port reference signal resource mapping diagram, the $X_2$-port reference signal resource mapping diagram, . . . , and the $X_i$-port reference signal resource mapping diagram, and Q is a smallest value in $X_1, X_2 \ldots X_i$.

In a nineteenth possible implementation, the Q overlapping time-frequency resource locations are time-frequency resource locations corresponding to the $0^{th}$ port to the $(Q-1)^{th}$ port in the $X_j$-port reference signal resource mapping diagram.

In a twentieth possible implementation, if X is 3, Y is 4, and K2=K1=10, a time-frequency resource location of the second reference signal resource mapping diagram is (k,l), k is a subcarrier number of the RE, and l is a symbol corresponding to the RE, $$k = k' + \begin{cases} -0, p = \{0^{th} \text{ port, first port}\} \\ -6, p = \{\text{second port}\} \end{cases}$$

$$l = l' + l'', l'' = 0, 1, l' = l'_1, l'_2 \ldots l'_{10}$$

$$w_{l''} = \begin{cases} 1, p = \{0^{th} \text{ port, second port}\} \\ (-1)^{l''}, p = \{\text{first port}\} \end{cases}$$

$$(k', l') = \begin{cases} k'_0 = 9, l'_0 = 5, n_s \bmod 2 = 0 \\ \text{or } k'_1 = 11, l'_1 = 2, n_s \bmod 2 = 1 \\ \text{or } k'_2 = 9, l'_2 = 2, n_s \bmod 2 = 1 \\ \text{or } k'_3 = 7, l'_3 = 2, n_s \bmod 2 = 1 \\ \text{or } k'_4 = 9, l'_4 = 5, n_s \bmod 2 = 1 \\ \text{or } k'_5 = 8, l'_5 = 5, n_s \bmod 2 = 0 \\ \text{or } k'_6 = 10, l'_6 = 2, n_s \bmod 2 = 1 \\ \text{or } k'_7 = 8, l'_7 = 2, n_s \bmod 2 = 1 \\ \text{or } k'_8 = 6, l'_8 = 2, n_s \bmod 2 = 1 \\ \text{or } k'_9 = 8, l'_9 = 5, n_s \bmod 2 = 1 \end{cases}$$

where in a first configuration of the second reference signal resource mapping diagram, (k', l')=(k'$_0$,l'$_0$), in a second configuration, (k',l')=(k'$_1$,l'$_1$) . . . , and in a tenth configuration, (k',l')=(k'$_4$,l'$_4$); $n_s$ mod 2=1 represents that the time-frequency resource location is in a second slot of a subframe, and $n_s$ mod 2=0 represents that the time-frequency resource location is in a first slot of a subframe.

In a twenty-first possible implementation, if K1=10, and K2=4*10/3, a time-frequency resource location of the second reference signal resource mapping diagram other than (k,l) is:

$$k = \begin{cases} k'_0 - 6, 0^{th} \text{ port} \\ k'_5 - 6, \text{first port} \\ k'_1 - 4, \text{second port} \end{cases}$$

$$l = \begin{cases} l'_1 + l'' \\ l'_2 + l'' \\ l'_3 + l'', l'' = 0, 1, w_{l''} = (-1)^{l''} \end{cases} ; \text{or}$$

$$k = \begin{cases} k'_6 - 6, 0^{th} \text{ port} \\ k'_2 - 6, \text{first port} \\ k'_7 - 6, \text{second port} \end{cases}$$

$$l = \begin{cases} l'_4 + l'' \\ l'_5 + l'' \\ l'_6 + l'', l'' = 0, 1, w_{l''} = (-1)^{l''} \end{cases} ; \text{or}$$

$$k = \begin{cases} k'_3 - 6, 0^{th} \text{ port} \\ k'_8 - 6, \text{first port} \\ k'_4 - 6, \text{second port} \end{cases}$$

-continued $$l = \begin{cases} l'_7 + l'' \\ l'_8 + l'' \\ l'_9 + l'', l'' = 0, 1, w_{l''} = (-1)^{l''} \end{cases};$$

$$(k', l') = \begin{cases} k'_0 = 9, l'_0 = 5, n_s \bmod 2 = 0 \\ \text{or } k'_1 = 11, l'_1 = 2, n_s \bmod 2 = 1 \\ \text{or } k'_2 = 9, l'_2 = 2, n_s \bmod 2 = 1 \\ \text{or } k'_3 = 7, l'_3 = 2, n_s \bmod 2 = 1 \\ \text{or } k'_4 = 9, l'_4 = 5, n_s \bmod 2 = 1 \\ \text{or } k'_5 = 8, l'_5 = 5, n_s \bmod 2 = 0 \\ \text{or } k'_6 = 10, l'_6 = 2, n_s \bmod 2 = 1 \\ \text{or } k'_7 = 8, l'_7 = 2, n_s \bmod 2 = 1 \\ \text{or } k'_8 = 6, l'_8 = 2, n_s \bmod 2 = 1 \\ \text{or } k'_9 = 8, l'_9 = 5, n_s \bmod 2 = 1 \end{cases}.$$

In a twenty-second possible implementation, if X is 5, Y is 8, and K2=K1=5, a time-frequency resource location of the second reference signal resource mapping diagram is (k,l), k is a subcarrier number of the RE, and l is a symbol corresponding to the RE, $$k = k' + \begin{cases} -0, p = \{0^{th} \text{ port, first port}\} \\ -6, p = \{\text{second port, third port}\}, \\ -1, p = \{\text{fourth port}\} \end{cases}$$

$$l = l' + l'', l'' = 0, 1, l' = l'_1, l'_2 \ldots l'_5$$

$$\text{spreading factor } w_{l''} = \begin{cases} 1, p = \{0^{th} \text{ port, second port, fourth port}\} \\ (-1)^{l''}, p = \{\text{first port, third port}\} \end{cases}$$

$$(k', l') = \begin{cases} k'_0 = 9, l'_0 = 5, n_s \bmod 2 = 0 \\ \text{or } k'_1 = 11, l'_1 = 2, n_s \bmod 2 = 1 \\ \text{or } k'_2 = 9, l'_2 = 2, n_s \bmod 2 = 1 \\ \text{or } k'_3 = 7, l'_3 = 2, n_s \bmod 2 = 1 \\ \text{or } k'_4 = 9, l'_4 = 5, n_s \bmod 2 = 1 \end{cases}$$

where in a first configuration of the second reference signal resource mapping diagram, (k', l')=(k'$_0$,l'$_0$), in a second configuration, (k',l')=(k'$_1$,l'$_1$) . . . , and in a fifth configuration, (k',l')=(k'$_4$,l'$_4$); $n_s$ mod 2=1 represents that the time-frequency resource location is in a second slot of a subframe, and $n_s$ mod 2=0 represents that the time-frequency resource location is in a first slot of a subframe.

In a terminal provided in this embodiment of the present invention, UE obtains a reference signal resource mapping diagram, and obtains a reference signal according to the reference signal resource mapping diagram. The UE performs channel measurement according to the reference signal to determine channel state information, and feeds back the channel state information to a base station. The reference signal resource mapping diagram is a first reference signal resource mapping diagram or a second reference signal resource mapping diagram, and an association relationship exists between each of K2 second reference signal resource mapping diagrams and at least one of K1 first reference signal resource mapping diagrams, where K2 is a quantity of the second reference signal resource mapping diagrams, K1 is a quantity of the first reference signal resource mapping diagrams, and K1 and K2 are integers greater than or equal to 1. Compared with the prior art that UE obtains a reference signal according to an indication of a base station and performs channel measurement, causing interference to downlink data transmission and deteriorating performance of a downlink system, the terminal in the present invention does not occupy an RE used to carry data, to carry a reference signal, so that channel measurement can be performed without affecting downlink data transmission.

Embodiment 4

Figure 11:
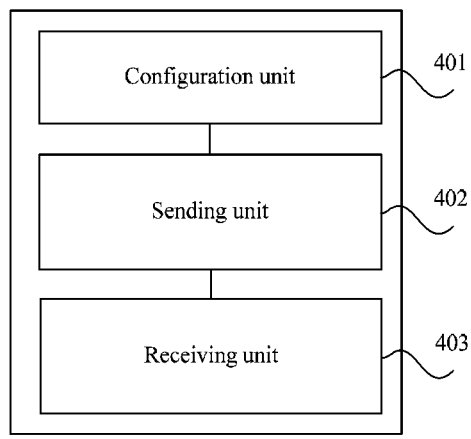
FIG. 11 is a structural block diagram of a base station according to Embodiment 4 of the present invention.

This embodiment of the present invention provides a base station. As shown in FIG. 11, the base station includes a configuration unit 401, a sending unit 402, and a receiving unit 403.

The configuration unit 401 is configured to configure a reference signal resource mapping diagram.

The sending unit 402 is configured to send the reference signal resource mapping diagram to user equipment UE.

The receiving unit 403 is configured to receive channel state information fed back by the UE.

The reference signal resource mapping diagram is a location to which a time-frequency resource of the reference signal is mapped, the reference signal resource mapping diagram is a first reference signal resource mapping diagram or a second reference signal resource mapping diagram, and an association relationship exists between each of K2 second reference signal resource mapping diagrams and at least one of K1 first reference signal resource mapping diagrams, where K2 is a quantity of the second reference signal resource mapping diagrams, K1 is a quantity of the first reference signal resource mapping diagrams, and K1 and K2 are integers greater than or equal to 1.

The first reference signal resource mapping diagram is a Y-port reference signal resource mapping diagram, the second reference signal resource mapping diagram is an X-port reference signal resource mapping diagram, Y is an integer less than or equal to 8 and satisfying $2^n$, and X is an integer greater than 8 or an integer less than 8 and not satisfying $2^n$.

In a first possible implementation, the association relationship is: Time-frequency resources and code resources of X consecutive ports in Y ports of any one of K2 second reference signal resource mapping diagrams are the same as time-frequency resources and code resources of X consecutive ports in Y ports of any one of K first reference signal resource mapping diagrams, Y is an integer closest to X and satisfying $2^n$ in integers greater than X, and the code resource is an orthogonal spreading code or a sequence of a reference signal.

In a second possible implementation, the X consecutive ports are the $0^{th}$ port to the $(X-1)^{th}$ port in the Y ports, or the X consecutive ports are the $(Y-X)^{th}$ port to the $(Y-1)^{th}$ port in the Y ports.

In a third possible implementation, K2=K1, or $$K2 = \left\lceil \frac{Y * K1}{X} \right\rceil,$$

and ⌈ ⌉ represents rounding down.

In a fourth possible implementation, at least one of the K2 second reference signal resource mapping diagrams includes time-frequency resources of at least two of the first reference signal resource mapping diagrams.

In a fifth possible implementation, an X-port second reference signal resource mapping diagram in the K2 second reference signal resource mapping diagrams includes K3 first reference signal resource mapping diagrams, each of the K3 first reference signal resource mapping diagrams includes time-frequency resources corresponding to H ports, H=X/K3, and K3 is a positive integer less than X.

In a sixth possible implementation, the H ports are the $0^{th}$ port to the $(H-1)^{th}$ port or the $(Y-H)^{th}$ port to the $(Y-1)^{th}$ port in the first reference signal resource mapping diagram.

In a seventh possible implementation, the sending unit is further configured to send the second reference signal resource mapping diagram to the UE.

The X-port second reference signal resource mapping diagram includes an $X_1$-port reference signal resource mapping diagram and an $X_2$-port reference signal resource mapping diagram.

$X_1+X_2=X$, a difference between $X_1$ and $X_2$ is less than 2, the $X_1$-port reference signal resource mapping diagram and the $X_2$-port reference signal resource mapping diagram are obtained by the UE from m subframes, and m is 1 or 2.

The $X_1$-port reference signal resource mapping diagram is the first reference signal resource mapping diagram, and the $X_2$-port reference signal resource mapping diagram is the second reference signal resource mapping diagram; or the $X_1$-port reference signal resource mapping diagram and the $X_2$-port reference signal resource mapping diagram both are the second reference signal resource mapping diagrams.

In an eighth possible implementation, X is an integer greater than 8.

In a ninth possible implementation, the sending unit is further configured to notify the UE of a sequence of subframes carrying the $X_1$-port reference signal resource mapping diagram and the $X_2$-port reference signal resource mapping diagram.

Alternatively, a sequence of subframes carrying the $X_1$-port reference signal resource mapping diagram and the $X_2$-port reference signal resource mapping diagram is preset, where the sequence is a descending order of port quantities or an ascending order of port quantities.

In a tenth possible implementation, the sending unit is further configured to notify the UE of a number of the subframe carrying the $X_1$-port reference signal resource mapping diagram and a number of the subframe carrying the $X_2$-port reference signal resource mapping diagram.

Alternatively, the sending unit is further configured to notify the UE of a number of the subframe carrying the $X_1$-port reference signal resource mapping diagram and a subframe interval between the subframe carrying the $X_2$-port reference signal resource mapping diagram and the subframe carrying the $X_1$-port reference signal resource mapping diagram.

In an eleventh possible implementation, the sending unit is further configured to send the second reference signal resource mapping diagram to the UE.

The second reference signal resource mapping diagram includes each of an $X_1$-port reference signal resource mapping diagram, an $X_2$-port reference signal resource mapping diagram, . . . , and an $X_i$-port reference signal resource mapping diagram, $X_1+X_2 \ldots +X_i=X$, and each of $X_1, X_2 \ldots X_i$ can be represented as $2^n$.

The $X_1$-port reference signal resource mapping diagram, the $X_2$-port reference signal resource mapping diagram, . . . , and the $X_i$-port reference signal resource mapping diagram are obtained by the UE from at least one subframe.

In a twelfth possible implementation, X is an integer greater than 8.

In a thirteenth possible implementation, the $X_1$-port reference signal resource mapping diagram, the $X_2$-port reference signal resource mapping diagram, . . . , and the $X_i$-port reference signal resource mapping diagram are sent by the base station in one subframe; or the $X_1$-port reference signal resource mapping diagram, the $X_2$-port reference signal resource mapping diagram, . . . , and the $X_i$-port reference signal resource mapping diagram are sent by the base station in i subframes.

In a fourteenth possible implementation, the sending unit is further configured to notify the UE of a sequence of subframes carrying the $X_1$-port reference signal resource mapping diagram, the $X_2$-port reference signal resource mapping diagram, . . . , and the $X_i$-port reference signal resource mapping diagram.

Alternatively, a sequence of subframes carrying the $X_1$-port reference signal resource mapping diagram, the $X_2$-port reference signal resource mapping diagram, . . . , and the $X_i$-port reference signal resource mapping diagram is predefined, where the sequence of the subframes is an ascending order of port quantities, or a descending order of port quantities, or a sequence of a largest port quantity, a smallest port quantity, a second largest port quantity, a second smallest port quantity, . . . .

In a fifteenth possible implementation, the sending unit is further configured to notify the UE of configuration information of each reference signal resource mapping diagram of the $X_1$-port reference signal resource mapping diagram, the $X_2$-port reference signal resource mapping diagram, . . . , and the $X_i$-port reference signal resource mapping diagram.

Alternatively, the sending unit is further configured to send joint coding signaling to the UE, where the joint coding signaling is used to indicate configuration information of the $X_1$-port reference signal resource mapping diagram, configuration information of the $X_2$-port reference signal resource mapping diagram, . . . , and configuration information of the $X_i$-port reference signal resource mapping diagram.

Alternatively, the sending unit is further configured to notify the UE of configuration information of the $X_1$-port reference signal resource mapping diagram and a correspondence between configuration information of an $X_j$-port reference signal resource mapping diagram and the configuration information of the $X_1$-port reference signal resource mapping diagram, where j is an integer greater than 1 and less than or equal to i.

Alternatively, configuration information of the $X_1$-port reference signal resource mapping diagram, configuration information of the $X_2$-port reference signal resource mapping diagram, . . . , and configuration information of the $X_i$-port reference signal resource mapping diagram are predefined.

In a sixteenth possible implementation, a number of the subframe carrying the $X_1$-port reference signal resource mapping diagram, a number of the subframe carrying the $X_2$-port reference signal resource mapping diagram, . . . , and a number of the subframe carrying the $X_i$-port reference signal resource mapping diagram are predefined.

Alternatively, the sending unit is further configured to notify the UE of a number of the subframe carrying the $X_1$-port reference signal resource mapping diagram, a number of the subframe carrying the $X_2$-port reference signal resource mapping diagram, . . . , and a number of the subframe carrying the $X_i$-port reference signal resource mapping diagram.

Alternatively, the sending unit is further configured to notify the UE of a number of the subframe carrying the $X_1$-port reference signal resource mapping diagram and a subframe interval between a number of a subframe carrying an $X_j$-port reference signal resource mapping diagram and the number of the subframe carrying the $X_1$-port reference signal resource mapping diagram, where j is an integer greater than 1 and less than or equal to i.

In a seventeenth possible implementation, if an $X_t$-port reference signal resource mapping diagram and the $X_j$-port reference signal resource mapping diagram are in different subframes, t is an integer greater than or equal to 1 and less than or equal to i, and t is not equal to j, the $X_t$-port reference signal resource mapping diagram and the $X_j$-port reference signal resource mapping diagram have L same relative time-frequency resource locations in each PRB pair, and L is a smallest value in $X_t$, $X_j$; or time-frequency resource locations of the $X_t$-port reference signal resource mapping diagram and the $X_j$-port reference signal resource mapping diagram in each PRB pair are different.

In an eighteenth possible implementation, there are Q overlapping time-frequency resource locations between time-frequency resource locations of the $X_1$-port reference signal resource mapping diagram, the $X_2$-port reference signal resource mapping diagram, . . . , and the $X_i$-port reference signal resource mapping diagram, and Q is a smallest value in $X_1$, $X_2$ . . . $X_i$.

In a nineteenth possible implementation, the Q overlapping time-frequency resource locations are time-frequency resource locations corresponding to the $0^{th}$ port to the $(Q-1)^{th}$ port in the $X_j$-port reference signal resource mapping diagram.

In a twentieth possible implementation, if X is 3, Y is 4, and K2=K1=10, a time-frequency resource location of the second reference signal resource mapping diagram is (k,l), k is a subcarrier number of the RE, and l is a symbol corresponding to the RE, $$k = k' + \begin{cases} -0, & p = \{0^{th} \text{ port, first port}\} \\ -6, & p = \{\text{second port}\} \end{cases}$$

$$l = l' + l'', l'' = 0, 1, l' = l'_1, l'_2 \ldots l'_{10}$$

$$w_{l''} = \begin{cases} 1, & p = \{0^{th} \text{ port, second port}\} \\ (-1)^{l''}, & p = \{\text{first port}\} \end{cases}$$

$$(k', l') = \begin{cases} k'_0 = 9, l'_0 = 5, n_s \bmod 2 = 0 \\ \text{or } k'_1 = 11, l'_1 = 2, n_s \bmod 2 = 1 \\ \text{or } k'_2 = 9, l'_2 = 2, n_s \bmod 2 = 1 \\ \text{or } k'_3 = 7, l'_3 = 2, n_s \bmod 2 = 1 \\ \text{or } k'_4 = 9, l'_4 = 5, n_s \bmod 2 = 1 \\ \text{or } k'_5 = 8, l'_5 = 5, n_s \bmod 2 = 0 \\ \text{or } k'_6 = 10, l'_6 = 2, n_s \bmod 2 = 1 \\ \text{or } k'_7 = 8, l'_7 = 2, n_s \bmod 2 = 1 \\ \text{or } k'_8 = 6, l'_8 = 2, n_s \bmod 2 = 1 \\ \text{or } k'_9 = 8, l'_9 = 5, n_s \bmod 2 = 1 \end{cases}$$

where in a first configuration of the second reference signal resource mapping diagram, (k', l')=(k'$_0$,l'$_0$), in a second configuration, (k',l')=(k'$_1$,l'$_1$) . . . , and in a tenth configuration, (k',l')=(k'$_4$,l'$_4$); $n_s$ mod 2=1 represents that the time-frequency resource location is in a second slot of a subframe, and $n_s$ mod 2=0 represents that the time-frequency resource location is in a first slot of a subframe.

In a twenty-first possible implementation, if K1=10, and K2=4*10/3, a time-frequency resource location of the second reference signal resource mapping diagram other than (k,l) is:

$$k = \begin{cases} k'_0 - 6, 0^{th} \text{ port} \\ k'_5 - 6, \text{ first port} \\ k'_1 - 6, \text{ second port} \end{cases}, l = \begin{cases} l'_1 + l'' \\ l'_2 + l'' \\ l'_3 + l'', l'' = 0, 1, w_{l''} = (-1)^{l''} \end{cases}; \text{ or}$$

$$k = \begin{cases} k'_6 - 6, 0^{th} \text{ port} \\ k'_2 - 6, \text{ first port} \\ k'_7 - 6, \text{ second port} \end{cases}, l = \begin{cases} l'_4 + l'' \\ l'_5 + l'' \\ l'_6 + l'', l'' = 0, 1, w_{l''} = (-1)^{l''} \end{cases}; \text{ or}$$

$$k = \begin{cases} k'_3 - 6, 0^{th} \text{ port} \\ k'_8 - 6, \text{ first port} \\ k'_4 - 6, \text{ second port} \end{cases}, l = \begin{cases} l'_7 + l'' \\ l'_8 + l'' \\ l'_9 + l'', l'' = 0, 1, w_{l''} = (-1)^{l''} \end{cases};$$

$$(k', l') = \begin{cases} k'_0 = 9, l'_0 = 5, n_s \bmod 2 = 0 \\ \text{or } k'_1 = 11, l'_1 = 2, n_s \bmod 2 = 1 \\ \text{or } k'_2 = 9, l'_2 = 2, n_s \bmod 2 = 1 \\ \text{or } k'_3 = 7, l'_3 = 2, n_s \bmod 2 = 1 \\ \text{or } k'_4 = 9, l'_4 = 5, n_s \bmod 2 = 1 \\ \text{or } k'_5 = 8, l'_5 = 5, n_s \bmod 2 = 0 \\ \text{or } k'_6 = 10, l'_6 = 2, n_s \bmod 2 = 1 \\ \text{or } k'_7 = 8, l'_7 = 2, n_s \bmod 2 = 1 \\ \text{or } k'_8 = 6, l'_8 = 2, n_s \bmod 2 = 1 \\ \text{or } k'_9 = 8, l'_9 = 5, n_s \bmod 2 = 1 \end{cases}.$$

In a twenty-second possible implementation, if X is 5, Y is 8, and K2=K1=5, a time-frequency resource location of the second reference signal resource mapping diagram is (k,l), k is a subcarrier number of the RE, and l is a symbol corresponding to the RE, $$k = k' + \begin{cases} -0, & p = \{0^{th} \text{ port, first port}\} \\ -6, & p = \{\text{second port, third port}\}, \\ -1, & p = \{\text{fourth port}\} \end{cases}$$

$$l = l' + l'', l'' = 0, 1, l' = l'_1, l'_2 \ldots l'_5$$

spreading factor $w_{l''} =$ $$\begin{cases} 1, & p = \{0^{th} \text{ port, second port, fourth port}\} \\ (-1)^{l''}, & p = \{\text{first port, third port}\} \end{cases}$$

$$(k', l') = \begin{cases} k'_0 = 9, l'_0 = 5, n_s \bmod 2 = 0 \\ \text{or } k'_1 = 11, l'_1 = 2, n_s \bmod 2 = 1 \\ \text{or } k'_2 = 9, l'_2 = 2, n_s \bmod 2 = 1 \\ \text{or } k'_3 = 7, l'_3 = 2, n_s \bmod 2 = 1 \\ \text{or } k'_4 = 9, l'_4 = 5, n_s \bmod 2 = 1 \end{cases}$$

where in a first configuration of the second reference signal resource mapping diagram, (k', l')=(k'$_0$,l'$_0$), in a second configuration, (k',l')=(k'$_1$,l'$_1$) . . . , and in a fifth configuration, (k',l') (k'$_4$,l'$_4$); $n_s$ mod 2=1 represents that the time-frequency resource location is in a second slot of a subframe, and $n_s$ mod 2=0 represents that the time-frequency resource location is in a first slot of a subframe.

In a terminal provided in this embodiment of the present invention, UE obtains a reference signal resource mapping diagram, and obtains a reference signal according to the reference signal resource mapping diagram. The UE performs channel measurement according to the reference signal to determine channel state information, and feeds back the channel state information to the base station. The reference signal resource mapping diagram is a first reference signal resource mapping diagram or a second reference signal resource mapping diagram, and an association relationship exists between each of K2 second reference signal resource mapping diagrams and at least one of K1 first reference signal resource mapping diagrams, where K2 is a quantity of the second reference signal resource mapping diagrams, K1 is a quantity of the first reference signal resource mapping diagrams, and K1 and K2 are integers greater than or equal to 1. Compared with the prior art that UE obtains a reference signal according to an indication of a base station and performs channel measurement, causing interference to downlink data transmission and deteriorating performance of a downlink system, the terminal in the present invention does not occupy an RE used to carry data, to carry a reference signal, so that channel measurement can be performed without affecting downlink data transmission.

Embodiment 5

Figure 12:
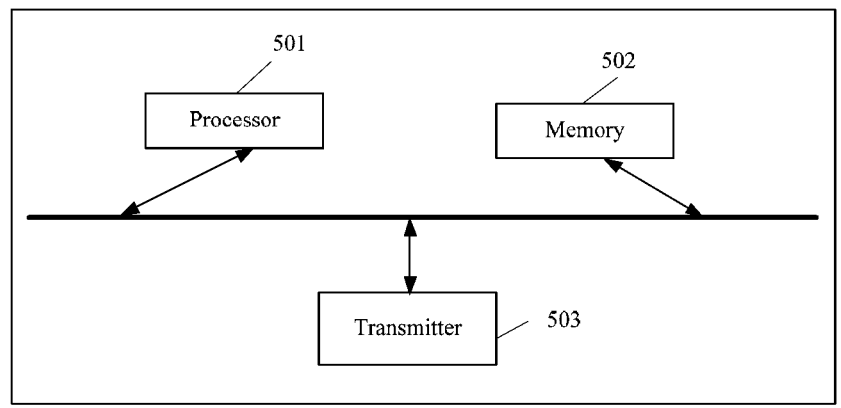
FIG. 12 is a structural block diagram of UE according to Embodiment 5 of the present invention.

This embodiment of the present invention provides a user equipment (UE). As shown in FIG. 12, the UE includes a processor 501, a memory 502, and a transmitter 503. The memory 502 stores code, and the processor 501 invokes the code in the memory 502 to perform the following operations.

The processor 501 is configured to: obtain a reference signal resource mapping diagram, obtain a reference signal according to the reference signal resource mapping diagram, perform channel measurement according to the reference signal, and determine channel state information.

The transmitter 503 is configured to feed back the channel state information to a base station.

The reference signal resource mapping diagram is a location to which a time-frequency resource of the reference signal is mapped, the reference signal resource mapping diagram is a first reference signal resource mapping diagram or a second reference signal resource mapping diagram, and an association relationship exists between each of K2 second reference signal resource mapping diagrams and at least one of K1 first reference signal resource mapping diagrams, where K2 is a quantity of the second reference signal resource mapping diagrams, K1 is a quantity of the first reference signal resource mapping diagrams, and K1 and K2 are integers greater than or equal to 1.

The first reference signal resource mapping diagram is a Y-port reference signal resource mapping diagram, the second reference signal resource mapping diagram is an X-port reference signal resource mapping diagram, Y is an integer less than or equal to 8 and satisfying $2^n$, and X is an integer greater than 8 or an integer less than 8 and not satisfying $2^n$.

In a first possible implementation, when X is less than 8 and does not satisfy $2^n$, the processor is further configured to obtain the second reference signal resource mapping diagram.

The association relationship is: Time-frequency resources and code resources of X consecutive ports in Y ports of any one of K2 second reference signal resource mapping diagrams are the same as time-frequency resources and code resources of X consecutive ports in Y ports of any one of K1 first reference signal resource mapping diagrams, Y is an integer closest to X and satisfying $2^n$ in integers greater than X, and the code resource is an orthogonal spreading code or a sequence of a reference signal.

In a second possible implementation, the X consecutive ports are the $0^{th}$ port to the $(X-1)^{th}$ port in the Y ports, or the X consecutive ports are the $(Y-X)^{th}$ port to the $(Y-1)^{th}$ port in the Y ports.

In a third possible implementation, K2=K1, or $$K2 = \left\lceil \frac{Y*K1}{X} \right\rceil,$$

and ⌈ ⌉ represents rounding down.

In a fourth possible implementation, at least one of the K2 second reference signal resource mapping diagrams includes time-frequency resources of at least two of the first reference signal resource mapping diagrams.

In a fifth possible implementation, an X-port second reference signal resource mapping diagram in the K2 second reference signal resource mapping diagrams includes K3 first reference signal resource mapping diagrams, each of the K3 first reference signal resource mapping diagrams includes time-frequency resources corresponding to H ports, H=X/K3, and K3 is a positive integer less than X.

In a sixth possible implementation, the H ports are the $0^{th}$ port to the $(H-1)^{th}$ port or the $(Y-H)^{th}$ port to the $(Y-1)^{th}$ port in the first reference signal resource mapping diagram.

In a seventh possible implementation, the processor is further configured to obtain the second reference signal resource mapping diagram.

The X-port second reference signal resource mapping diagram includes an $X_1$-port reference signal resource mapping diagram and an $X_2$-port reference signal resource mapping diagram.

$X_1+X_2=X$, a difference between $X_1$ and $X_2$ is less than 2, the $X_1$-port reference signal resource mapping diagram and the $X_2$-port reference signal resource mapping diagram are obtained by the UE from m subframes, and m is 1 or 2.

The $X_1$-port reference signal resource mapping diagram is the first reference signal resource mapping diagram, and the $X_2$-port reference signal resource mapping diagram is the second reference signal resource mapping diagram; or the $X_1$-port reference signal resource mapping diagram and the $X_2$-port reference signal resource mapping diagram both are the second reference signal resource mapping diagrams.

In an eighth possible implementation, X is an integer greater than 8.

In a ninth possible implementation, the UE further includes:

a receiver, configured to receive a sequence that is notified by the base station and that is of subframes carrying the $X_1$-port reference signal resource mapping diagram and the $X_2$-port reference signal resource mapping diagram; or a sequence of subframes carrying the $X_1$-port reference signal resource mapping diagram and the $X_2$-port reference signal resource mapping diagram is preset, and the sequence is a descending order of port quantities or an ascending order of port quantities.

In a tenth possible implementation, the UE further includes:

a receiver, configured to receive a number of a subframe carrying the $X_1$-port reference signal resource mapping diagram and a number of a subframe carrying the $X_2$-port reference signal resource mapping diagram that are notified by the base station; or the receiver, configured to receive a number of a subframe carrying the $X_1$-port reference signal resource mapping diagram and a subframe interval between a subframe carrying the $X_2$-port reference signal resource mapping diagram and the subframe carrying the $X_1$-port reference signal resource mapping diagram that are notified by the base station.

In an eleventh possible implementation, the processor is further configured to obtain the second reference signal resource mapping diagram.

The second reference signal resource mapping diagram includes each of an $X_1$-port reference signal resource mapping diagram, an $X_2$-port reference signal resource mapping diagram, . . . , and an $X_i$-port reference signal resource mapping diagram, $X_1+X_2$ . . . $+X_i=X$, and each of $X_1, X_2, \ldots$ , and $X_i$ can be represented as $2^n$.

The $X_1$-port reference signal resource mapping diagram, the $X_2$-port reference signal resource mapping diagram, . . . , and the $X_i$-port reference signal resource mapping diagram are obtained by the UE from at least one subframe.

In a twelfth possible implementation, X is an integer greater than 8.

In a thirteenth possible implementation, the $X_1$-port reference signal resource mapping diagram, the $X_2$-port reference signal resource mapping diagram, . . . , and the $X_i$-port reference signal resource mapping diagram are obtained by the UE from one subframe; or the $X_1$-port reference signal resource mapping diagram, the $X_2$-port reference signal resource mapping diagram, . . . , and the $X_i$-port reference signal resource mapping diagram are obtained by the UE from i subframes.

In a fourteenth possible implementation, the UE further includes:

a receiver, configured to receive a sequence that is notified by the base station and that is of subframes carrying the $X_1$-port reference signal resource mapping diagram, the $X_2$-port reference signal resource mapping diagram, . . . , and the $X_i$-port reference signal resource mapping diagram; or a sequence of subframes carrying the $X_1$-port reference signal resource mapping diagram, the $X_2$-port reference signal resource mapping diagram, . . . , and the $X_i$-port reference signal resource mapping diagram is predefined, where the sequence of the subframes is an ascending order of port quantities, or a descending order of port quantities, or a sequence of a largest port quantity, a smallest port quantity, a second largest port quantity, a second smallest port quantity, . . . .

In a fifteenth possible implementation, the receiver is further configured to receive configuration information that is notified by the base station and that is of each reference signal resource mapping diagram of the $X_1$-port reference signal resource mapping diagram, the $X_2$-port reference signal resource mapping diagram, . . . , and the $X_i$-port reference signal resource mapping diagram.

Alternatively, the receiver is further configured to receive joint coding signaling sent by the base station, where the joint coding signaling is used to indicate configuration information of the $X_1$-port reference signal resource mapping diagram, configuration information of the $X_2$-port reference signal resource mapping diagram, . . . , and configuration information of the $X_i$-port reference signal resource mapping diagram.

Alternatively, the receiver is further configured to receive configuration information of the $X_1$-port reference signal resource mapping diagram and a correspondence between configuration information of an $X_j$-port reference signal resource mapping diagram and the configuration information of the $X_1$-port reference signal resource mapping diagram that are notified by the base station, where j is an integer greater than 1 and less than or equal to i.

Alternatively, configuration information of the $X_1$-port reference signal resource mapping diagram, configuration information of the $X_2$-port reference signal resource mapping diagram, . . . , and configuration information of the $X_i$-port reference signal resource mapping diagram are predefined.

In a sixteenth possible implementation, a number of the subframe carrying the $X_1$-port reference signal resource mapping diagram, a number of the subframe carrying the $X_1$-port reference signal resource mapping diagram, . . . , and a number of the subframe carrying the $X_i$-port reference signal resource mapping diagram are predefined; or the receiver is further configured to receive a number of the subframe carrying the $X_1$-port reference signal resource mapping diagram, a number of the subframe carrying the $X_2$-port reference signal resource mapping diagram, . . . , and a number of the subframe carrying the $X_i$-port reference signal resource mapping diagram that are notified by the base station; or the receiver is further configured to receive a number of the subframe carrying the $X_1$-port reference signal resource mapping diagram and a subframe interval between a number of a subframe carrying an $X_j$-port reference signal resource mapping diagram and the number of the subframe carrying the $X_1$-port reference signal resource mapping diagram that are notified by the base station, where j is an integer greater than 1 and less than or equal to i.

In a seventeenth possible implementation, if an $X_t$-port reference signal resource mapping diagram and the $X_j$-port reference signal resource mapping diagram are in different subframes, t is an integer greater than or equal to 1 and less than or equal to i, and t is not equal to j, the $X_t$-port reference signal resource mapping diagram and the $X_j$-port reference signal resource mapping diagram have L same relative time-frequency resource locations in each PRB pair, and L is a smallest value in $X_t$, $X_j$; or time-frequency resource locations of the $X_t$-port reference signal resource mapping diagram and the $X_j$-port reference signal resource mapping diagram in each PRB pair are different.

In an eighteenth possible implementation, there are Q overlapping time-frequency resource locations between time-frequency resource locations of the $X_1$-port reference signal resource mapping diagram, the $X_2$-port reference signal resource mapping diagram, . . . , and the $X_i$-port reference signal resource mapping diagram, and Q is a smallest value in $X_1, X_2 \ldots X_i$.

In a nineteenth possible implementation, the Q overlapping time-frequency resource locations are time-frequency resource locations corresponding to the $0^{th}$ port to the $(Q-1)^{th}$ port in the $X_j$-port reference signal resource mapping diagram.

In a terminal provided in this embodiment of the present invention, UE obtains a reference signal resource mapping diagram, and obtains a reference signal according to the reference signal resource mapping diagram. The UE performs channel measurement according to the reference signal to determine channel state information, and feeds back the channel state information to a base station. The reference signal resource mapping diagram is a first reference signal resource mapping diagram or a second reference signal resource mapping diagram, and an association relationship exists between each of K2 second reference signal resource mapping diagrams and at least one of K1 first reference signal resource mapping diagrams, where K2 is a quantity of the second reference signal resource mapping diagrams, K1 is a quantity of the first reference signal resource mapping diagrams, and K1 and K2 are integers greater than or equal to 1. Compared with the prior art that UE obtains a reference signal according to an indication of a base station and performs channel measurement, causing interference to downlink data transmission and deteriorating performance of a downlink system, the terminal in the present invention does not occupy an RE used to carry data, to carry a reference signal, so that channel measurement can be performed without affecting downlink data transmission.

Embodiment 6

Figure 13:
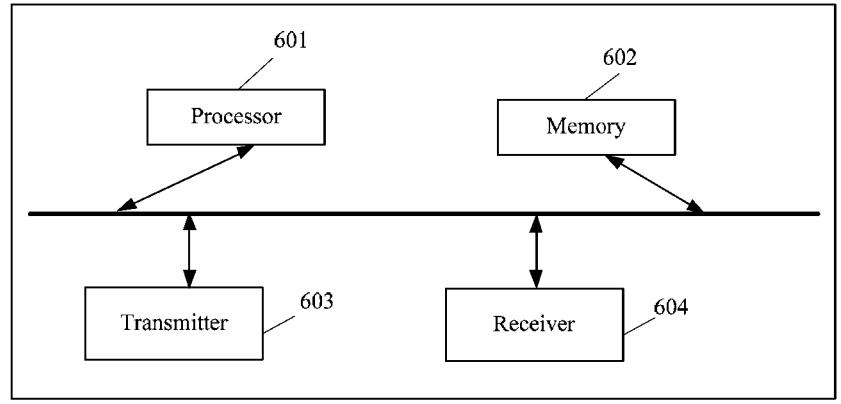
FIG. 13 is a structural block diagram of a base station according to Embodiment 6 of the present invention.

This embodiment of the present invention provides a base station. As shown in FIG. 13, the base station includes a processor 601, a memory 602, a transmitter 603, and a receiver 604. The memory 602 stores a group of code, and the processor 601 is configured to invoke the code in the memory 602 to perform the following operations.

The processor 601 is configured to configure a reference signal resource mapping diagram.

The transmitter 602 is configured to send the reference signal resource mapping diagram to a user equipment (UE).

The receiver 403 is configured to receive channel state information fed back by the UE.

The reference signal resource mapping diagram is a location to which a time-frequency resource of the reference signal is mapped, the reference signal resource mapping diagram is a first reference signal resource mapping diagram or a second reference signal resource mapping diagram, and an association relationship exists between each of K2 second reference signal resource mapping diagrams and at least one of K1 first reference signal resource mapping diagrams, where K2 is a quantity of the second reference signal resource mapping diagrams, K1 is a quantity of the first reference signal resource mapping diagrams, and K1 and K2 are integers greater than or equal to 1.

The first reference signal resource mapping diagram is a Y-port reference signal resource mapping diagram, the second reference signal resource mapping diagram is an X-port reference signal resource mapping diagram, Y is an integer less than or equal to 8 and satisfying $2^n$, and X is an integer greater than 8 or an integer less than 8 and not satisfying $2^n$.

In a first possible implementation, the association relationship is: Time-frequency resources and code resources of X consecutive ports in Y ports of any one of K2 second reference signal resource mapping diagrams are the same as time-frequency resources and code resources of X consecutive ports in Y ports of any one of K1 first reference signal resource mapping diagrams, Y is an integer closest to X and satisfying $2^n$ in integers greater than X, and the code resource is an orthogonal spreading code or a sequence of a reference signal.

In a second possible implementation, the X consecutive ports are the $0^{th}$ port to the $(X-1)^{th}$ port in the Y ports, or the X consecutive ports are the $(Y-X)^{th}$ port to the $(Y-1)^{th}$ port in the Y ports.

In a third possible implementation, K2=K1, or $$K2 = \left\lceil \frac{Y*K1}{X} \right\rceil,$$

and ⌈ ⌉ represents rounding down.

In a fourth possible implementation, at least one of the K2 second reference signal resource mapping diagrams includes time-frequency resources of at least two of the first reference signal resource mapping diagrams.

In a fifth possible implementation, an X-port second reference signal resource mapping diagram in the K2 second reference signal resource mapping diagrams includes K3 first reference signal resource mapping diagrams, each of the K3 first reference signal resource mapping diagrams includes time-frequency resources corresponding to H ports, H=X/K3, and K3 is a positive integer less than X.

In a sixth possible implementation, the H ports are the $0^{th}$ port to the $(H-1)^{th}$ port or the $(Y-H)^{th}$ port to the $(Y-1)^{th}$ port in the first reference signal resource mapping diagram.

In a seventh possible implementation, the transmitter is further configured to send the second reference signal resource mapping diagram to the UE.

The X-port second reference signal resource mapping diagram includes an $X_1$-port reference signal resource mapping diagram and an $X_2$-port reference signal resource mapping diagram.

$X_1+X_2=X$, a difference between $X_1$ and $X_2$ is less than 2, the $X_1$-port reference signal resource mapping diagram and the $X_2$-port reference signal resource mapping diagram are obtained by the UE from m subframes, and m is 1 or 2.

The $X_1$-port reference signal resource mapping diagram is the first reference signal resource mapping diagram, and the $X_2$-port reference signal resource mapping diagram is the second reference signal resource mapping diagram; or the $X_1$-port reference signal resource mapping diagram and the $X_2$-port reference signal resource mapping diagram both are the second reference signal resource mapping diagrams.

In an eighth possible implementation, X is an integer greater than 8.

In a ninth possible implementation, the transmitter is further configured to notify the UE of a sequence of subframes carrying the $X_1$-port reference signal resource mapping diagram and the $X_2$-port reference signal resource mapping diagram.

Alternatively, a sequence of subframes carrying the $X_1$-port reference signal resource mapping diagram and the $X_2$-port reference signal resource mapping diagram is preset, where the sequence is a descending order of port quantities or an ascending order of port quantities.

In a tenth possible implementation, the transmitter is further configured to notify the UE of a number of the subframe carrying the $X_1$-port reference signal resource mapping diagram and a number of the subframe carrying the $X_2$-port reference signal resource mapping diagram.

Alternatively, the transmitter is further configured to notify the UE of a number of the subframe carrying the $X_1$-port reference signal resource mapping diagram and a subframe interval between the subframe that the $X_2$-port reference signal resource mapping diagram and the subframe carrying the $X_1$-port reference signal resource mapping diagram.

In an eleventh possible implementation, the transmitter is further configured to send the second reference signal resource mapping diagram to the UE.

The second reference signal resource mapping diagram includes each of an $X_1$-port reference signal resource mapping diagram, an $X_2$-port reference signal resource mapping diagram, . . . , and an $X_i$-port reference signal resource mapping diagram, $X_1+X_2$ . . . $+X_i=X$, and each of $X_1, X_2 \ldots X_i$ can be represented as $2^n$.

The $X_1$-port reference signal resource mapping diagram, the $X_2$-port reference signal resource mapping diagram, . . . , and the $X_i$-port reference signal resource mapping diagram are obtained by the UE from at least one subframe.

In a twelfth possible implementation, X is an integer greater than 8.

In a thirteenth possible implementation, the $X_1$-port reference signal resource mapping diagram, the $X_2$-port reference signal resource mapping diagram, . . . , and the $X_i$-port reference signal resource mapping diagram are sent by the base station in one subframe; or the $X_1$-port reference signal resource mapping diagram, the $X_2$-port reference signal resource mapping diagram, . . . , and the $X_i$-port reference signal resource mapping diagram are sent by the base station in i subframes.

In a fourteenth possible implementation, the transmitter is further configured to notify the UE of a sequence of subframes carrying the $X_1$-port reference signal resource mapping diagram, the $X_2$-port reference signal resource mapping diagram, . . . , and the $X_i$-port reference signal resource mapping diagram.

Alternatively, a sequence of subframes carrying the $X_1$-port reference signal resource mapping diagram, the $X_2$-port reference signal resource mapping diagram, . . . , and the $X_i$-port reference signal resource mapping diagram is predefined, where the sequence of the subframes is an ascending order of port quantities, or a descending order of port quantities, or a sequence of a largest port quantity, a smallest port quantity, a second largest port quantity, a second smallest port quantity, . . . .

In a fifteenth possible implementation, the transmitter is further configured to notify the UE of configuration information of each reference signal resource mapping diagram of the $X_1$-port reference signal resource mapping diagram, the $X_2$-port reference signal resource mapping diagram, . . . , and the $X_i$-port reference signal resource mapping diagram.

Alternatively, the transmitter is further configured to send joint coding signaling to the UE, where the joint coding signaling is used to indicate configuration information of the $X_1$-port reference signal resource mapping diagram, configuration information of the $X_2$-port reference signal resource mapping diagram, . . . , and configuration information of the $X_i$-port reference signal resource mapping diagram.

Alternatively, the transmitter is further configured to notify the UE of configuration information of the $X_1$-port reference signal resource mapping diagram and a correspondence between configuration information of an $X_j$-port reference signal resource mapping diagram and the configuration information of the $X_1$-port reference signal resource mapping diagram, where j is an integer greater than 1 and less than or equal to i.

Alternatively, configuration information of the $X_1$-port reference signal resource mapping diagram, configuration information of the $X_2$-port reference signal resource mapping diagram, . . . , and configuration information of the $X_i$-port reference signal resource mapping diagram are predefined.

In a sixteenth possible implementation, a number of the subframe carrying the $X_1$-port reference signal resource mapping diagram, a number of the subframe carrying the $X_1$-port reference signal resource mapping diagram, . . . , and a number of the subframe carrying the $X_i$-port reference signal resource mapping diagram are predefined.

Alternatively, the transmitter is further configured to notify the UE of a number of the subframe carrying the $X_1$-port reference signal resource mapping diagram, a number of the subframe carrying the $X_2$-port reference signal resource mapping diagram, . . . , and a number of the subframe carrying the $X_i$-port reference signal resource mapping diagram.

Alternatively, the transmitter is further configured to notify the UE of a number of the subframe carrying the $X_1$-port reference signal resource mapping diagram and a subframe interval between a number of a subframe carrying an $X_j$-port reference signal resource mapping diagram and the number of the subframe carrying the $X_1$-port reference signal resource mapping diagram, where j is an integer greater than 1 and less than or equal to i.

In a seventeenth possible implementation, if an $X_t$-port reference signal resource mapping diagram and the $X_j$-port reference signal resource mapping diagram are in different subframes, t is an integer greater than or equal to 1 and less than or equal to i, and t is not equal to j, the $X_t$-port reference signal resource mapping diagram and the $X_j$-port reference signal resource mapping diagram have L same relative time-frequency resource locations in each PRB pair, and L is a smallest value in $X_t$, $X_j$; or time-frequency resource locations of the $X_t$-port reference signal resource mapping diagram and the $X_j$-port reference signal resource mapping diagram in each PRB pair are different.

In an eighteenth possible implementation, there are Q overlapping time-frequency resource locations between time-frequency resource locations of the $X_1$-port reference signal resource mapping diagram, the $X_2$-port reference signal resource mapping diagram, . . . , and the $X_i$-port reference signal resource mapping diagram, and Q is a smallest value in $X_1$, $X_2$ . . . $X_i$.

In a nineteenth possible implementation, the Q overlapping time-frequency resource locations are time-frequency resource locations corresponding to the $0^{th}$ port to the $(Q-1)^{th}$ port in the $X_j$-port reference signal resource mapping diagram.

Embodiment 7

A second reference signal resource mapping diagram provided in this embodiment of the present invention may be a 9-port reference signal resource mapping diagram. That is, X is greater than 8 and does not satisfy $2^n$.

Figure 14:
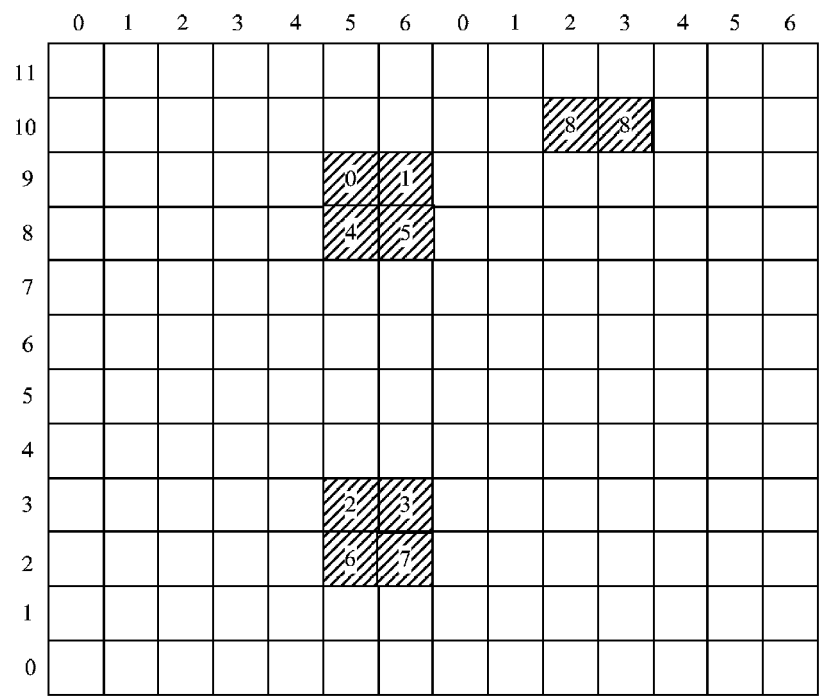
FIG. 14 shows a 9-port reference signal resource mapping diagram according to Embodiment 7 of the present invention.

When X=9, X=8+1. That is, the 9-port reference signal resource mapping diagram may include an 8-port reference signal resource mapping diagram and a 1-port reference signal resource mapping diagram. Further, the 8-port reference signal resource mapping diagram and the 1-port reference signal resource mapping diagram may be in a same subframe. FIG. 14 shows the 9-port reference signal resource mapping diagram provided in this embodiment of the present invention. Time-frequency resource locations occupied by the $0^{th}$ port to the seventh port are the same as time-frequency resource locations occupied by eight ports in the 8-port reference signal resource mapping diagram. That is, the 9-port reference signal resource mapping diagram includes one 8-port reference signal resource mapping diagram. In addition, a time-frequency resource location occupied by the eighth port is the same as a time-frequency resource location occupied by one port in the 1-port reference signal resource mapping diagram. That is, the 9-port reference signal resource mapping diagram further includes one 1-port reference signal resource mapping diagram.

Figure 15:
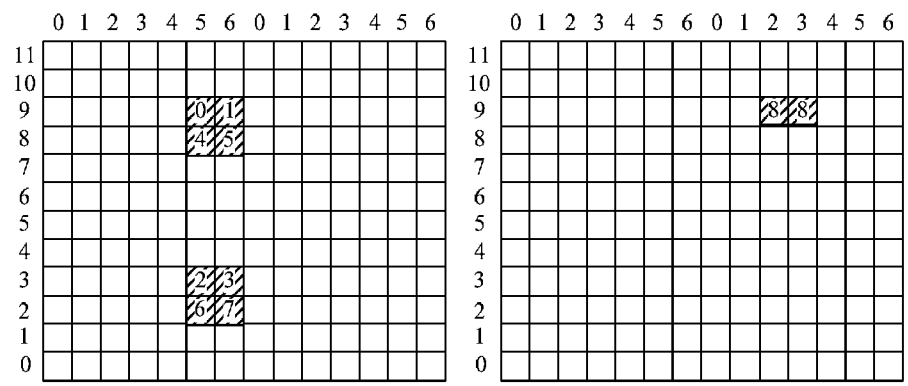
FIG. 15 shows another 9-port reference signal resource mapping diagram according to Embodiment 7 of the present invention.

Certainly, the 8-port reference signal resource mapping diagram and the 1-port reference signal resource mapping diagram that form the 9-port reference signal resource mapping diagram may alternatively be in different subframes. As shown in FIG. 15, the 8-port reference signal resource mapping diagram is in a previous subframe of a subframe carrying the 1-port reference signal resource mapping diagram. The time-frequency resource locations corresponding to the $0^{th}$ port to the seventh port are in the subframe carrying the 8-port reference signal resource mapping diagram, and the time-frequency resource location corresponding to the eighth port is in the subframe carrying the 1-port reference signal resource mapping diagram. In addition, the eighth port and the $0^{th}$ port correspond to a same subcarrier.

Figure 16:
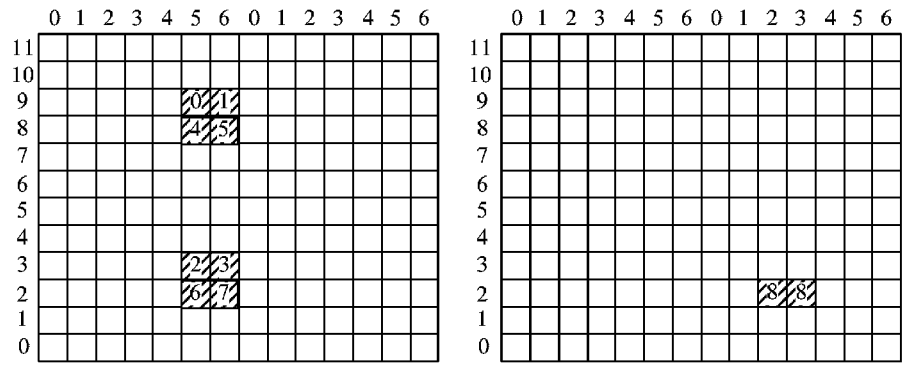
FIG. 16 shows another 9-port reference signal resource mapping diagram according to Embodiment 7 of the present invention.

FIG. 16 shows another 9-port reference signal resource mapping diagram according to the present invention. An 8-port reference signal resource mapping diagram and a 1-port reference signal resource mapping diagram that form the 9-port reference signal resource mapping diagram may alternatively be in different subframes, and time-frequency resource locations corresponding to the $0^{th}$ port to the seventh port are in a subframe that the 8-port reference signal resource mapping diagram, and a time-frequency resource location corresponding to an eighth port is in a subframe carrying the 1-port reference signal resource mapping diagram. In addition, the eighth port and the seventh port correspond to a same subcarrier.

The second reference signal resource mapping diagram provided in this embodiment of the present invention may also be a 12-port reference signal resource mapping diagram.

Figure 17:
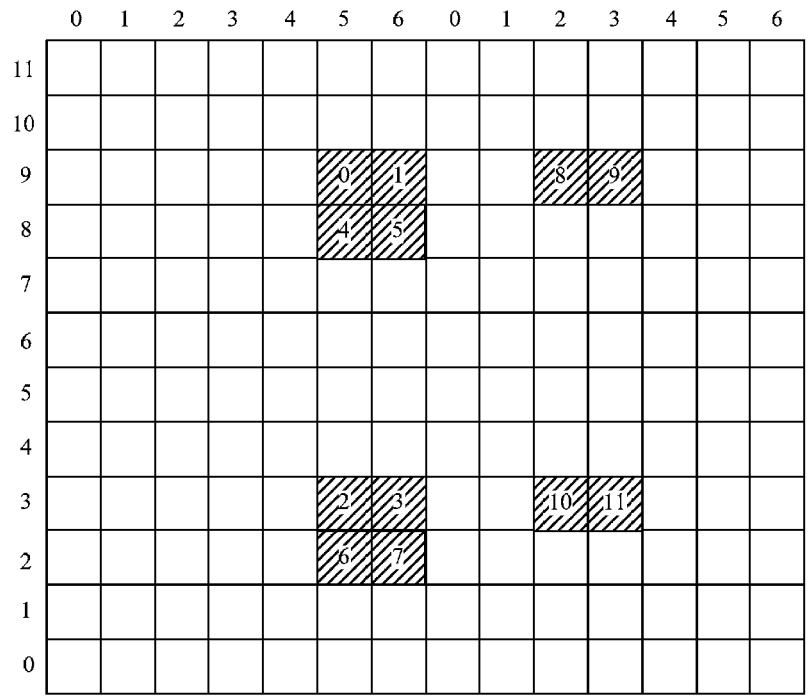
FIG. 17 shows a 12-port reference signal resource mapping diagram according to Embodiment 7 of the present invention.

When X=12, X=X1+X2, X1=8, and X2=4. That is, the 12-port second reference signal resource mapping diagram may include one 8-port first reference signal resource mapping diagram and one 4-port first reference signal resource mapping diagram. Further, the 8-port reference signal resource mapping diagram and the 4-port reference signal resource mapping diagram may be in a same subframe. FIG. 17 shows a 12-port second reference signal resource mapping diagram of a configuration in normal CP mode 1 (supporting time division multiplexing (TDD) and frequency division multiplexing (FDD)) according to the present invention. The 12 ports are numbered from 0 to 11. As can be known from Table 1 (a port configuration table in a normal CP defined in LTE R12 in the prior art), time-frequency resource locations (locations of REs) occupied by the $0^{th}$ port to the seventh port are the same as time-frequency resource locations occupied by an 8-port first reference signal resource mapping diagram corresponding to configuration 0 in five 8-port configurations in the normal CP defined in the LTE R12 in the prior art, and locations (k,l) of REs occupied by the 8-port first reference signal resource mapping diagram corresponding to configuration 0 are {(9, 5), (9, 6), (3, 5), (3, 6), (8, 5), (8, 6), (2, 5), (2, 6)}. In this configuration, time-frequency resource locations occupied by the eighth port to the eleventh port in the 12 ports are the same as time-frequency resource locations occupied by a 4-port first reference signal resource mapping diagram corresponding to configuration 2 in 10 configurations of 4-port first reference signal resource mapping diagrams in the normal CP defined in the LTE R12 in the prior art, and locations (k,l) of occupied REs are {(9, 2), (9, 3), (3, 2), (3, 3)}. k is a number of a subcarrier in each PRB pair, and a value of k is 0 to 11 for a normal CP. l is a number of an OFDM symbol in each slot in each PRB pair, and a value range is 0 to 6. Each PRB pair includes two slots: slot 0 and slot 1.

That is, the 12-port reference signal resource mapping diagram includes one 8-port reference signal resource mapping diagram. In addition, time-frequency resource locations occupied by the eighth port to the eleventh port are the same as time-frequency resource locations occupied by four ports in the 4-port reference signal resource mapping diagram. That is, the 12-port reference signal resource mapping diagram further includes one four-port first reference signal resource mapping diagram.

TABLE 1

| CSI reference signal configuration | Number of CSI reference signals configured | | | | | |
|---|---|---|---|---|---|---|
| | 1 or 2 | | 4 | | 8 | |
| | (k', l') | $n_s$ mod2 | (k', l') | $n_s$ mod2 | (k', l') | $n_s$ mod2 |
| Mode 1  0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| Mode 2  20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

Figure 18:
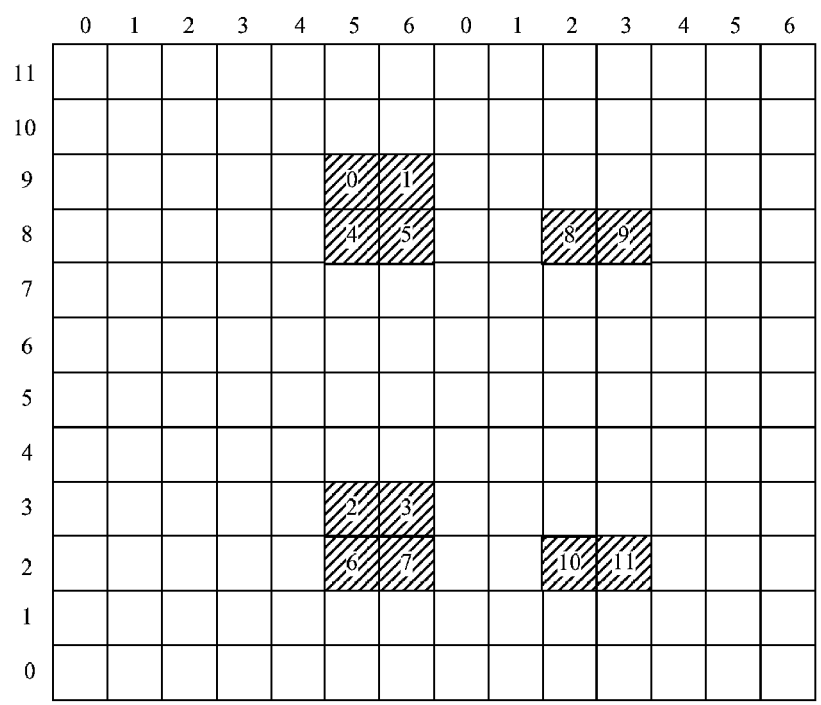
FIG. 18 shows another 12-port reference signal resource mapping diagram according to Embodiment 7 of the present invention.

FIG. 18 shows a 12-port second reference signal resource mapping diagram of another configuration in normal CP mode 1 according to the present invention. The 12 ports are numbered from 0 to 11. Time-frequency resource locations (locations of REs) occupied by the $0^{th}$ port to the seventh port are the same as time-frequency resource locations occupied by an 8-port first reference signal resource mapping diagram corresponding to configuration 0 in five 8-port configurations in the normal CP defined in the LTE R12 in the prior art. In this configuration, time-frequency resource locations occupied by the eighth port to the eleventh port in the 12 ports are the same as time-frequency resource locations occupied by a 4-port first reference signal resource mapping diagram corresponding to configuration 7 in 10 configurations of 4-port first reference signal resource mapping diagrams in the normal CP defined in the LTE R12 in the prior art, and locations (k,l) of occupied REs are {(8, 2), (8, 3), (2, 2), (2, 3)}.

Figure 19:
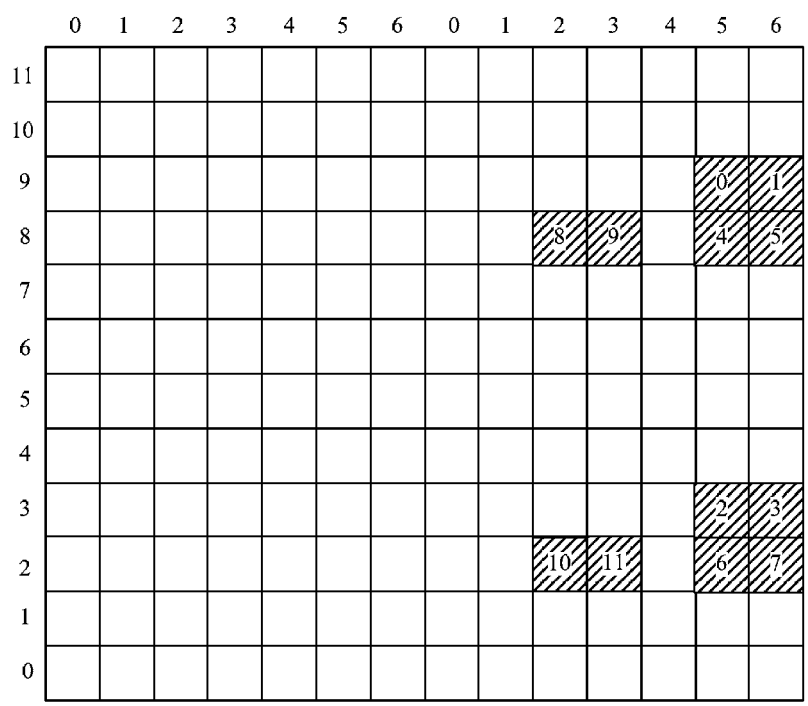
FIG. 19 shows another 12-port reference signal resource mapping diagram according to Embodiment 7 of the present invention.

FIG. 19 shows a 12-port second reference signal resource mapping diagram of a configuration in normal CP mode 1 according to the present invention. The 12 ports are numbered from 0 to 11. Time-frequency resource locations (locations of REs) occupied by the $0^{th}$ port to the seventh port are the same as time-frequency resource locations occupied by an 8-port first reference signal resource mapping diagram corresponding to configuration 4 in five 8-port configurations in the normal CP defined in the LTE R12 in the prior art, and locations (k,l) of REs occupied by the 8-port first reference signal resource mapping diagram corresponding to configuration 4 are {(9, 5), (9, 6), (3, 5), (3, 6), (8, 5), (8, 6), (2, 5), (2, 6)}. In addition, in this configuration, time-frequency resource locations occupied by the eighth port to the eleventh port in the 12 ports are the same as time-frequency resource locations occupied by a 4-port first reference signal resource mapping diagram corresponding to configuration 2 in 10 configurations of 4-port first reference signal resource mapping diagrams in the normal CP defined in the LTE R12 in the prior art, and locations (k,l) of occupied REs are {(9, 2), (9, 3), (3, 2), (3, 3)}.

Figure 20:
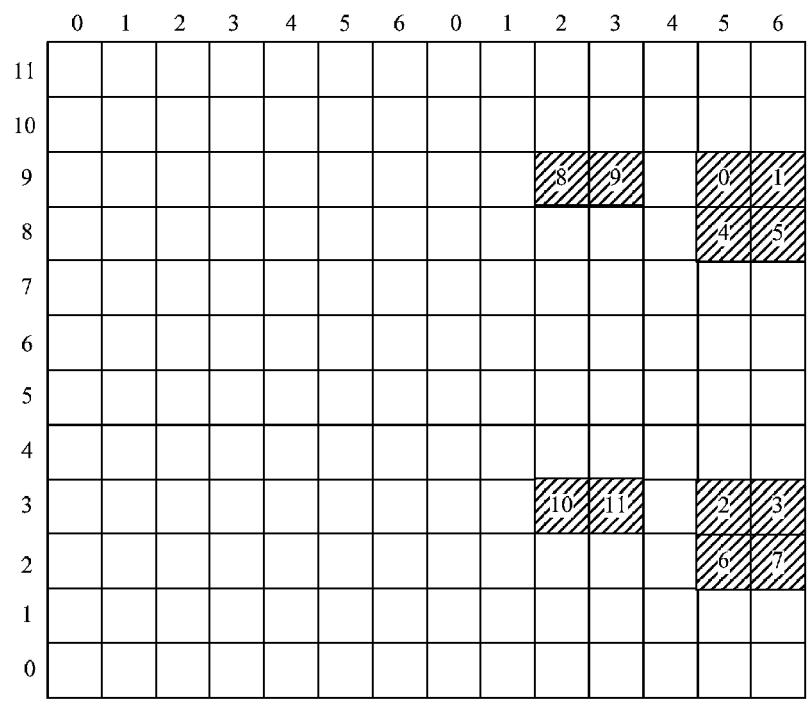
FIG. 20 shows another 12-port reference signal resource mapping diagram according to Embodiment 7 of the present invention.

FIG. 20 shows a 12-port second reference signal resource mapping diagram of a configuration in normal CP mode 1 according to the present invention. The 12 ports are numbered from 0 to 11. Time-frequency resource locations (locations of REs) occupied by the $0^{th}$ port to the seventh port are the same as time-frequency resource locations occupied by an 8-port first reference signal resource mapping diagram corresponding to configuration 4 in five 8-port configurations in the normal CP defined in the LTE R12 in the prior art, and locations (k,l) of REs occupied by the 8-port first reference signal resource mapping diagram corresponding to configuration 4 are {(9, 5), (9, 6), (3, 5), (3, 6), (8, 5), (8, 6), (2, 5), (2, 6)}. In addition, in this configuration, time-frequency resource locations occupied by the eighth port to the eleventh port in the 12 ports are the same as time-frequency resource locations occupied by a 4-port first reference signal resource mapping diagram corresponding to configuration 7 in 10 configurations of 4-port first reference signal resource mapping diagrams in the normal CP defined in the LTE R12 in the prior art, and locations (k,l) of occupied REs are {(8, 2), (8, 3), (2, 2), (2, 3)}.

Figure 21:
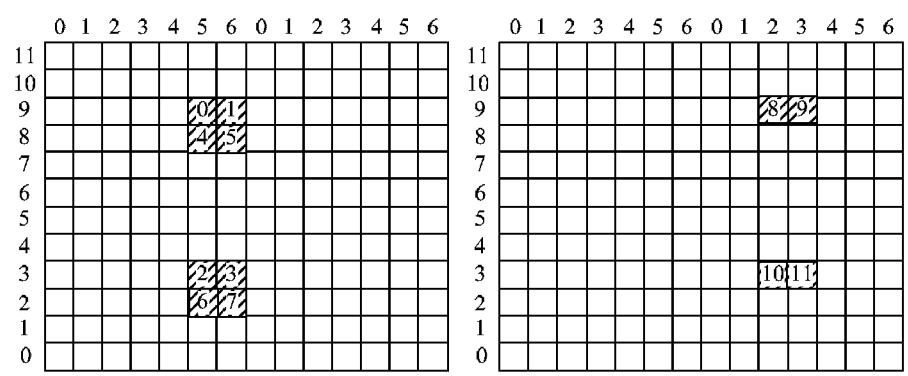
FIG. 21 shows another 12-port reference signal resource mapping diagram according to Embodiment 7 of the present invention.

Certainly, the 8-port first reference signal resource mapping diagram and the 4-port first reference signal resource mapping diagram that form the 12-port reference signal resource mapping diagram are in different subframes. As shown in FIG. 21, the time-frequency resource locations corresponding to the 12-port second reference signal resource mapping diagram shown in FIG. 17 are divided into two different subframes. For example, the 8-port reference signal resource mapping diagram is in a previous subframe of a subframe carrying the 4-port reference signal resource mapping diagram. The time-frequency resource locations corresponding to the $0^{th}$ port to the seventh port are in the subframe carrying the 8-port reference signal resource mapping diagram, and the time-frequency resource locations corresponding to the eighth port to the eleventh port are in the subframe carrying the 4-port reference signal resource mapping diagram. In addition, the eighth port and the ninth port correspond to subcarriers the same as subcarriers corresponding to the $0^{th}$ port and the first port, and the tenth port and the eleventh port correspond to subcarriers the same as subcarriers corresponding to the fourth port and the fifth port. Certainly, each of the 12-port second reference signal resource mapping diagrams shown in FIG. 18 to FIG. 20 may be in different subframes. Specifically, the time-frequency resource locations corresponding to the $0^{th}$ port to the seventh port are in the previous subframe of the subframe carrying the time-frequency resource locations corresponding to the eighth port to the eleventh port, the time-frequency resource locations occupied by the $0^{th}$ port to the seventh port are the same as time-frequency resource locations occupied by the first 8 ports in an original configuration of the 12-port second reference signal resource mapping diagram, and the time-frequency resource locations occupied by the eighth port to the eleventh port are the same as time-frequency resource locations occupied by the last 4 ports in the original configuration of the 12-port second reference signal resource mapping diagram, and details are not described herein again.

Figure 22:
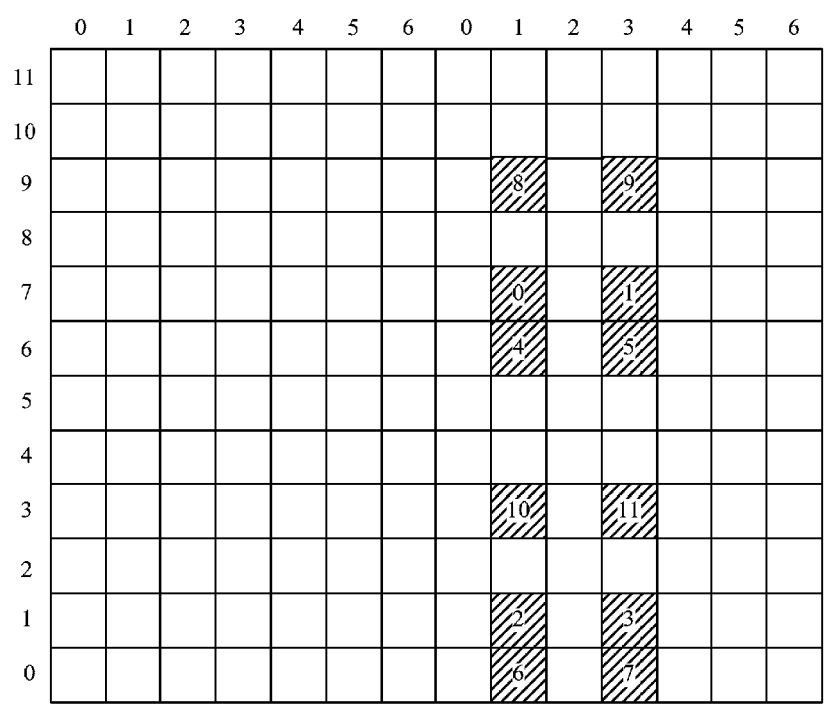
FIG. 22 shows another 12-port reference signal resource mapping diagram according to Embodiment 7 of the present invention.

In normal CP mode 2 (supporting only TDD), a 12-port reference signal resource mapping diagram may be a reference signal resource mapping diagram shown in FIG. 22. The 12 ports are numbered from 0 to 11. Time-frequency resource locations (locations of REs) occupied by the $0^{th}$ port to the seventh port are the same as time-frequency resource locations occupied by an 8-port first reference signal resource mapping diagram corresponding to configuration 22 in three 8-port configurations in normal CP mode 2 defined in the LTE R12 in the prior art, and locations (k,l) of REs occupied by the 8-port first reference signal resource mapping diagram corresponding to configuration 22 are {(7, 1), (7, 3), (1, 1), (1, 3), (6, 1), (6, 3), (0, 1), (0, 3)}. In this configuration, time-frequency resource locations occupied by the eighth port to the eleventh port in the 12 ports are the same as time-frequency resource locations occupied by an 8-port first reference signal resource mapping diagram corresponding to configuration 21 in three configurations of 8-port first reference signal resource mapping diagrams in normal CP mode 2 defined in the LTE R12 in the prior art, and locations (k,l) of occupied REs are {(9, 1), (9, 3), (3, 1), (3, 3)}.

Figure 23:
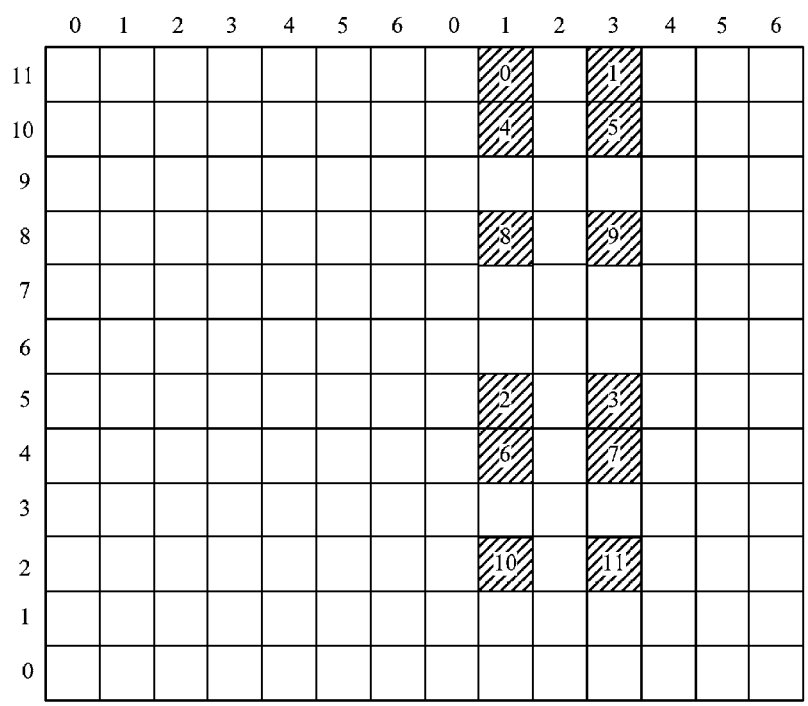
FIG. 23 shows another 12-port reference signal resource mapping diagram according to Embodiment 7 of the present invention.

In normal CP mode 2, a 12-port reference signal resource mapping diagram may alternatively be a reference signal resource mapping diagram shown in FIG. 23. The 12 ports are numbered from 0 to 11. Time-frequency resource locations (locations of REs) occupied by the $0^{th}$ port to the seventh port are the same as time-frequency resource locations occupied by an 8-port first reference signal resource mapping diagram corresponding to configuration 20 in three 8-port configurations in normal CP mode 2 defined in the LTE R12 in the prior art, and locations (k,l) of REs occupied by the 8-port first reference signal resource mapping diagram corresponding to configuration 20 are {(11, 1), (11, 3), (5, 1), (5, 3), (10, 1), (10, 3), (4, 1), (4, 3)}. In this configuration, time-frequency resource locations occupied by the eighth port to the eleventh port in the 12 ports are the same as time-frequency resource locations occupied by an 8-port first reference signal resource mapping diagram corresponding to configuration 21 in three configurations of 8-port first reference signal resource mapping diagrams in normal CP mode 2 defined in the LTE R12 in the prior art, and locations (k,l) of occupied REs are {(8, 1), (8, 3), (2, 1), (2, 3)}.

Figure 24:
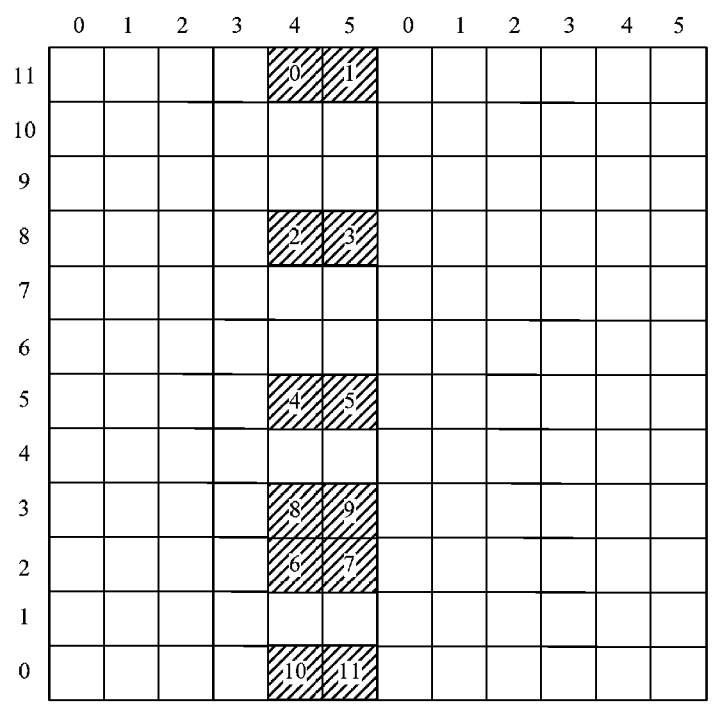
FIG. 24 shows another 12-port reference signal resource mapping diagram according to Embodiment 7 of the present invention.

In extended CP mode 1, a 12-port reference signal resource mapping diagram may be a reference signal resource mapping diagram shown in FIG. 24. The 12 ports are numbered from 0 to 11. As can be known from Table 2 (a port configuration table in an extended CP defined in the LTE R12 in the prior art), time-frequency resource locations (locations of REs) occupied by the $0^{th}$ port to the seventh port are the same as time-frequency resource locations occupied by an 8-port first reference signal resource mapping diagram corresponding to configuration 0 in four 8-port configurations in extended CP mode 1 defined in the LTE R12 in the prior art, and locations (k,l) of REs occupied by the 8-port first reference signal resource mapping diagram corresponding to configuration 0 are {(11, 4), (11, 5), (8, 4), (8, 5), (5, 4), (5, 5), (2, 4), (2, 5)}. In this configuration, time-frequency resource locations occupied by the eighth port to the eleventh port in the 12 ports are the same as time-frequency resource locations occupied by an 8-port first reference signal resource mapping diagram corresponding to configuration 1 in four configurations of 8-port first reference signal resource mapping diagrams in extended CP mode 1 defined in the LTE R12 in the prior art, and locations (k,l) of occupied REs are {(3, 4), (3, 5), (0, 4), (0, 5)}. Alternatively, in this configuration, time-frequency resource locations occupied by the eighth port to the eleventh port in the 12 ports are the same as time-frequency resource locations occupied by an 8-port first reference signal resource mapping diagram corresponding to configuration 1 in four configurations of 8-port first reference signal resource mapping diagrams defined in the LTE R12 in the prior art, and locations (k,l) of occupied REs are {(9, 4), (9, 5), (6, 4), (6, 5)}.

TABLE 2

| CSI reference signal configuration | Number of CSI reference signals configured | | | | | |
|---|---|---|---|---|---|---|
| | 1 or 2 | | 4 | | 8 | |
| | (k', l') | $n_s$ mod2 | (k', l') | $n_s$ mod2 | (k', l') | $n_s$ mod2 |
| Mode 1   0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| 9 | (6, 4) | 0 | | | | |
| 10 | (2, 4) | 0 | | | | |
| 11 | (0, 4) | 0 | | | | |
| 12 | (7, 4) | 1 | | | | |
| 13 | (6, 4) | 1 | | | | |
| 14 | (1, 4) | 1 | | | | |
| 15 | (0, 4) | 1 | | | | |
| Mode 2  16 | (11, 1) | 1 | (11, 1) | 1 | (11, 1) | 1 |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

Figure 25:
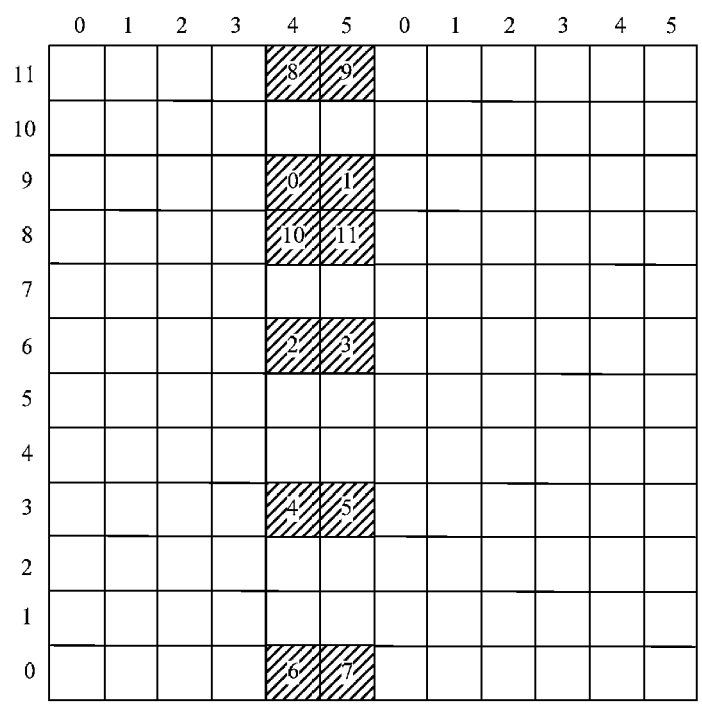
FIG. 25 shows another 12-port reference signal resource mapping diagram according to Embodiment 7 of the present invention.

In extended CP mode 1, a 12-port reference signal resource mapping diagram may also be a reference signal resource mapping diagram shown in FIG. 25. The 12 ports are numbered from 0 to 11. Time-frequency resource locations (locations of REs) occupied by the $0^{th}$ port to the seventh port are the same as time-frequency resource locations occupied by an 8-port first reference signal resource mapping diagram corresponding to configuration 1 in four 8-port configurations in extended CP mode 1 defined in the LTE R12 in the prior art, and locations (k,l) of REs occupied by the 8-port first reference signal resource mapping diagram corresponding to configuration 1 are {(9, 4), (9, 5), (6, 4), (6, 5), (3, 4), (3, 5), (0, 4), (0, 5)}. In this configuration, time-frequency resource locations occupied by the eighth port to the eleventh port in the 12 ports are the same as time-frequency resource locations occupied by an 8-port first reference signal resource mapping diagram corresponding to configuration 0 in four configurations of 8-port first reference signal resource mapping diagrams in extended CP mode 1 defined in the LTE R12 in the prior art, and locations (k,l) of occupied REs are {(11, 4), (11, 5), (8, 4), (8, 5)}. Alternatively, in this configuration, time-frequency resource locations occupied by the eighth port to the eleventh port in the 12 ports are the same as time-frequency resource locations occupied by an 8-port first reference signal resource mapping diagram corresponding to configuration 0 in four configurations of 8-port first reference signal resource mapping diagrams in extended CP mode 1 defined in the LTE R12 in the prior art, and locations (k,l) of occupied REs are {(3, 4), (3, 5), (0, 4), (0, 5)}.

Figure 26:
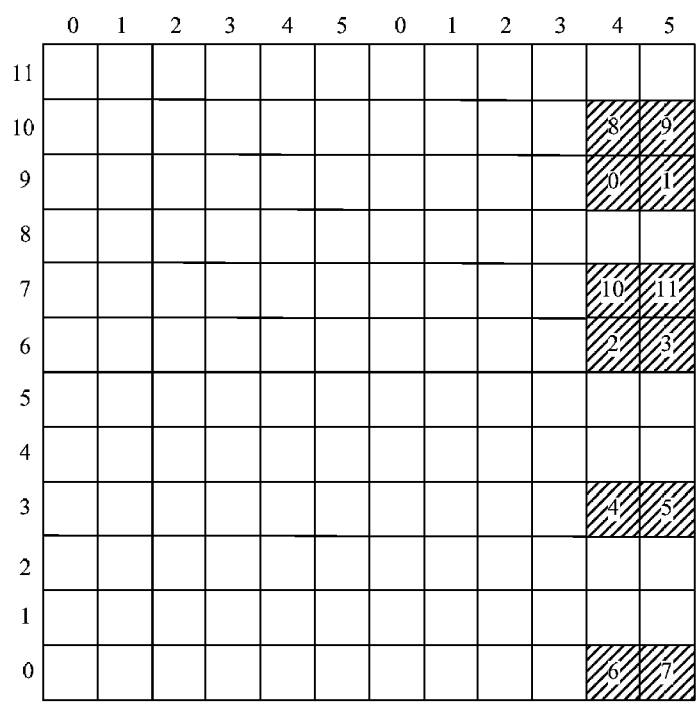
FIG. 26 shows another 12-port reference signal resource mapping diagram according to Embodiment 7 of the present invention.

In extended CP mode 1, a 12-port reference signal resource mapping diagram may be a reference signal resource mapping diagram shown in FIG. 26. The 12 ports are numbered from 0 to 11. Time-frequency resource locations (locations of REs) occupied by the $0^{th}$ port to the seventh port are the same as time-frequency resource locations occupied by an 8-port first reference signal resource mapping diagram corresponding to configuration 2 in four 8-port configurations in extended CP mode 1 defined in the LTE R12 in the prior art, and locations (k,l) of REs occupied by the 8-port first reference signal resource mapping diagram corresponding to configuration 2 are {(10, 4), (10, 5), (7, 4), (7, 5), (4, 4), (4, 5), (1, 4), (1, 5)}. In addition, in this configuration, time-frequency resource locations occupied by the eighth port to the eleventh port in the 12 ports are the same as time-frequency resource locations occupied by an 8-port first reference signal resource mapping diagram corresponding to configuration 3 in four configurations of 8-port first reference signal resource mapping diagrams in extended CP mode 1 defined in the LTE R12 in the prior art, and locations (k,l) of occupied REs are {(9, 4), (9, 5), (6, 4), (6, 5)}. Alternatively, in this configuration, time-frequency resource locations occupied by the eighth port to the eleventh port in the 12 ports are the same as time-frequency resource locations occupied by an 8-port first reference signal resource mapping diagram corresponding to configuration 3 in four configurations of 8-port first reference signal resource mapping diagrams in extended CP mode 1 defined in the LTE R12 in the prior art, and locations (k,l) of occupied REs are {(3, 4), (3, 5), (0, 4), (0, 5)}.

Figure 27:
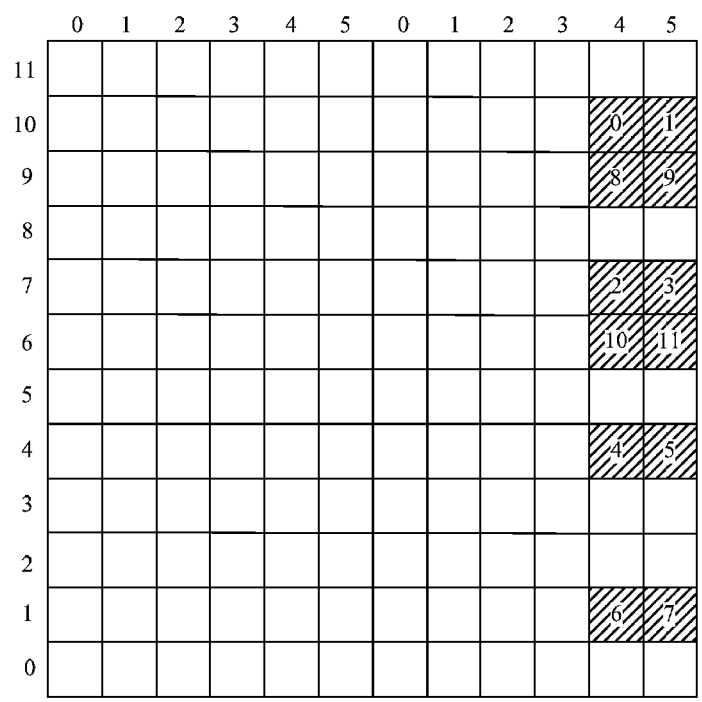
FIG. 27 shows another 12-port reference signal resource mapping diagram according to Embodiment 7 of the present invention.

In extended CP mode 1, a 12-port reference signal resource mapping diagram may be a reference signal resource mapping diagram shown in FIG. 27. The 12 ports are numbered from 0 to 11. Time-frequency resource locations (locations of REs) occupied by the $0^{th}$ port to the seventh port are the same as time-frequency resource locations occupied by an 8-port first reference signal resource mapping diagram corresponding to configuration 3 in four 8-port configurations in extended CP mode 1 defined in the LTE R12 in the prior art, and locations (k,l) of REs occupied by the 8-port first reference signal resource mapping diagram corresponding to configuration 3 are {(9, 4), (9, 5), (6, 4), (6, 5), (3, 4), (3, 5), (0, 4), (0, 5)}. In this configuration, time-frequency resource locations occupied by the eighth port to the eleventh port in the 12 ports are the same as time-frequency resource locations occupied by an 8-port first reference signal resource mapping diagram corresponding to configuration 2 in four configurations of 8-port first reference signal resource mapping diagrams in extended CP mode 1 defined in the LTE R12 in the prior art, and locations (k,l) of occupied REs are {(10, 4), (10, 5), (7, 4), (7, 5)}. Alternatively, in this configuration, time-frequency resource locations occupied by the eighth port to the eleventh port in the 12 ports are the same as time-frequency resource locations occupied by an 8-port first reference signal resource mapping diagram corresponding to configuration 2 in four configurations of 8-port first reference signal resource mapping diagrams in extended CP mode 1 defined in the LTE R12 in the prior art, and locations (k,l) of occupied REs are {(4, 4), (4, 5), (1, 4), (1, 5)}.

Figure 28:
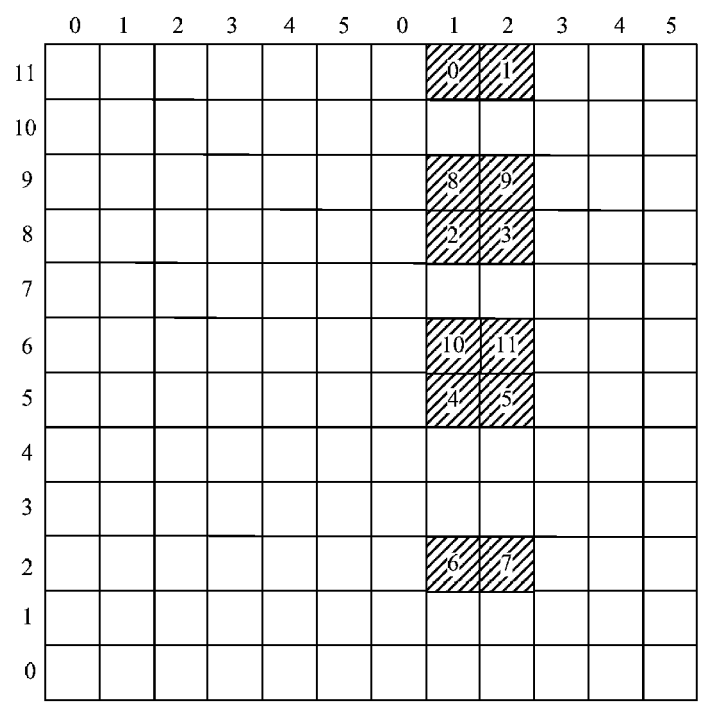
FIG. 28 shows another 12-port reference signal resource mapping diagram according to Embodiment 7 of the present invention.

In extended CP mode 2 (supporting only TDD), a 12-port reference signal resource mapping diagram may be the reference signal resource mapping diagrams shown in FIG. 24 to FIG. 27, or may be a reference signal resource mapping diagram shown in FIG. 28. The 12 ports are numbered from 0 to 11. Time-frequency resource locations (locations of REs) occupied by the $0^{th}$ port to the seventh port are the same as time-frequency resource locations occupied by an 8-port first reference signal resource mapping diagram corresponding to configuration 16 in three 8-port configurations in extended CP mode 2 defined in the LTE R12 in the prior art, and locations (k,l) of REs occupied by the 8-port first reference signal resource mapping diagram corresponding to configuration 16 are {(11, 1), (11, 2), (8, 1), (8, 2), (5, 1), (5, 2), (2, 1), (2, 2)}. In this configuration, time-frequency resource locations occupied by the eighth port to the eleventh port in the 12 ports are the same as time-frequency resource locations occupied by an 8-port first reference signal resource mapping diagram corresponding to configuration 18 in three configurations of 8-port first reference signal resource mapping diagrams in extended CP mode 2 defined in the LTE R12 in the prior art, and locations (k,l) of occupied REs are {(9, 1), (9, 2), (6, 1), (6, 2)}.

Figure 29:
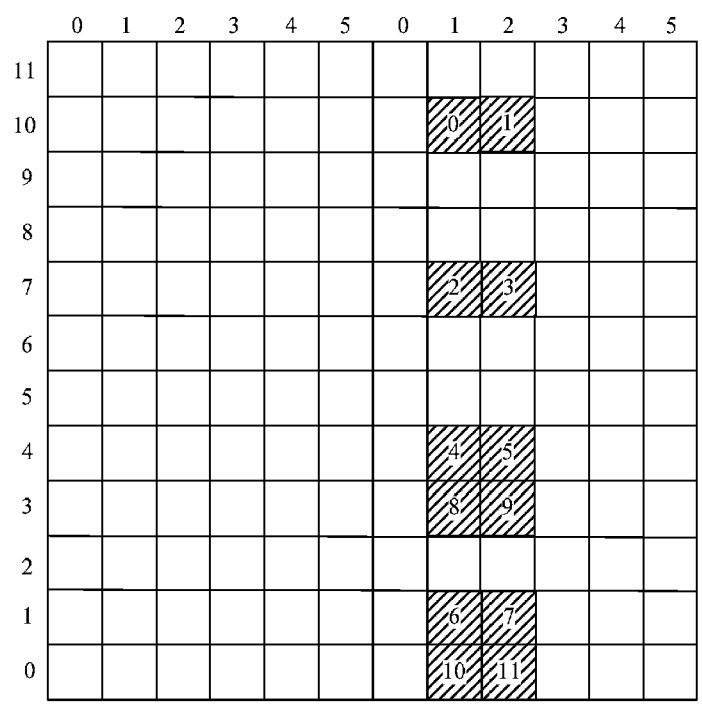
FIG. 29 shows another 12-port reference signal resource mapping diagram according to Embodiment 7 of the present invention.

In extended CP mode 2 (supporting only TDD), a 12-port reference signal resource mapping diagram may be a reference signal resource mapping diagram shown in FIG. 29. The 12 ports are numbered from 0 to 11. Time-frequency resource locations (locations of REs) occupied by the $0^{th}$ port to the seventh port are the same as time-frequency resource locations occupied by an 8-port first reference signal resource mapping diagram corresponding to configuration 17 in three 8-port configurations in extended CP mode 2 defined in the LTE R12 in the prior art, and locations (k,l) of REs occupied by the 8-port first reference signal resource mapping diagram corresponding to configuration 16 are {(10, 1), (10, 2), (7, 1), (7, 2), (4, 1), (4, 2), (1, 1), (1, 2)}. In this configuration, time-frequency resource locations occupied by the eighth port to the eleventh port in the 12 ports are the same as time-frequency resource locations occupied by an 8-port first reference signal resource mapping diagram corresponding to configuration 18 in three configurations of 8-port first reference signal resource mapping diagrams in extended CP mode 2 defined in the LTE R12 in the prior art, and locations (k,l) of occupied REs are {(3, 1), (3, 2), (0, 1), (0, 2)}.

It should be noted that the base station may specifically notify the UE of a configuration of the second reference signal resource mapping diagram by using signaling in the following manners.

First, a manner in Table 3 may be used. The base station sends Table 1 to the UE, and notifies, by using signaling, the UE of a configuration number (a configuration index) corresponding to the second reference signal resource mapping diagram. For example, the base station notifies, by using signaling, the UE that the configuration of the second reference signal resource mapping diagram is configuration 0. It represents that a location of an RE corresponding to the $0^{th}$ port in a 12-port second reference signal resource mapping diagram in a PRB pair is (9, 5), and $n_s$ mod 2=0. Further, the UE may obtain, according to preset formulas, locations of REs corresponding to the other 11 ports in the 12-port second reference signal resource mapping diagram. The preset formulas may be:

$$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases},$$

$$l = \begin{cases} l' + l'', & p = 0^{th} \text{ port to seventh port} \\ l' - 3 + l'', & p = \text{eighth port to eleventh port}, l'' = 0, 1 \end{cases},$$

where the $0^{th}$ port to the seventh port correspond to $n_s$ mod 2=0, the eighth port to the eleventh port correspond to $n_s$ mod 2=1, K is a number of a subcarrier in each PRB pair, and l is a number of an OFDM symbol in each slot.

In addition, a quantity of bits of the signaling used for notification may be the same as quantities of bits of signaling used to notify configurations of resource mapping diagrams of second reference signals whose port quantities are 1,2, 4, and 8, and is 5 bits.

TABLE 3

| CSI reference signal configuration | Number of CSI reference signals configured | | | |
|---|---|---|---|---|
| | 12 | | 16 | |
| | (k', l') | $n_s$ mod2 | (k', l') | $n_s$ mod2 |
| Frame structure type 1 and 2 | 0 | (9, 5) | 0 | (9, 5) | 0 |
| | 1 | (11, 2) | 1 | (11, 2) | 1 |
| | 2 | (10, 2) | 1 | (10, 2) | 1 |
| | 3 | | | | |
| | 4 | | | | |
| | 5 | | | | |
| | 6 | | | | |
| | 7 | | | | |
| | 8 | | | | |
| | 9 | | | | |
| | 10 | | | | |
| | 11 | | | | |
| | 12 | | | | |
| | 13 | | | | |
| | 14 | | | | |
| | 15 | | | | |
| | 16 | | | | |
| | 17 | | | | |
| | 18 | | | | |
| | 19 | | | | |
| Frame structure type 2 only | 20 | | | | |
| | 21 | | | | |
| | 22 | | | | |
| | 23 | | | | |
| | 24 | | | | |
| | 25 | | | | |
| | 26 | | | | |
| | 27 | | | | |
| | 28 | | | | |
| | 29 | | | | |
| | 30 | | | | |
| | 31 | | | | |

Second, for an X-port second reference signal resource mapping diagram, if X=X1+X2, the base station separately notifies a configuration of an X1-port first reference signal resource mapping diagram and a configuration of an X2-port first reference signal resource mapping diagram. For example, the base station notifies that a configuration of X1=8 may be selected from configuration 0 to configuration 4. For example, configuration 0 is selected. The base station notifies that a configuration of X2=4 is configuration 4, and the configuration of X2=4 may be selected from configuration 0 to configuration 9. For example, configuration 4 is selected and notified. This manner is the most flexible. Because there are many combinations of the configuration of X1 and the configuration of X2, the configuration of the X-port second reference signal resource mapping diagram is very flexible, and configurations of different X-port second pilot resource mapping diagrams may overlap. X1 needs to be notified by using 5 bits, and X2 also needs to be notified by using 5 bits.

Third, a difference from the second manner lies in that the base station limits ranges of configurations of X1 and X2 according to a preset rule. For example, a configuration range of X1=8 is originally configuration 0 to configuration 4 and currently limited to configuration 0, configuration 1, and configuration 2, a configuration range of X2=4 is originally configuration 0 to configuration 9 and currently limited to configuration 0 and configuration 4. It should be noted that the preset rule may be: Configurations of the X1-port reference signal resource mapping diagram and the X2-port reference signal resource mapping diagram that are included in the X-port reference signal resource mapping diagram do not overlap or configurations of the X1-port reference signal resource mapping diagram and the X2-port reference signal resource mapping diagram that are included in the X-port reference signal resource mapping diagram are on a same symbol.

Fourth, the base station notifies the UE of a configuration of a 16-port reference signal resource mapping diagram, and it is predefined that a configuration of a resource mapping diagram of a second reference signal whose X=12 is resources of the $M1^{th}$ port to the $(M1+11)^{th}$ port in the 16-port second reference signal resource mapping diagram. M1 may be 0 by default, or may be another value.

Fifth, the base station notifies the UE of a configuration of a 16-port reference signal resource mapping diagram and 4-port muting signaling. For example, assuming that resources of a 12-port second reference signal are not mapped to overlapping resource locations between resource locations of the 16-port reference signal resource mapping diagram and resource locations of the 4-port muting signaling, the resources of the 12-port second reference signal are mapped to other locations in the 16-port reference signal resource mapping diagram other than the resource locations overlapped with the resource locations of the 4-port muting signaling.

It should be noted that in this embodiment of the present invention, the $0^{th}$ port corresponds to a port whose index is 15 in the LTE R12 in the prior art, the first port corresponds to a port whose index is 16 in the LTE R12 in the prior art, and so on. The first reference signal and the second reference signal in the present invention both may be CSI-RSs.

Embodiment 8

Figure 30:
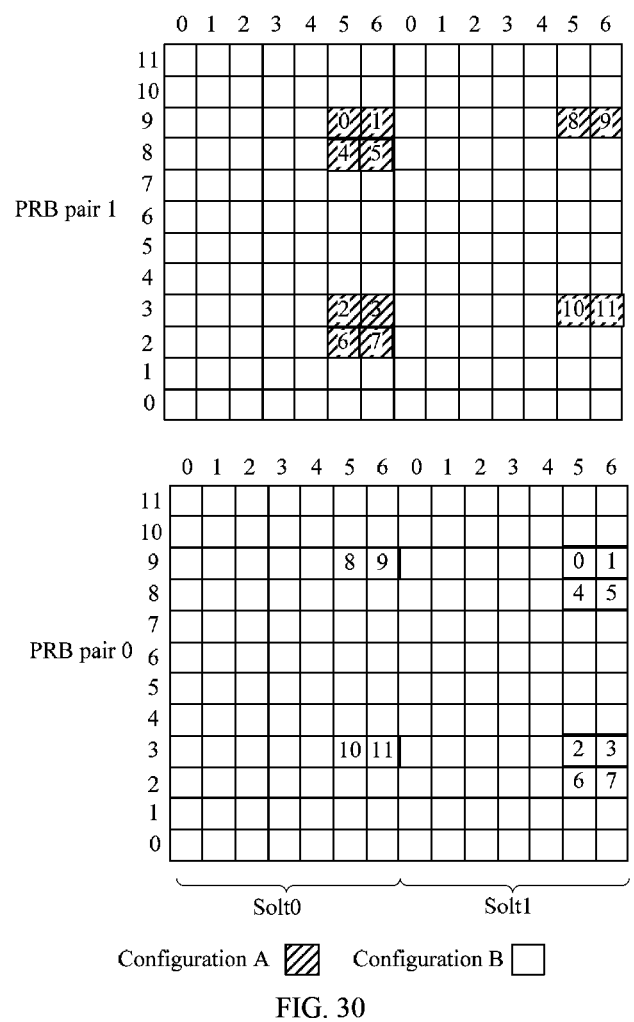
FIG. 30 shows a 12-port reference signal resource mapping diagram according to Embodiment 8 of the present invention.

If a 12-port second reference signal is transmitted on four OFDM symbols, an 8-port reference signal is transmitted on two OFDM symbols and a 4-port reference signal is transmitted on the other two OFDM symbols, causing a problem of power imbalance, for example, manners shown in 12-port configurations A and B in FIG. 30. The following manners may be used to resolve the problem of power imbalance.

If a mapping diagram of a second reference signal whose port quantity is X includes a resource mapping diagram of a first reference signal whose port quantity is X1 and a resource mapping diagram of a first reference signal whose port quantity is X2, the X1-port first reference signal resource mapping diagram and the X2-port first reference signal resource mapping diagram occupy different OFDM symbol pairs in a PRB pair, the X1-port first reference signal resource mapping diagram corresponds to resources occupied by the $0^{th}$ port to the $(X1-1)^{th}$ port in the second reference signal whose port quantity is X, and the X2-port first reference signal resource mapping diagram corresponds to resources occupied by the $X1^{th}$ port to the $(X-1)^{th}$ port in the second reference signal whose port quantity is X, for the second reference signal whose port quantity is X, locations of OFDM symbol pairs of the $0^{th}$ port to the $(X1-1)^{th}$ port and the X1' port to the $(X-1)^{th}$ port in a PRB pair are respectively interchangeable with locations of OFDM symbol pairs of the $0^{th}$ port to the $(X1-1)^{th}$ port and the $X1^{th}$ port to the $(X-1)^{th}$ port in a neighbouring PRB pair, where X=X1+X2, and X, X1, and X2 are all positive integers.

For example, as shown in FIG. 30, a mapping diagram of a second reference signal CSI-RS whose port quantity X is 12 includes a mapping diagram of a first reference signal whose port quantity X1 is 8 and a resource mapping diagram of a first reference signal whose port quantity X2 is 4. The X1-port first reference signal resource mapping diagram corresponds to the $0^{th}$ port to the seventh port in the X ports, and locations are the fifth and sixth OFDM symbol pairs in slot 1 in PRB pair 0. The X2-port first reference signal resource mapping diagram corresponds to the eighth port to the eleventh port in the X ports, and locations are the fifth and sixth OFDM symbol pairs in slot 0 in PRB pair 0. For PRB pair 1 adjacent to PRB pair 0 in a frequency domain, the X1-port first reference signal resource mapping diagram corresponds to the $0^{th}$ port to the seventh port in the X ports, and locations are the fifth and sixth OFDM symbol pairs in slot 0 in PRB pair 1, the X2-port first reference signal resource mapping diagram corresponds to the eighth port to the eleventh port in the X ports, and locations are the fifth and sixth OFDM symbol pairs in slot 1 in PRB pair 0. That is, for the 12-port resource mapping diagram, the OFDM symbols being the fifth and sixth symbols of the $0^{th}$ port to the seventh port in slot 1 in PRB pair 0 and the OFDM symbols being the fifth and sixth symbols of the eighth port to the eleventh port in slot 0 in PRB pair 0 are respectively interchangeable with the OFDM symbols being the fifth and sixth symbols of the $0^{th}$ port to the seventh port in slot 0 in PRB pair 1 and the OFDM symbols being the fifth and sixth symbols of the eighth port to the eleventh port in slot 1 in PRB pair 1.

Because different manners of transmitting the 12-port resource mapping diagram on two PRB pairs adjacent in the frequency domain can avoid the problem of power imbalance, the following sending manners may be used. Four ports (8, 9, 10, 11) are transmitted on the fifth and sixth OFDM symbols in PRB pair 0 and eight ports (0, 1, 2, 3, 4, 5, 6, 7) are transmitted on the twelfth and thirteenth OFDM symbols in PRB pair 0. In adjacent PRB pair 1, eight ports (0, 1, 2, 3, 4, 5, 6, 7) are transmitted on the fifth and sixth OFDM symbols and four ports (8, 9, 10, 11) are transmitted on the twelfth and thirteenth OFDM symbols. A resource mapping manner of the second reference signal in PRB pair 0 is used for PRB pairs 0, 2, 4, . . . (PRB pairs whose PRB pair numbers are even numbers), and a resource mapping manner of the second reference signal in PRB pair 1 is used for PRB pairs 1, 3, 5, . . . (PRB pairs whose PRB pair numbers are odd numbers). The twelfth and thirteenth OFDM symbols are the fifth and sixth OFDM symbols in slot 1.

With reference to FIG. 30, a time-frequency resource location (k,l) of the 12-port reference signal resource mapping diagram satisfies the following conditions.

In configuration B:

$$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$$l = \{l' + l'', \quad p = 0^{th} \text{ port to eleventh port}, l'' = 0, 1$$

where (k',l') is a time-frequency resource location corresponding to the first port, (k',l')=(9, 5), the $0^{th}$ port to the seventh port correspond to $n_s$ mod 2=1, the eighth port to the eleventh port correspond to $n_s$ mod 2=0, CP is a normal CP and supports FDD and TDD, X mod 2=0, and X is a number of aPRB pair.

In configuration A:

$$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$$l = \{l' + l'', \quad p = 0^{th} \text{ port to eleventh port}, l'' = 0, 1$$

where (k',l')=(9,5), the $0^{th}$ port to the seventh port correspond to $n_s$ mod 2=0, the eighth port to the eleventh port correspond to $n_s$ mod 2=1, CP is a normal CP and supports FDD and TDD, and X mod 2=1.

Certainly, configuration A may alternatively be transmitted when X mod 2=0, and configuration B may alternatively be transmitted when X mod 2=1.

Figure 31:
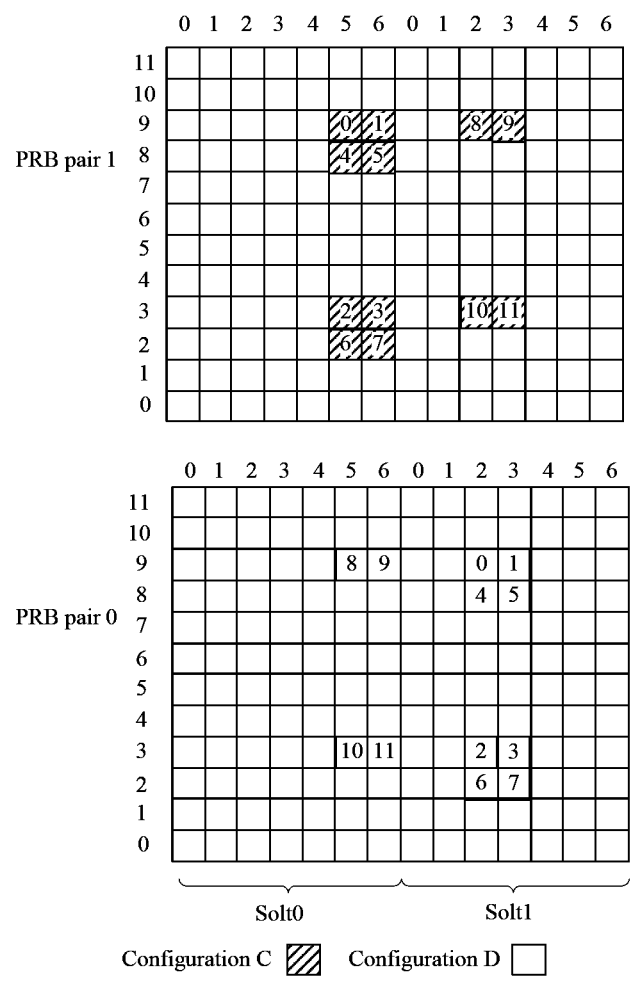
FIG. 31 shows another 12-port reference signal resource mapping diagram according to Embodiment 8 of the present invention.

In addition, the sending manner in FIG. 31 may be used to transmit the 12-port reference signal resource mapping diagram, to avoid the problem of power imbalance. The X1-port first reference signal resource mapping diagram corresponds to the $0^{th}$ port to the seventh port in the X ports, and locations are the second and third OFDM symbol pairs in slot 1 in PRB pair 0. The X2-port first reference signal resource mapping diagram corresponds to the eighth port to the eleventh port in the X ports, and locations are the fifth and sixth OFDM symbol pairs in slot 0 in PRB pair 0. For PRB pair 1 adjacent to PRB pair 0 in the frequency domain, the X1-port first reference signal resource mapping diagram corresponds to the $0^{th}$ port to the seventh port in the X ports, and locations are the fifth and sixth OFDM symbol pairs in slot 0 in PRB pair 1, and the X2-port first reference signal resource mapping diagram corresponds to the eighth port to the eleventh port in the X ports, and locations are the second and third OFDM symbol pairs in slot 1 in PRB pair 0. That is, for the 12-port resource mapping diagram, the OFDM symbols being the second and third symbols of the $0^{th}$ port to the seventh port in slot 1 in PRB pair 0 and the OFDM symbols being the fifth and sixth symbols of the eighth port to the eleventh port in slot 0 in PRB pair 0 are respectively interchangeable with the OFDM symbols being the fifth and sixth symbols of the $0^{th}$ port to the seventh port in slot 0 in PRB pair 1 and the OFDM symbols being the second and third symbols of the eighth port to the eleventh port in slot 1 in PRB pair 1.

A time-frequency resource location (k,l) of the 12-port reference signal resource mapping diagram satisfies the following conditions.

In configuration C, the time-frequency resource location is:

$$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$$l = \begin{cases} l' + l'', & p = 0^{th} \text{ port to seventh port} \\ l' - 3 + l'', & p = \text{eighth port to eleventh port } l'' = 0, 1 \end{cases}$$

where (k',l')=(9, 5), the $0^{th}$ port to the seventh port correspond to $n_s$ mod 2=0, the eighth port to the eleventh port correspond to $n_s$ mod 2=1, CP is a normal CP and supports FDD and TDD, PRB pair X mod 2=1, and X is a number of a PRB pair.

In configuration D, the time-frequency resource location is:

$$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \end{cases}$$

$$l = \begin{cases} l' + l'', & p = 0^{th} \text{ port to seventh port} \\ l' + 3 + l'', & p = \text{eighth port to eleventh port}, l'' = 0, 1 \end{cases}$$

where (k',l')=(9, 2), the $0^{th}$ port to the seventh port correspond to $n_s$ mod 2=1, the eighth port to the eleventh port correspond to $n_s$ mod 2, CP is a normal CP and supports FDD and TDD, and PRB pair X mod 2=0.

Certainly, configuration C may be transmitted when X mod 2=0, and configuration D may be transmitted when X mod 2=1

Figure 32:
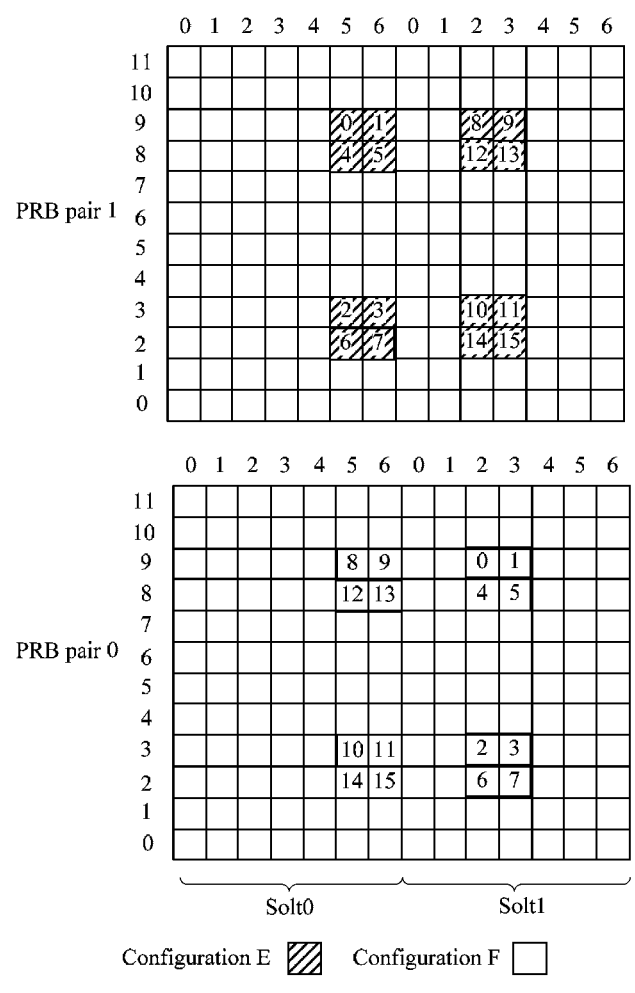
FIG. 32 shows a 16-port reference signal resource mapping diagram according to Embodiment 8 of the present invention.

For example, as shown in FIG. 32, a mapping diagram of a second reference signal CSI-RS whose port quantity X is 16 includes a mapping diagram of a first reference signal whose port quantity X1 is 8 and a resource mapping diagram of a first reference signal whose port quantity X2 is 8. The X1-port first reference signal resource mapping diagram corresponds to the $0^{th}$ port to the seventh port in the X ports, and locations are the second and third OFDM symbol pairs in slot 1 in PRB pair 0. The X2-port first reference signal resource mapping diagram corresponds to the eighth port to the fifteenth port in the X ports, and locations are the fifth and sixth OFDM symbol pairs in slot 0 in PRB pair 0. For PRB pair 1 adjacent to PRB pair 0 in a frequency domain, the X1-port first reference signal resource mapping diagram corresponds to the $0^{th}$ port to the seventh port in the X ports, and locations are the fifth and sixth OFDM symbol pairs in slot 0 in PRB pair 1, the X2-port first reference signal resource mapping diagram corresponds to the eighth port to the fifteenth port in the X ports, and locations are the second and third OFDM symbol pairs in slot 1 in PRB pair 0. That is, for the 12-port resource mapping diagram, the OFDM symbols being the second and third symbols of the $0^{th}$ port to the seventh port in slot 1 in PRB pair 0 and the OFDM symbols being the fifth and sixth symbols of the eighth port to the fifteenth port in slot 0 in PRB pair 0 are respectively interchangeable with the OFDM symbols being the fifth and sixth symbols of the $0^{th}$ port to the seventh port in slot 0 in PRB pair 1 and the OFDM symbols being the second and third symbols of the eighth port to the fifteenth port in slot 1 in PRB pair 1.

Specifically, as shown in FIG. 32, in configuration F, the time-frequency resource location is:

$$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

$$l = \begin{cases} l' + l'', & p = 0^{th} \text{ port to seventh port} \\ l' + 3 + l'', & p = \text{eighth port to eleventh port}, l'' = 0, 1 \end{cases}$$

where (k',l')=(9, 2), the $0^{th}$ port to the seventh port correspond to $n_s$ mod 2=1, the eighth port to the fifteenth port correspond to $n_s$ mod 2=0, CP is a normal CP and supports FDD and TDD, and PRB pair X mod 2=1.

In configuration E, the time-frequency resource location is:

$$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

$$l = \begin{cases} l' + l'', & p = 0^{th} \text{ port to seventh port} \\ l' - 3 + l'', & p = \text{eighth port to eleventh port}, l'' = 0, 1 \end{cases}$$

where (k',l')=(9, 5), the $0^{th}$ port to the seventh port correspond to $n_s$ mod 2=0, the eighth port to the fifteenth port correspond to $n_s$ mod 2=1, CP is a normal CP and supports FDD and TDD, PRB pair X mod 2=0, and X is a number of a PRB pair.

Certainly, configuration E may be transmitted when X mod 2=0, and configuration F may be transmitted when X mod 2=1

Figure 33:
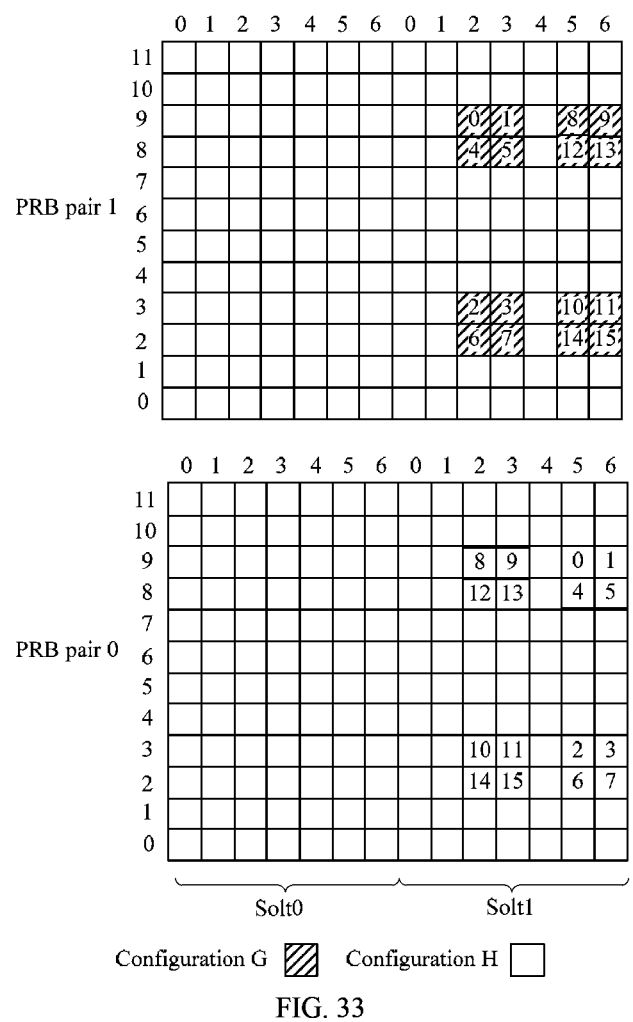
FIG. 33 shows another 16-port reference signal resource mapping diagram according to Embodiment 8 of the present invention.

For example, as shown in FIG. 33, a mapping diagram of a second reference signal CSI-RS whose port quantity X is 16 includes a mapping diagram of a first reference signal whose port quantity X1 is 8 and a resource mapping diagram of a first reference signal whose port quantity X2 is 8. The X1-port first reference signal resource mapping diagram corresponds to the $0^{th}$ port to the seventh port in the X ports, and locations are the second and third OFDM symbol pairs in slot 1 in PRB pair 0. The X2-port first reference signal resource mapping diagram corresponds to the eighth port to the fifteenth port in the X ports, and locations are the fifth and sixth OFDM symbol pairs in slot 0 in PRB pair 0. For PRB pair 1 adjacent to PRB pair 0 in the frequency domain, the X1-port first reference signal resource mapping diagram corresponds to the $0^{th}$ port to the seventh port in the X ports, and locations are the fifth and sixth OFDM symbol pairs in slot 0 in PRB pair 1, the X2-port first reference signal resource mapping diagram corresponds to the eighth port to the fifteenth port in the X ports, and locations are the second and third OFDM symbol pairs in slot 1 in PRB pair 0. That is, for the 12-port resource mapping diagram, the OFDM symbols being the second and third symbols of the $0^{th}$ port to the seventh port in slot 1 in PRB pair 0 and the OFDM symbols being the fifth and sixth symbols of the eighth port to the fifteenth port in slot 0 in PRB pair 0 are respectively interchangeable with the OFDM symbols being the fifth and sixth symbols of the $0^{th}$ port to the seventh port in slot 0 in PRB pair 1 and the OFDM symbols being the second and third symbols of the eighth port to the fifteenth port in slot 1 in PRB pair 1.

Specifically, as shown in FIG. 32, in configuration E, the time-frequency resource location is:

in configuration H, the time-frequency resource location is:

$$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

$$l = \begin{cases} l' + l'', & p = 0^{th} \text{ port to seventh port} \\ l' - 3 + l'', & p = \text{eighth port to eleventh port}, l'' = 0, 1 \end{cases}$$

where (k',l')=(9, 5), the $0^{th}$ port to the fifteenth port correspond to $n_s$ mod 2=1, CP is a normal CP and supports FDD and TDD, PRB pair X mod 2=0, and X is a number of a PRB pair.

In configuration G, the time-frequency resource location is:

$$k = k' + \begin{cases} -0, & p = \{0^{th} \text{ port, first port}\} \\ -6, & p = \{\text{second port, third port}\} \\ -1, & p = \{\text{fourth port, fifth port}\} \\ -7, & p = \{\text{sixth port, seventh port}\} \\ -0, & p = \{\text{eighth port, ninth port}\} \\ -6, & p = \{\text{tenth port, eleventh port}\} \\ -1, & p = \{\text{twelfth port, thirteenth port}\} \\ -7, & p = \{\text{fourteenth port, fifteenth port}\} \end{cases}$$

-continued $$l = \begin{cases} l' + l'', & p = 0^{th} \text{ port to seventh port} \\ l' + 3 + l'', & p = \text{eighth port to eleventh port}, l'' = 0, 1 \end{cases}$$

where (k',l') (9, 2), the $0^{th}$ port to the fifteenth port correspond to $n_s$ mod 2=1, CP is a normal CP and supports FDD and TDD, and PRB pair X mod 2=1.

Certainly, configuration G may alternatively be transmitted when X mod 2=0, and configuration H may alternatively be transmitted when X mod 2=1.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims. Additionally, statements made herein characterizing the invention refer to an embodiment of the invention and not necessarily all embodiments.

What is claimed is:

1. A channel measurement method, comprising:
receiving, by a user equipment (UE), joint coding signaling from a base station, wherein the joint coding signaling indicates configuration information of a $X_1$-port reference signal resource mapping diagram, configuration information of a $X_2$-port reference signal resource mapping diagram, . . . , and configuration information of a $X_i$-port reference signal resource mapping diagram;
obtaining, by the UE, a second reference signal resource mapping diagram according to the joint coding signaling, wherein the second reference signal resource mapping diagram is one of K2 second reference signal resource mapping diagrams, wherein the K2 second reference signal resource mapping diagrams correspond to K2 time-frequency resources, and K2 second reference signals from the base station are mapped to the K2 time-frequency resources respectively;
obtaining, by the UE, a second reference signal according to the second reference signal resource mapping diagram; and
performing, by the UE, channel measurement according to the second reference signal to determine channel state information, and feeding back the channel state information to the base station;
wherein the second reference signal resource mapping diagram is an X-port reference signal resource mapping diagram, and X is an integer greater than 8 or an integer less than 8 which is not a power of 2, and wherein the second reference signal resource mapping diagram comprises the $X_1$-port reference signal resource mapping diagram, the $X_2$-port reference signal resource mapping diagram, . . . , and the $X_i$-port reference signal resource mapping diagram, wherein $X_1+X_2 \ldots +X_i=X$, and wherein each of $X_1, X_2, \ldots, X_i$ is an integer power of 2 and i is an integer greater than 1;
wherein all of the $X_1$-port reference signal resource mapping diagram, the $X_2$-port reference signal resource mapping diagram, . . . , and the $X_i$-port reference signal resource mapping diagram belong to K1 first reference signal resource mapping diagrams and are obtained by the UE from at least one subframe;
wherein K2 is a quantity of the second reference signal resource mapping diagrams, K1 is a quantity of the first reference signal resource mapping diagrams, K1 and K2 are positive integers and K1 is greater than 1; and
wherein there are at least two of the K2 second reference signal resource mapping diagrams having overlapping resources in both time domain and frequency domain.

2. The method according to claim 1, wherein the UE performs one selected from the group consisting of:
(a) the UE obtains the $X_1$-port reference signal resource mapping diagram, the $X_2$-port reference signal resource mapping diagram, . . . , and the $X_i$-port reference signal resource mapping diagram from one subframe; and
(b) the UE obtains the $X_1$-port reference signal resource mapping diagram, the $X_2$-port reference signal resource mapping diagram, . . . , and the $X_i$-port reference signal resource mapping diagram from i subframes.

3. The method according to claim 1, wherein orthogonal frequency division multiplexing (OFDM) symbols occupied by time-frequency resource locations of the $X_1$-port reference signal resource mapping diagram, the $X_2$-port reference signal resource mapping diagram, . . . , and the $X_i$-port reference signal resource mapping diagram are the same.

4. The method according to claim 1, wherein a range of a resource mapping diagram corresponding to the received configuration information that is notified by the base station and that is of each first reference signal resource mapping diagram comprised in the second reference signal resource mapping diagram is a set or a subset of all first reference signal resource mapping diagrams.

5. A user equipment (UE), comprising at least a processor and a transceiver, wherein:
the transceiver is configured to receive a joint coding signaling from a base station, wherein the joint coding signaling indicates configuration information of a $X_1$-port reference signal resource mapping diagram, configuration information of a $X_2$-port reference signal resource mapping diagram, . . . , and configuration information of a $X_i$-port reference signal resource mapping diagram; and
the at least one processor is configured to:
obtain a second reference signal resource mapping diagram according to the joint coding signaling, wherein the second reference signal resource mapping diagram is one of K2 second reference signal resource mapping diagrams, wherein the K2 second reference signal resource mapping diagrams correspond to K2 time-frequency resources, and K2 second reference signals from the base station are mapped to the K2 time-frequency resources respectively;
obtain a second reference signal according to the second reference signal resource mapping diagram; and
perform channel measurement according to the second reference signal, determine channel state information, and feed back the channel state information to the base station;
wherein the second reference signal resource mapping diagram is an X-port reference signal resource mapping diagram, and X is an integer greater than 8 or an integer less than 8 which is not a power of 2, and wherein the second reference signal resource mapping diagram comprises the $X_1$-port reference signal resource mapping diagram, the $X_2$-port reference signal resource mapping diagram, . . . , and the $X_i$-port reference signal resource mapping diagram, wherein $X_1+X_2 \ldots +X_i=X$, and wherein each of $X_1, X_2, \ldots, X_i$ is an integer power of 2 and i is an integer greater than 1;

wherein all of the $X_1$-port reference signal resource mapping diagram, the $X_2$-port reference signal resource mapping diagram, . . . , and the $X_i$-port reference signal resource mapping diagram belong to K1 first reference signal resource mapping diagrams and are obtained by the UE from at least one subframe;

wherein K2 is a quantity of the second reference signal resource mapping diagrams, K1 is a quantity of the first reference signal resource mapping diagrams, K1 and K2 are positive integers and K1 is greater than 1; and wherein there are at least two of the K2 second reference signal resource mapping diagrams having overlapping resources in both time domain and frequency domain.

6. The UE according to claim 5, wherein the at least one processor, is further configured to perform one selected from the group consisting of:

obtaining the $X_1$-port reference signal resource mapping diagram, the $X_2$-port reference signal resource mapping diagram, . . . , and the $X_i$-port reference signal resource mapping diagram from one subframe; and obtaining the $X_1$-port reference signal resource mapping diagram, the $X_2$-port reference signal resource mapping diagram, . . . , and the $X_i$-port reference signal resource mapping diagram from i subframes.

7. The UE according to claim 5, wherein orthogonal frequency division multiplexing (OFDM) symbols occupied by time-frequency resource locations of the $X_1$-port reference signal resource mapping diagram, the $X_2$-port reference signal resource mapping diagram, . . . , and the $X_i$-port reference signal resource mapping diagram are the same.

8. The UE according to claim 5, wherein a range of a resource mapping diagram corresponding to the received configuration information that is notified by the base station and that is of each first reference signal resource mapping diagram comprised in the second reference signal resource mapping diagram is a set or a subset of all first reference signal resource mapping diagrams.

9. A non-transitory computer-readable storage medium storing programming instructions, which, when executed by a processor, cause a user equipment (UE) to perform:

receiving a joint coding signaling from a base station, wherein the joint coding signaling indicates configuration information of a $X_1$-port reference signal resource mapping diagram, configuration information of a $X_2$-port reference signal resource mapping diagram, . . . , and configuration information of a $X_i$-port reference signal resource mapping diagram;

obtaining a second reference signal resource mapping diagram according to the joint coding signaling, wherein the second reference signal resource mapping diagram is one of K2 second reference signal resource mapping diagrams, wherein the K2 second reference signal resource mapping diagrams correspond to K2 time-frequency resources, and K2 second reference signals from the base station are mapped to the K2 time-frequency resources respectively;

obtaining a second reference signal according to the second reference signal resource mapping diagram; and performing channel measurement according to the second reference signal to determine channel state information, and feeding back the channel state information to the base station;

wherein the second reference signal resource mapping diagram is an X-port reference signal resource mapping diagram, and X is an integer greater than 8 or an integer less than 8 which is not a power of 2, and wherein the second reference signal resource mapping diagram comprises the $X_1$-port reference signal resource mapping diagram, the $X_2$-port reference signal resource mapping diagram, . . . , and the $X_i$-port reference signal resource mapping diagram, wherein $X_1+X_2 \ldots +X_i=X$, and wherein each of $X_1, X_2, \ldots, X_i$ is an integer power of 2 and i is an integer greater than 1;

wherein all of the $X_1$-port reference signal resource mapping diagram, the $X_2$-port reference signal resource mapping diagram, . . . , and the $X_i$-port reference signal resource mapping diagram belong to K1 first reference signal resource mapping diagrams and are obtained by the UE from at least one subframe;

wherein K2 is a quantity of the second reference signal resource mapping diagrams, K1 is a quantity of the first reference signal resource mapping diagrams, K1 and K2 are positive integers and K1 is greater than 1; and wherein there are at least two of the K2 second reference signal resource mapping diagrams having overlapping resources in both time domain and frequency domain.

10. The non-transitory computer-readable storage medium according to claim 9, wherein the programming instructions further cause the UE to perform one selected from:

(a) obtaining the $X_1$-port reference signal resource mapping diagram, the $X_2$-port reference signal resource mapping diagram, . . . , and the $X_i$-port reference signal resource mapping diagram from one subframe; and (b) obtaining the $X_1$-port reference signal resource mapping diagram, the $X_2$-port reference signal resource mapping diagram, . . . , and the $X_i$-port reference signal resource mapping diagram from i subframes.

11. The non-transitory computer-readable storage medium according to claim 9, wherein orthogonal frequency division multiplexing (OFDM) symbols occupied by time-frequency resource locations of the $X_1$-port reference signal resource mapping diagram, the $X_2$-port reference signal resource mapping diagram, . . . , and the $X_i$-port reference signal resource mapping diagram are the same.

12. The non-transitory computer-readable storage medium according to claim 9, wherein a range of a resource mapping diagram corresponding to the received configuration information that is notified by the base station and that is of each first reference signal resource mapping diagram comprised in the second reference signal resource mapping diagram is a set or a subset of all first reference signal resource mapping diagrams.

* * * * *